United States Patent
Lee et al.

(10) Patent No.: US 11,290,700 B2
(45) Date of Patent: Mar. 29, 2022

(54) DEVICE FOR DISPLAYING CONTENT AND OPERATION METHOD THEREFOR

(71) Applicant: Samsung Electronics Co., Ltd., Gyeonggi-do (KR)

(72) Inventors: Min-Kyung Lee, Seoul (KR); Hyunsoo Nah, Seoul (KR); Choonkyoung Moon, Gyeonggi-do (KR); Hyejee Choi, Gyeonggi-do (KR); Hyun-Young Kim, Gyeonggi-do (KR); Iseul Yu, Seoul (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/652,145

(22) PCT Filed: Sep. 28, 2018

(86) PCT No.: PCT/KR2018/011506
§ 371 (c)(1),
(2) Date: Mar. 30, 2020

(87) PCT Pub. No.: WO2019/066537
PCT Pub. Date: Apr. 4, 2019

(65) Prior Publication Data
US 2020/0252594 A1  Aug. 6, 2020

(30) Foreign Application Priority Data

Sep. 29, 2017  (KP) .................. 10-2017-0128079

(51) Int. Cl.
*H04N 13/117* (2018.01)
*H04N 13/167* (2018.01)
(Continued)

(52) U.S. Cl.
CPC ......... *H04N 13/117* (2018.05); *G06T 3/0087* (2013.01); *G11B 27/10* (2013.01);
(Continued)

(58) Field of Classification Search
CPC .. H04N 13/117; H04N 13/167; H04N 13/156; H04N 13/122; H04N 13/398;
(Continued)

(56) References Cited

U.S. PATENT DOCUMENTS

| 6,392,658 B1 | 5/2002 | Oura |
| 2004/0056981 A1 | 3/2004 | Hamamura et al. |

(Continued)

FOREIGN PATENT DOCUMENTS

| KR | 1020040027362 | 4/2004 |
| KR | 1020110083914 | 7/2011 |
| KR | 1020140089269 | 7/2014 |

OTHER PUBLICATIONS

PCT/ISA/210 Search Report dated Dec. 26, 2018 issued on PCT/KR2018/011506, p. 5.
(Continued)

*Primary Examiner* — Nam D Pham
(74) *Attorney, Agent, or Firm* — The Farrell Law Firm, P.C.

(57) ABSTRACT

Various embodiments of the present invention relate to a device for displaying content and an operation method therefor. An electronic device of the present invention comprises a display device, at least one processor, and a memory coupled to the processor, wherein the memory may store instructions that, when executed, cause the processor to obtain at least one deformed image corresponding to a viewpoint change on the basis of an image contained in content in response to detection of a thumbnail generation event for the content, map the obtained at least one deformed image to a three-dimensional object, obtain at least one partial image comprising at least a portion of the image mapped to the three-dimensional object, generate thumbnail content comprising the obtained at least one partial image,
(Continued)

and control the display device to display the thumbnail content. Other embodiments may be possible.

10 Claims, 48 Drawing Sheets

(51) Int. Cl.
  *H04N 13/156* (2018.01)
  *H04N 13/122* (2018.01)
  *H04N 13/398* (2018.01)
  *G06T 3/00* (2006.01)
  *G11B 27/10* (2006.01)
  *H04N 5/262* (2006.01)

(52) U.S. Cl.
  CPC ......... *H04N 5/2628* (2013.01); *H04N 13/122* (2018.05); *H04N 13/156* (2018.05); *H04N 13/167* (2018.05); *H04N 13/398* (2018.05)

(58) Field of Classification Search
  CPC .. H04N 21/81; H04N 21/8549; H04N 5/2628; G06T 3/0087; G06T 15/20; G06T 2200/24; G06T 15/04; G11B 27/10; G11B 27/031; G06F 3/0304; G06F 3/016; G06F 3/011
  See application file for complete search history.

(56) References Cited

U.S. PATENT DOCUMENTS

| | | | |
|---|---|---|---|
| 2014/0194164 A1 | 7/2014 | Le et al. | |
| 2015/0070463 A1 | 3/2015 | Nakajima | |
| 2016/0132991 A1 | 5/2016 | Fukushl | |
| 2017/0064374 A1 | 3/2017 | Eim et al. | |
| 2018/0284885 A1* | 10/2018 | Kim | H04N 13/344 |
| 2018/0329927 A1* | 11/2018 | Garg | G06T 3/4038 |

OTHER PUBLICATIONS

PCT/ISA/237 Written Opinion dated Dec. 26, 2018 issued on PCT/KR2018/011506, p. 6.
Korean Office Action dated Aug. 18, 2021 issued in counterpart application No. 10-2017-0128079, 13 pages.
KR Notice of Patent Grant dated Feb. 18, 2022 issued in counterpart application No. 10-2017-0128079, 7 pages.

* cited by examiner

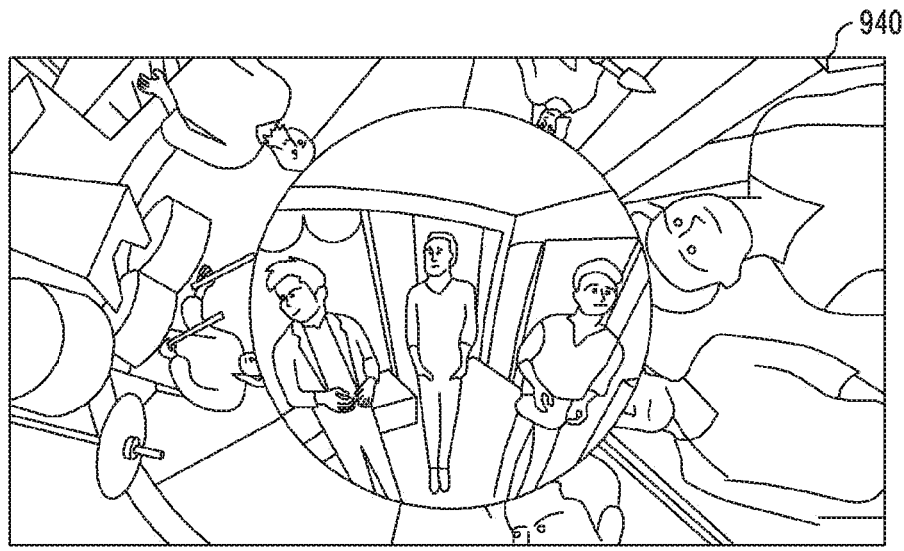
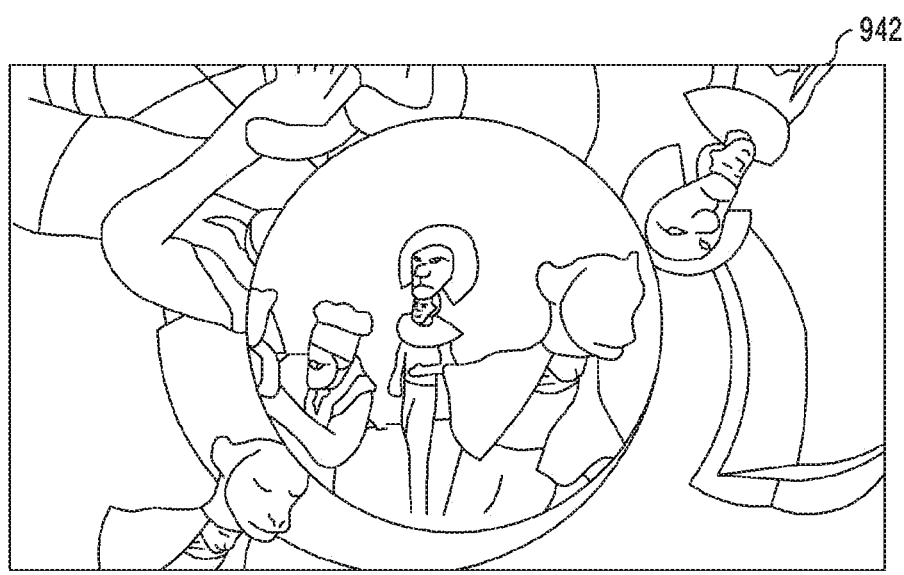
FIG.9D

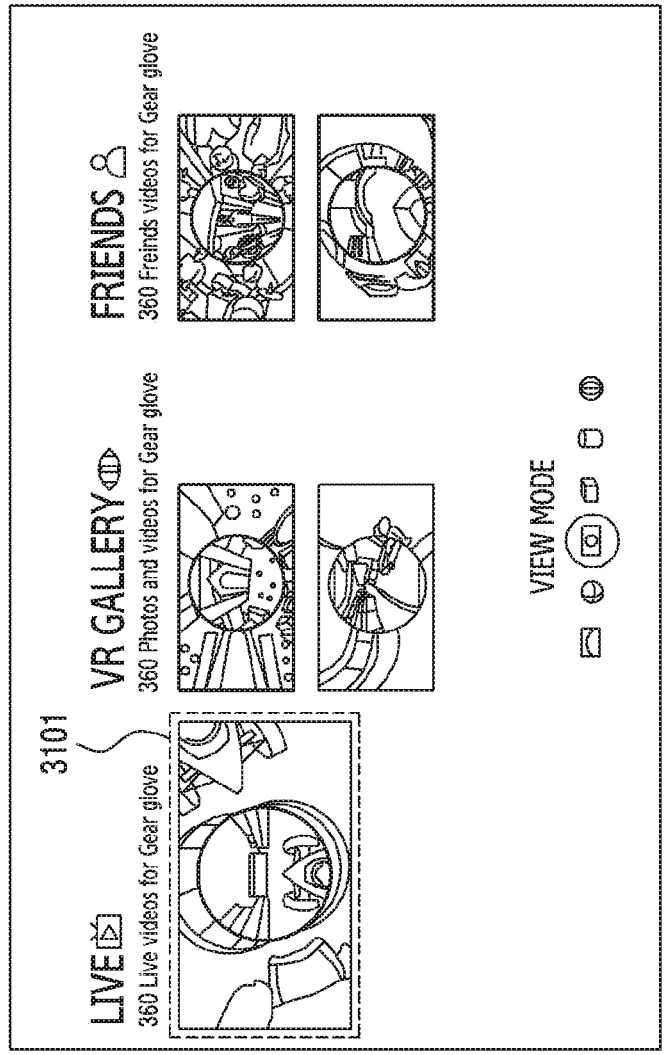
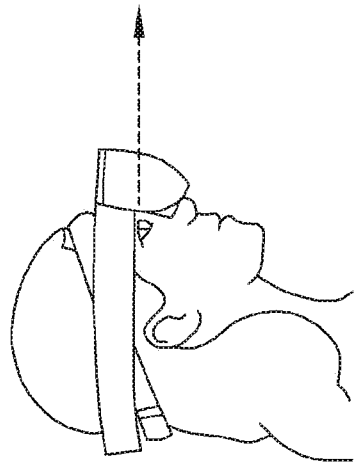
FIG.31

DEVICE FOR DISPLAYING CONTENT AND OPERATION METHOD THEREFOR

PRIORITY

This application is a National Phase Entry of PCT International Application No. PCT/KR2018/011506, which was filed on Sep. 28, 2018, and claims priority to Korean Patent Application No. 10-2017-0128079, which was filed on Sep. 29, 2017, the content of each of which are incorporated herein by reference.

TECHNICAL FIELD

Various embodiments of the disclosure relate to an electronic device and method for displaying content.

BACKGROUND ART

With the advance of information communication techniques and semiconductor techniques, electronic devices are being developed into multimedia devices for providing various multimedia services. For example, the multimedia service may include at least one of a voice call service, a message service, a broadcasting service, a wireless Internet service, a camera service, a video playback service, and a music playback service.

The electronic device may obtain images for different directions by using at least two cameras facing different directions, and may obtain a synthetic image having a viewing angle greater than a specific viewing angle by synthetizing (e.g., stitching) the obtained images for different direction. For example, the electronic device may obtain an image for a first direction and an image for a second direction opposite to the first direction by using two cameras capable of obtaining an image having a viewing angle greater than 180 degrees, and may obtain a synthetic image corresponding to a viewing angle of 360 degrees by synthesizing the image for the first direction and the image for the second direction.

DISCLOSURE OF INVENTION

Technical Problem

The electronic device may generate a thumbnail image for content stored in the electronic device. For example, the electronic device may generate a thumbnail image for omnidirectional content consisting of at least one synthetic image corresponding to a viewing angle of 360 degrees. The electronic device may generate a thumbnail image distorted in a panoramic shape or a circular shape with respect to the omnidirectional content. However, when the thumbnail image is displayed in the electronic device, there may be a problem in that a user cannot easily distinguish whether content is omnidirectional content corresponding to a viewing angle of 360 degrees or 2-dimensional content by using only the thumbnail image.

Accordingly, an apparatus for generating a thumbnail for omnidirectional content in an electronic device, and an operating method thereof are disclosed in various embodiments of the disclosure.

Solution to Problem

An electronic device according to various embodiments of the disclosure may include a display device, at least one processor, and a memory coupled to the processor. The memory may store instructions, when executed, cause the processor to obtain at least one deformed image corresponding to a viewpoint change on the basis of an image included in content in response to detection of a thumbnail generation event for the content, map the obtained at least one deformed image to a 3-dimensional (3D) object, obtain at least one partial image including at least a portion of the image mapped to the 3D object, generate thumbnail content including the obtained at least one partial image, and display the thumbnail content by controlling the display device.

An electronic device according to various embodiments of the disclosure may include a display device, at least one processor, and a memory coupled with the processor. The memory may store instructions, when executed, causing the processor to obtain a plurality of images included in the content in response to detection of a thumbnail generation event for the content, obtain a plurality of image segments from the plurality of images, generate thumbnail content including the obtained plurality of image segments, and display the thumbnail content by controlling the display device.

A method of operating an electronic device according to various embodiments of the disclosure may include obtaining at least one deformed image corresponding to a viewpoint change on the basis of an image included in content in response to detection of a thumbnail generation event for the content, mapping the obtained at least one deformed image to a 3D object, obtaining at least one partial image including at least a portion of the image mapped to the 3D object, generating thumbnail content including the obtained at least one partial image, and displaying the thumbnail content.

A method of operating an electronic device according to various embodiments of the disclosure may include obtaining a plurality of images included in the content in response to detection of a thumbnail generation event for the content, obtaining a plurality of image segments from the plurality of images, generating thumbnail content including the obtained plurality of image segments, and displaying the thumbnail content by controlling the display device.

Advantageous Effects of Invention

In an electronic device and an operating method thereof according to various embodiments of the disclosure, a thumbnail for omnidirectional content can be generated and displayed in the electronic device, thereby causing user's interest in omnidirectional content while inducing a user to easily distinguish omnidirectional content and 2-dimensional content through the thumbnail.

BRIEF DESCRIPTION OF DRAWINGS

FIG. 9D illustrates thumbnail modes determined based on an image feature of omnidirectional content in an electronic device according to various embodiments of the disclosure;

FIG. 31 illustrates a screen configuration of a virtual reality environment for reproducing a thumbnail of an overclock mode in an electronic device according to various embodiments of the disclosure.

BEST MODE FOR CARRYING OUT THE INVENTION

Figure 1:
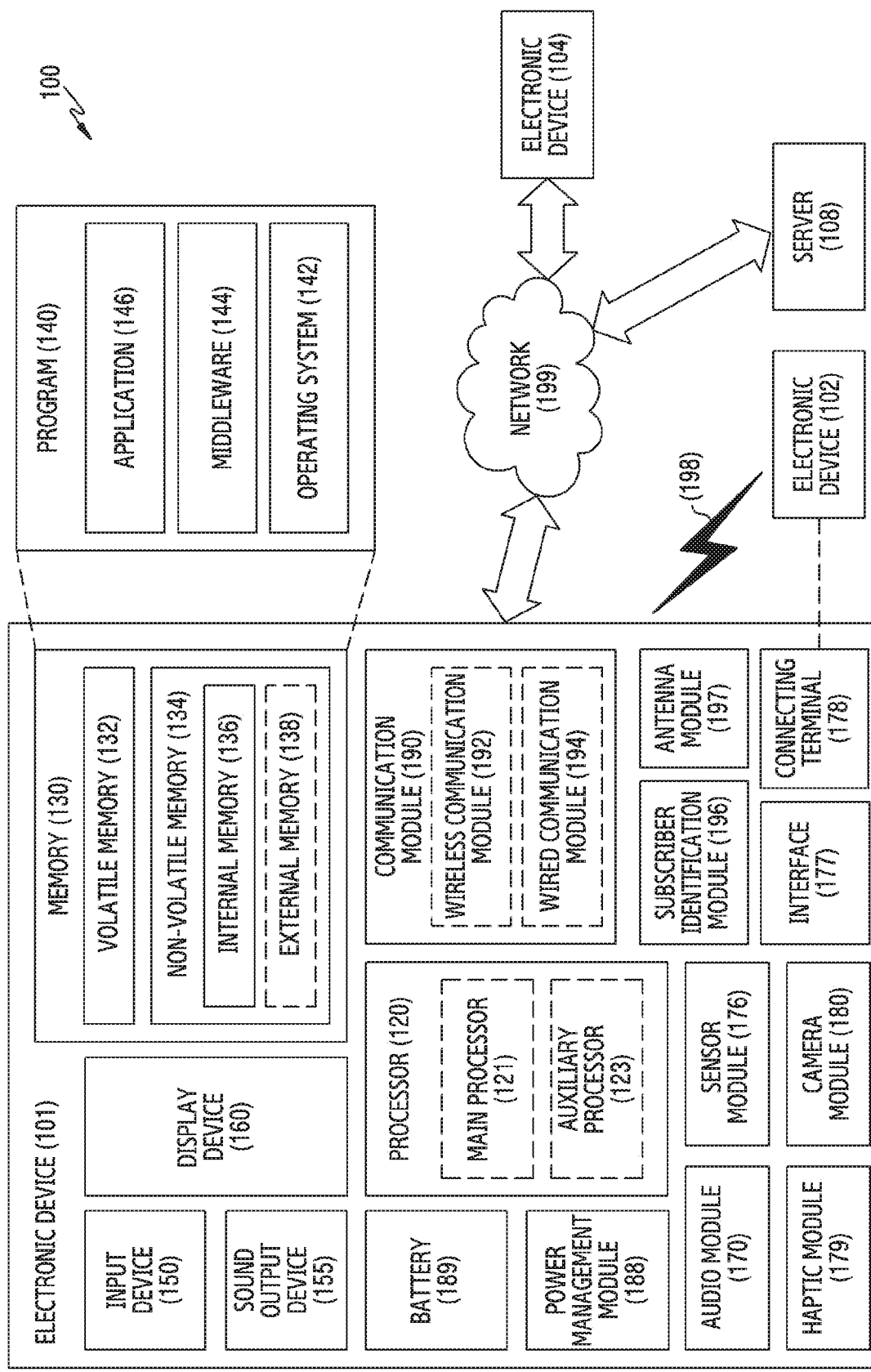
FIG. 1 is a block diagram of an electronic device 101 in a network environment 100 according to various embodiments.

Hereinafter, various embodiments of the disclosure are described with reference to the accompanying drawings. It should be appreciated that the embodiments and the terms used therein are not intended to limit the technological features set forth herein to particular embodiments and include various changes, equivalents, or replacements for a corresponding embodiment. With regard to the description of the drawings, similar reference numerals may be used to refer to similar or related elements. A singular expression may include a plural expression unless there is a contextually distinctive difference.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wired) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wired) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as BLUETOOTH, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other.

The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wired), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PLAYSTORE), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
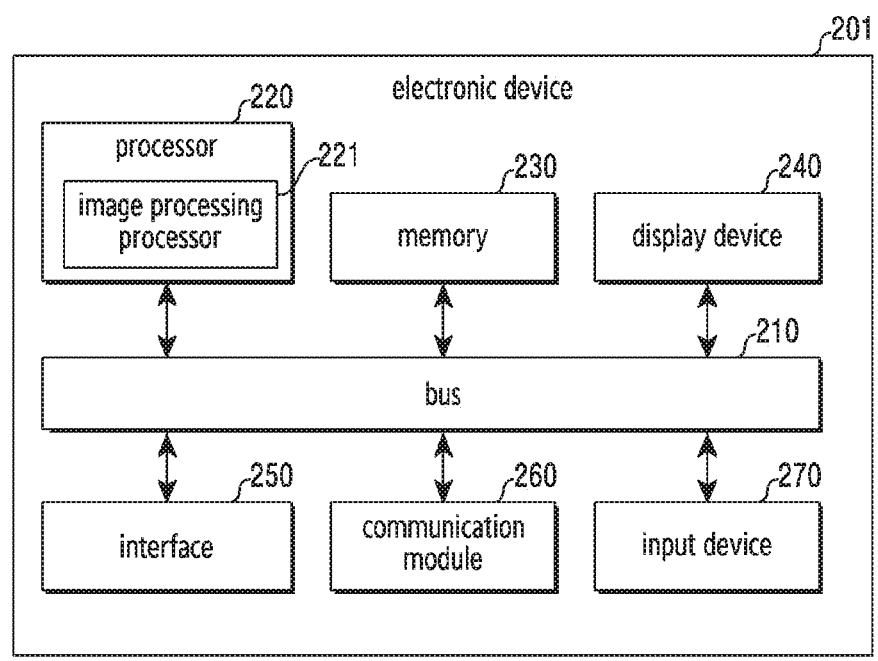
FIG. 2 is a block diagram of an electronic device 201 according to various embodiments of the disclosure.
Figure 3:
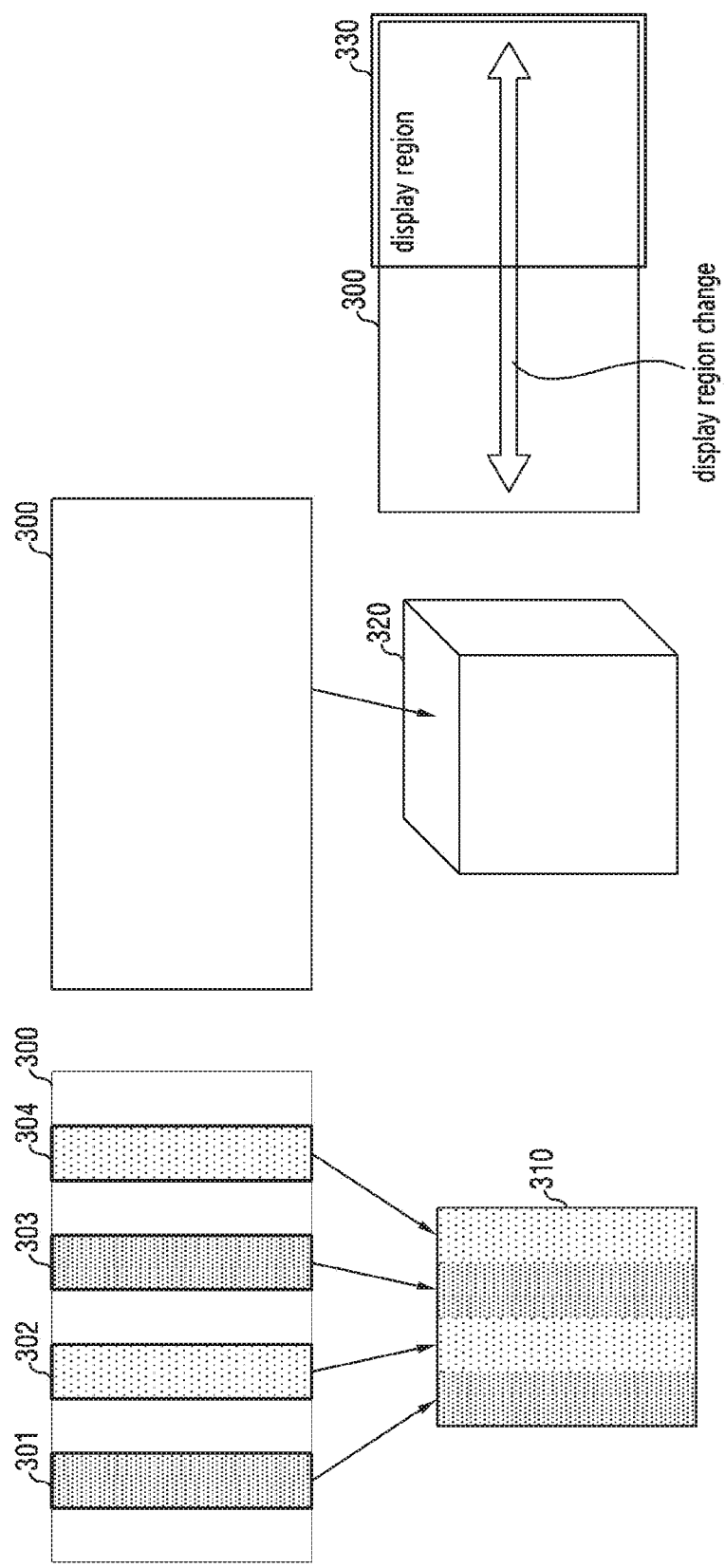
FIG. 3 illustrates various schemes used to generate a thumbnail for omnidirectional content in an electronic device according to various embodiments of the disclosure.
Figure 4:
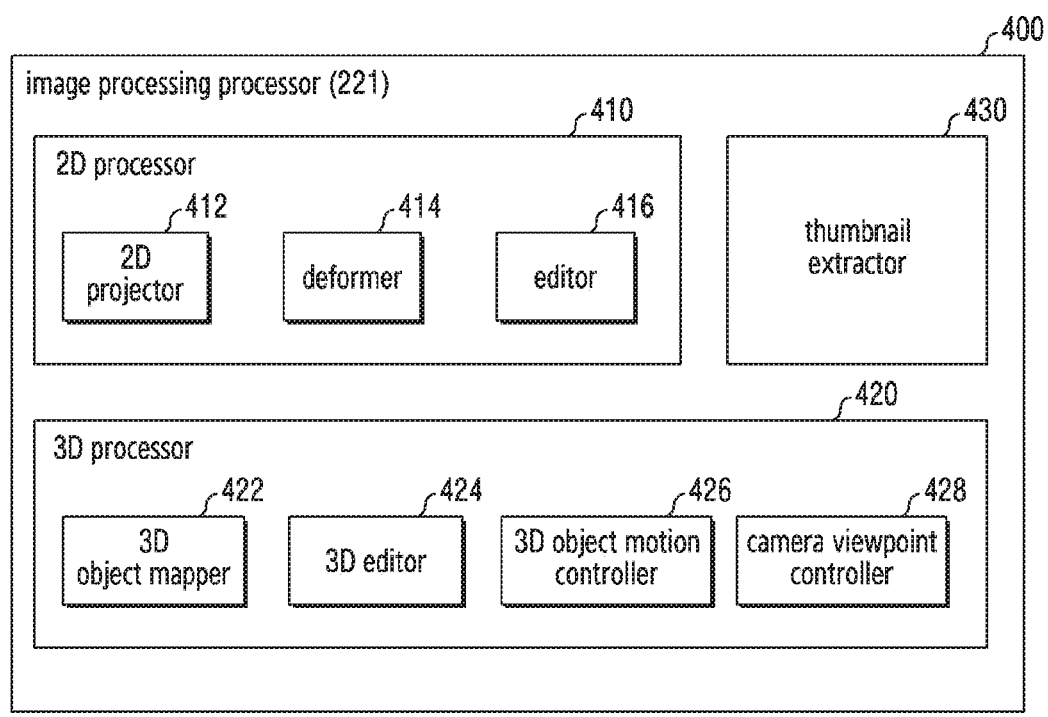
FIG. 4 is a block diagram of an image processing processor 221 according to various embodiments of the disclosure.

FIG. 2 is a block diagram of an electronic device 201 according to various embodiments of the disclosure. The electronic device 201 of FIG. 2 may be the electronic device 101 of FIG. 1. Hereinafter, some operations of the electronic device 201 will be described with reference to FIG. 3. FIG. 3 illustrates various schemes used to generate a thumbnail for omnidirectional content in an electronic device according to various embodiments of the disclosure. Hereinafter, some configurations of the electronic device 201 will be described with reference to FIG. 4. FIG. 4 is a block diagram of an image processing processor 221 according to various embodiments of the disclosure.

Referring to FIG. 2, the electronic device 201 may include a bus 210, a processor 220, a memory 230, a display device 240, an interface 250, a communication module 260, and an input device 270. In some embodiments, the electronic device 201 may omit at least one of the components or may additionally include other components.

According to various embodiments, the bus 210 may include a circuit for coupling, for example, the components 220 to 270 to each other and for delivering communication (e.g., a control message and/or data) between the aforementioned components.

According to various embodiments, the processor 220 (e.g., the processor 120) may detect a thumbnail generation event for omnidirectional content. The omnidirectional content may include at least one synthetic image having a viewing angle greater than a threshold viewing angle. For example, the omnidirectional content may be video content consisting of a plurality of synthetic images having a viewing angle greater than the threshold viewing angle or image content (e.g., a photo) consisting of one synthetic image having a viewing angle greater than the threshold viewing angle. The synthetic image may be an image synthesized from images obtained from a plurality of cameras corresponding to different directions. For example, the synthetic image may be an image synthesized from images obtained from two or more cameras having a viewing angle greater than 180 degrees. For another example, the synthetic image may be an image synthesized from images obtained from three or more cameras having a viewing angle greater than 120 degrees. For another example, the synthetic image may be an image synthesized from images obtained from four or more cameras having a viewing angle greater than 90 degrees. The synthetic image may be an omnidirectional image corresponding to a viewing angle of 360 degrees or an image having a viewing angle greater than the threshold viewing angle and less than 360 degrees. A sum of viewing angles of the plurality of cameras may be less than 360 degrees. According to an embodiment, the processor 220 may detect the thumbnail generation event on the basis of at least one of an omnidirectional content generation event and a user input for requesting for generation of a thumbnail for the omnidirectional content. The omnidirectional content generation event may be an event for generating at least one omnidirectional image by synthesizing images obtained from a plurality of cameras corresponding to different directions.

According to various embodiments, the processor 220 may determine a thumbnail mode for the omnidirectional content, in response to the detection of the thumbnail generation event for the omnidirectional content. The thumbnail mode may include, for example, a rotate mode, a planet mode, an overclock mode, a sphere mode, or a time-slice mode. The listed thumbnail modes may be identified according to a thumbnail generation scheme. A name of each thumbnail mode is referred as an example for convenience of explanations, and thus may be changed by a vender and/or a designer. According to an embodiment, the processor 220 may determine the thumbnail mode on the basis of a capture mode of the omnidirectional content. For example, the processor 220 may identify the capture mode of the omnidirectional content, and may determine a thumbnail mode related to the identified capture mode as the thumbnail mode for the omnidirectional content. The thumbnail mode related to the capture mode may be pre-set by the vendor or the designer, or may be changed by a user. The thumbnail mode related to the capture mode may be pre-set based on a feature of the capture mode. For example, a thumbnail mode related to a video capture mode may be set to the planet mode. For another example, a thumbnail mode related to a photo capture mode and/or a landscape HDR capture mode may be set to the rotate mode, and a thumbnail mode related to a time lapse capture mode and a video looping capture mode may be set to the time-slice mode. This is described as an example to facilitate understanding of the disclosure, and the thumbnail mode related to the capture mode of the disclosure is not limited thereto. According to an embodiment, the processor 220 may determine the thumbnail mode on the basis of a feature of at least one synthetic image included in the omnidirectional content. For example, the processor 220 may determine the thumbnail mode on the basis of at least one of a subject type (e.g., a person, a landscape, etc.) of at least one synthetic image included in the omnidirectional content, a movement of the subject, the number of subjects, and time information. For example, the processor 220 may set the thumbnail mode as the rotate mode when the at least one synthetic image included in the omnidirectional content is a landscape image in which a person is not included. For instance, the processor 220 may set the thumbnail mode as the rotate mode when the omnidirectional content is content obtained by capturing an ocean, a mountain, a night view, etc., or content obtained by capturing an inner space of a building. For another example, the processor 220 may set the thumbnail mode as the planet mode when a movement of a subject is detected from the at least one synthetic image included in the omnidirectional content. For instance, the processor 220 may set the thumbnail mode as the planet mode to intensively show the movement of the subject included in the omnidirectional content when the omnidirectional content is content obtained by capturing a continuously moving subject such as extreme sports, sky diving, sailing, parachuting, zip-lining, mountain biking, canoeing, horse riding, or the like. For another example, the processor 220 may set the thumbnail mode as the sphere mode when a plurality of subjects of the same type are detected from the at least one synthetic image included in the omnidirectional content. For instance, the processor 220 may be the thumbnail mode as the sphere mode when the omnidirectional content is content including more than one person. For another example, the processor 220 may set the thumbnail mode as the overclock mode when at least one synthetic image included in the omnidirectional content is content focused on a specific subject. For example, the processor 220 may set the thumbnail mode as the overclock mode to show a specific subject in a highlighted manner through a thumbnail, when the omnidirectional content is content focused on the specific subject such as a food show, a pet, a wedding, a party, a festival, a concert, etc. For another example, the processor 220 may set the thumbnail mode as the time-slice mode when the omnidirectional content is content including synthetic images corresponding to different time points.

According to various embodiments, the processor 220 may generate a thumbnail for the omnidirectional content on the basis of the determined thumbnail mode. According to an embodiment, the processor 220 may generate a thumbnail by using at least one of image segmentation, image mapping on a 3D object, and image panning as shown in FIG. 3 on the basis of the thumbnail mode. For example, the processor 220 may generate a thumbnail by using an image segmentation scheme in which an omnidirectional image 300 is divided into a plurality of segments (or regions) to generate an image including only some segments 301 to 304 among the divided plurality of segments. For another example, the processor 220 may generate a thumbnail by using a scheme of mapping the omnidirectional image 300 to a 3D object 320. For another example, the processor 220 may determine a sub-region of the omnidirectional image 300 to a display region 330, and may generate a thumbnail by using an image panning scheme so that the display region 330 is changed to another sub-region of the omnidirectional image 300 over time.

According to various embodiments, the processor 220 may deform at least one image included in the omnidirectional content, and may generate thumbnail content by using at least one deformed image on the basis of the determined thumbnail mode. According to an embodiment, the processor 220 may deform at least one image included in the omnidirectional content on the basis of a viewpoint change of a virtual camera, and may map the at least one deformed image to a 3D object. For example, the processor 220 may obtain at least one deformed image corresponding to the viewpoint change of the virtual camera by moving the at least one image included in the omnidirectional content by a reference amount in an x-axis and/or a y-axis, and may map the at least one deformed image on a 3D object such as a cube, a sphere, a half-cube, a half-cylinder, or the like. According to an embodiment, the processor 210 may obtain at least one partial image mapped to at least a sub-region of the 3D object, and may generate thumbnail content including the obtained at least one partial image. According to an embodiment, the processor 201 may generate thumbnail content by further performing at least one of editing (e.g., cutting, stitching, enlarging, reducing, etc.) on a deformed 2D image on the basis of the determined thumbnail mode, controlling on a motion of a 3D object, and controlling on a viewpoint of a virtual camera for the 3D object.

According to various embodiments, the processor 220 may include the image processing processor 221 to generate a thumbnail corresponding to each thumbnail mode. As shown in FIG. 4, the image processing processor 221 may include a 2D processor 410, a 3D processor 420, and a thumbnail extractor 420. The 2D processor 410 may include a 2D projector 412, a deformer 414, and an editor 416. The 3D processor 410 may include a 3D object mapper 422, a 3D editor 424, a 3D object motion controller 426, and a camera viewpoint controller 428.

According to various embodiments, the 2D projector 412 may obtain a 2D image by projecting at least one synthetic image included in omnidirectional content onto a 2D space.

According to various embodiments, the deformer 414 may deform the 2D image on the basis of a viewpoint change of a virtual camera. According to an embodiment, the deformer 414 may obtain at least one deformed image corresponding to the viewpoint change of the virtual camera by moving the 2D image by a reference amount in an x-axis and/or a y-axis. The reference amount implies a movement amount for the x-axis and/or the y-axis, and may be set and/or changed by a vender and/or a designer. For example, the deformer 414 may move a 2D image by a first reference amount in the y-axis to obtain a deformed image. For instance, the deformer 414 may move the 2D image in the y-axis to obtain the deformed image in a shape in which a partial image at a lower end of the 2D image is moved to an upper end thereof. The deformer 414 may move an image deformed due to a y-axis movement by a second reference amount in the x-axis. The deformer 414 may obtain a plurality of images corresponding to a movement state of the deformed image, while moving the deformed image by the second reference amount in the x-axis. For example, the plurality of images may represent different movement states for the x-axis of the deformed image. For instance, if the second reference amount corresponds to n×m pixels, a first image among the plurality of images may represent a state of being moved by m pixels in the x-axis, a second image may represent a state of being moved by 2 m pixels in the x-axis, and an n-th image may represent a state of being moved by n×m pixels. The deformer 414 may move the 2D image in the x-axis to obtain a deformed image in a shape in which a partial image at a right side of the 2D image is moved to a left side.

According to various embodiments, the editor 416 may cut an image of a sub-region from at least one 2D image. The editor 416 may stitch (or synthesize) the cut image of the sub-region to a sub-region of at least one different 2D image, or may stitch (or synthesize) the cut image of the sub-region to an image of at least one different sub-region. The editor 416 may enlarge or reduce the entirety of the 2D image, the cut image of the sub-region, or the stitched image.

According to various embodiments, the editor 416 may detect at least one region satisfying a specific condition among all regions of the image, and may cut at least one detected region. For example, the editor 416 may cut at least one sub-region among the all regions of the image on the basis of at least one of whether there is a movement of a subject in the image, a size of the subject, whether a face of a person subject can be recognized, whether a sound of the subject is generated, and a pattern change (e.g., a color change). For instance, the editor 416 may cut at least one region in which a subject generating a sound exists among the all regions of the image. For another example, the editor 416 may cut at least one region in which a person whose face can be recognized exists among the all regions of the image. For another example, the editor 416 may cut at least one region in which a moving subject exists among the all regions of the image. According to an embodiment, when the number of regions satisfying a specific condition is greater than the pre-set number of regions among the all regions of the image, the editor 416 may cut regions corresponding to the pre-set number on the basis of at least one of a size of a subject, a volume of a sound generated from the subject, and a level of movement of the subject. For example, when the number of subjects generating a sound in the image is greater than the pre-set number of regions, the editor 416 may select subjects corresponding to the pre-set number of regions in a descending order of a sound volume, and may cut each of regions in which the selected subjects exist. According to an embodiment, when the number of regions satisfying a specific condition is less than the pre-set number of regions among the all regions of the image, the editor 416 may cut at least one sub-region among regions not satisfying the specific condition. For example, if the number of regions in which a movement of subject is detected is 2 and the pre-set number of regions is 4 among the all regions of the image, two regions may be selected and cut among regions in which the subject does not exist among the all regions of the image. Each of the cut regions may have the same size.

According to various embodiments, the 3D object mapper 422 may map at least one 2D image or at least one deformed 2D image to a 3D object. For example, the 3D object mapper 422 may map the 2D image to the 3D object such as a cube, a sphere, a half-cube, a half-cylinder, or the like. When a plurality of deformed images are to be mapped to the 3D object, the 3D object mapper 422 may generate a 3D object to which different deformed images are mapped over time.

According to various embodiments, the 3D editor 424 may cut at least one sub-region from a 3D object to which an image is mapped. The 3D editor 424 may generate the 3D object by connecting the cut at least one sub-region to at least one different sub-region.

According to various embodiments, the 3D object motion controller 426 may control a motion of the 3D object to which the image is mapped. For example, the 3D object motion controller 426 may rotate the 3D object in an x-axis, a y-axis, and/or a z-axis.

According to various embodiments, the camera viewpoint controller 428 may control a viewpoint of a virtual camera for the 3D object to which the image is mapped. According to an embodiment, the virtual camera viewpoint controller 428 may change the viewpoint of the virtual camera on the basis of a thumbnail mode. For example, when the thumbnail mode is a rotate mode or a sphere mode, the camera viewpoint controller 428 may set the viewpoint of the virtual camera to a first direction (e.g., a front view direction). For another example, when the thumbnail mode is an overclock mode, the camera viewpoint controller 428 may set the viewpoint of the virtual camera to a second direction (e.g., a top view direction). For another example, when the thumbnail mode is a planet mode, the camera viewpoint controller 428 may set the viewpoint of the virtual camera to a third direction (e.g., a bottom view direction). The viewpoint of the camera depending on the thumbnail mode may be pre-set by a vendor and/or a designer.

According to various embodiments, the thumbnail extractor 430 may obtain at least one partial image for the 3D object on the basis of the viewpoint of the virtual camera. According to an embodiment, the thumbnail extractor 430 may obtain a partial image mapped to a first region of the 3D object corresponding to the viewpoint of the virtual camera among all regions of the 3D object to which at least one image is mapped. According to an embodiment, while a motion of the 3D object is changed by using a virtual camera of which the viewpoint is fixed, the thumbnail extractor 420 may continuously obtain the partial image mapped to the first region of the 3D object corresponding to the fixed viewpoint of the virtual camera. The first region of the 3D object corresponding to the viewpoint of the virtual camera may be changed due to a motion change of the 3D object. For instance, the thumbnail extractor 430 may obtain a plurality of partial images as if the 3D object is captured by using the virtual camera of which the viewpoint is fixed in a specific direction while a motion of the 3D object to which the image is mapped is changed. According to an embodiment, the thumbnail extractor 420 may continuously obtain the partial image mapped to the first region of the 3D object corresponding to the fixed viewpoint of the virtual camera by using the virtual camera of which the viewpoint is fixed. When a plurality of images are mapped to the 3D object, the partial image mapped to the first region of the 3D object corresponding to the viewpoint of the virtual camera may be changed over time. For instance, the thumbnail extractor 430 may obtain a plurality of partial images as if the 3D object is captured by using the virtual camera of which the viewpoint is fixed in a specific direction while the image mapped to the 3D object is changed over time. According to an embodiment, the thumbnail extractor 430 may continuously obtain the partial image mapped to the first region of the 3D object corresponding to the viewpoint of the virtual camera, changed by the camera viewpoint controller 428. The first region of the 3D object corresponding to the viewpoint of the virtual camera may be changed due to a viewpoint change of the camera. For example, the thumbnail extractor 430 may obtain a plurality of partial images as if a fixed 3D object is captured by changing the viewpoint of the virtual camera. The thumbnail extractor 430 may generate a thumbnail including the obtained at least one partial image. The thumbnail extractor 430 may generate two identical thumbnails including at least one partial image. The thumbnail extractor 430 may set one of the two thumbnails to a thumbnail for a first environment (e.g., a mobile environment), and may set the other thumbnail to a thumbnail for a second environment (e.g., a Virtual Reality (VR) environment). The thumbnail extractor 430 may add depth information to the thumbnail for the second environment, thereby changing to a thumbnail corresponding to the second environment.

According to various embodiments, the processor 220 may detect that a thumbnail display event occurs for omnidirectional content, and may display a thumbnail for the omnidirectional content to the display device 240 in response to the occurrence of the thumbnail display event. According to an embodiment, the processor 220 may display the thumbnail by classifying the stored omnidirectional content for each capture mode. According to various embodiments, the processor 220 may detect that a thumbnail reproduction event occurs for the omnidirectional content, and may perform panning and/or reproducing on the omnidirectional content in response to the occurrence of the thumbnail reproduction event. According to an embodiment, the processor 220 may determine whether the thumbnail reproduction event occurs on the basis of a user input (e.g., a touch input or a gaze) for the thumbnail of the omnidirectional content. For example, upon detecting the touch input for the thumbnail of the omnidirectional content, the processor 220 may determine that the thumbnail reproduction event has occurred. According to an embodiment, the processor 220 may determine whether the thumbnail reproduction event occurs on the basis of a location of a thumbnail display region of the omnidirectional content and/or a size of the display region. For example, when the thumbnail of the omnidirectional content displayed to the display device 240 occupies a region greater than or equal to a specific size among all display regions of the display device 240, the processor 220 may determine that the thumbnail reproduction event has occurred. When the thumbnail of the omnidirectional content displayed to the display device 240 occupies a region smaller than a specific size among the all display regions of the display device 240, the processor 220 may determine that the thumbnail reproduction event has not occurred. For another example, in a state where the thumbnail of the omnidirectional content displayed to the display device 240 occupies a region greater than or equal to a specific size among the all display regions of the display device 240, when all portions of the thumbnail are displayed to the display device 240, the processor 220 may determine that the thumbnail production event has occurred. When at least a portion of the thumbnail of the omnidirectional content is not displayed to the display device 240, the processor 220 may determine that the thumbnail reproduction event does not occur. According to an embodiment, in response to the occurrence of the thumbnail reproduction event, the processor 220 may enlarge the entirety of the thumbnail or at least a sub-region of the thumbnail and thereafter may provide control such that the at least the sub-region of the thumbnail is subjected to panning and/or provide control such that the thumbnail is reproduced.

According to various embodiments, when the thumbnail mode is a time-slice mode, the processor 220 may obtain a plurality of image segments from a plurality of images included in the omnidirectional content, and may generate thumbnail content including the obtained image segments. The plurality of images may respectively correspond to different time points, and the image segments obtained respectively from the plurality of images may correspond to different locations. For example, the processor 220 may obtain an image segment of a first location from a first image of a first time point included in the omnidirectional content, and may obtain an image segment of a second location from a second image of a second time point. According to an embodiment, the processor 220 may determine the number of image segments on the basis of a total playtime of the omnidirectional content, and may select images corresponding to the number of image segments determined from the plurality of images included in the omnidirectional content. The processor 220 may obtain image segments corresponding to different locations from the selected images, and may generate thumbnail content in a shape in which the obtained image segments are stitched. According to an embodiment, the number of image segments may be determined on the basis of at least one of the total playtime of the omnidirectional content and the maximum number of segments. The maximum number of segments may be set on the basis of a size and/or area of a region in which a user touch input is possible.

According to various embodiments, the processor 220 may control a playback time point of the omnidirectional content on the basis of the thumbnail of the time-slice mode. For example, when a playback time point change event or a playback time point search event occurs while the omnidirectional content is reproduced, the processor 220 may display the thumbnail image of the time-slice mode. Upon detecting a user input for any one image segment from the thumbnail image of the time-slice mode, the processor 220 may change a playback time point to a time point corresponding to the image segment.

According to various embodiments, the memory 230 (e.g., the memory 130) may store the omnidirectional content and the thumbnail for the omnidirectional content. The thumbnail for the omnidirectional content may include a thumbnail for a first environment (e.g., a mobile environment) and a thumbnail for a second environment (e.g., a VR environment). According to an embodiment, the memory 230 may include a thumbnail corresponding to each of the thumbnail modes for the omnidirectional content.

According to various embodiments, the display device 240 (e.g., the display device 160) may display at least one thumbnail. According to an embodiment, the display device 240 may perform 3D displaying. According to an embodiment, the display device 240 may detect a user input for the display device 240 on the basis of a touch circuit, and may determine control commands or data related to a thumbnail corresponding to the user input. According to an embodiment, the display device 240 may display at least some thumbnails on the basis of an image panning scheme under the control of the processor 220.

According to various embodiments, the interface 250 (e.g., the interface 177) and/or the communication module 260 (e.g., the communication module 190) may transmit and receive a signal and/or data with respect to a different electronic device coupled in a wireless or wired manner. According to an embodiment, the interface 250 and/or the communication module 260 may receive omnidirectional content from the different electronic device coupled in the wireless or wired manner.

According to various embodiments, the input device 270 (e.g., the input device 150) may receive control commands or data related to generating of thumbnail content, displaying of the thumbnail content, or reproducing of the thumbnail content from the outside (e.g., a user) of the electronic device 201.

According to various embodiments of the disclosure, an electronic device may include a display device, at least one processor, and a memory coupled to the processor. The memory may store instructions, when executed, causing the processor to obtain at least one deformed image corresponding to a viewpoint change on the basis of an image included in content in response to detection of a thumbnail generation event for the content, map the obtained at least one deformed image to a 3D object, obtain at least one partial image including at least a portion of the image mapped to the 3D object, generate thumbnail content including the obtained at least one partial image, and display the thumbnail content by controlling the display device.

According to various embodiments of the disclosure, the instructions may cause the processor to obtain at least one partial image including at least a portion of an image mapped to the 3D object by controlling at least one of a viewpoint of a virtual camera and a motion of the 3D object.

According to various embodiments of the disclosure, the instructions may cause the processor to move an image included in the content in any one of an x-axis direction and a y-axis direction in order to obtain at least one deformed image corresponding to the viewpoint change.

According to various embodiments of the disclosure, the instructions may cause the processor to obtain at least one image segment from the obtained at least one deformed image, synthesize the obtained image segment to a first region of the at least one partial image, and generate thumbnail content including a partial image to which the first region is synthesized.

According to various embodiments of the disclosure, the instructions may cause the processor to obtain a plurality of image segments from an image mapped to the 3D object, generate different 3D objects including the obtained plurality of image segments, obtain at least one partial image including at least a portion of an image mapped to the different 3D object by controlling the viewpoint of the virtual camera, and generate thumbnail content including the obtained at least one partial image.

According to various embodiments of the disclosure, the instructions may cause the processor to obtain the plurality of image segments on the basis of at least one of a movement of a subject, whether a sound of the subject is generated, whether a face of the subject can be recognized, and a pattern change.

According to various embodiments of the disclosure, the instructions may cause the processor to determine a thumbnail mode on the basis of a capture mode of the content and an image feature, and generate the thumbnail content on the basis of the determined thumbnail mode.

According to various embodiments of the disclosure, the instructions may cause the processor to change a thumbnail mode of the content on the basis of a first user input, and generate the thumbnail content on the basis of the changed thumbnail mode.

According to various embodiments of the disclosure, the instructions may cause the processor to reproduce the thumbnail content on the basis of at least one of a second user input, a size of the displayed thumbnail content, and whether the thumbnail content is entirely displayed.

According to various embodiments of the disclosure, the instructions may cause the processor to add depth information to the thumbnail content.

According to various embodiments of the disclosure, an electronic device may include a display device, at least one processor, and a memory coupled with the processor. The memory may store instructions, when executed, causing the processor to obtain a plurality of images included in the content in response to detection of a thumbnail generation event for the content, obtain a plurality of image segments from the plurality of images, generate thumbnail content including the obtained plurality of image segments, and display the thumbnail content by controlling the display device.

According to various embodiments of the disclosure, the instructions may cause the processor to determine the number of image segments on the basis of a playtime of the content, and obtain the plurality of images on the basis of the determined number of image segments.

According to various embodiments of the disclosure, the plurality of image segments may correspond to different regions.

According to various embodiments of the disclosure, the instructions may cause the processor to detect a user input for selecting a first image segment among a plurality of image segments included in the thumbnail content, and reproduce the content on the basis of a time point corresponding to the first image segment in response to detection of the user input.

According to various embodiments of the disclosure, the instructions may cause the processor to detect an event for changing a playback time point for the content is reproduced, display the thumbnail content in response to detection of the event for changing the playback time point, detect a user input for selecting a first image segment among a plurality of image segments included in the thumbnail content, change a playback time point of the content to a time point corresponding to the first image segment in response to detection of the user input, and reproduce the content on the basis of the changed playback time point.

Figure 5:
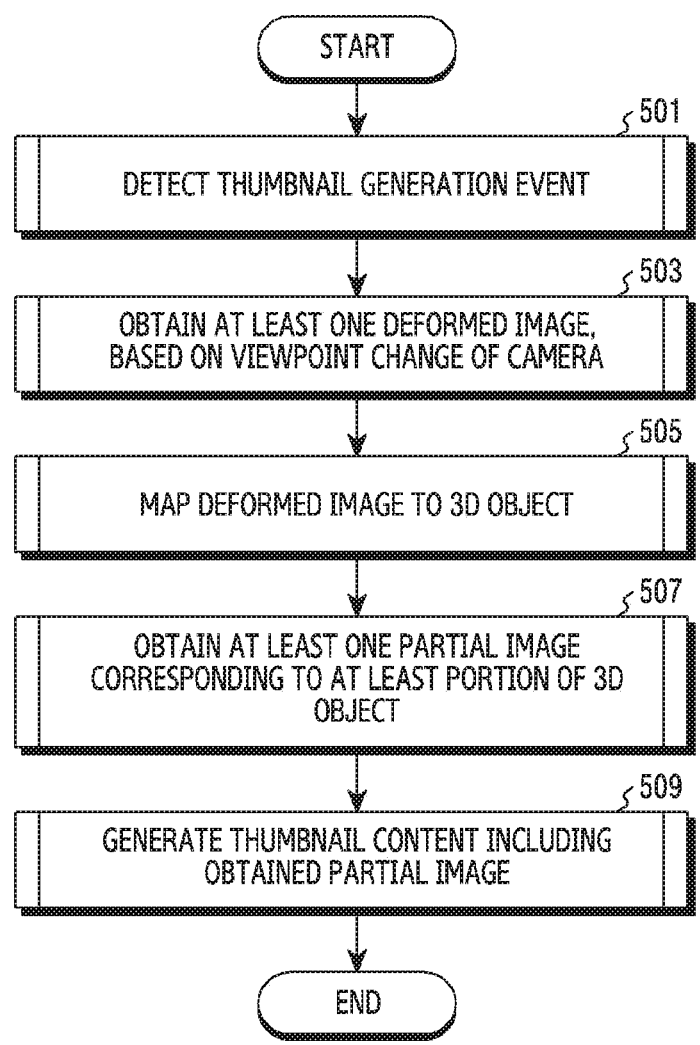
FIG. 5 is a flowchart for generating a thumbnail for omnidirectional content in an electronic device according to various embodiments of the disclosure.

FIG. 5 is a flowchart for generating a thumbnail for omnidirectional content in an electronic device according to various embodiments of the disclosure. In the following embodiments, each of operations may be performed in sequence, but it is not necessarily performed in sequence. For example, the order of each of the operations may be changed, and at least two operations may be performed in parallel. Herein, the electronic device may be the electronic device 101 of FIG. 1 and/or the electronic device 201 of FIG. 2.

Referring to FIG. 5, in step 501, the electronic device may detect a thumbnail generation event. According to an embodiment, a processor (e.g., the processor 220) of the electronic device may detect the thumbnail generation event on the basis of at least one of an event for generating omnidirectional content and a user input requesting for generation of a thumbnail for the omnidirectional content. The event for generating the omnidirectional content may be an event for generating at least one omnidirectional content by synthesizing images obtained from a plurality of cameras corresponding to different directions.

In operation 503, the electronic device may deform at least one image on the basis of a viewpoint change of a virtual camera. According to an embodiment, the processor (e.g., the processor 220) of the electronic device may deform at least one image included in the omnidirectional content on the basis of the viewpoint change of the virtual camera. The processor (e.g., the processor 220) of the electronic device may obtain a deformed image corresponding to the viewpoint change of the virtual camera, by moving the at least one image included in the omnidirectional content by a reference amount in an x-axis and/or a y-axis. For example, the processor (e.g., the processor 220) of the electronic device may move a 2D image by a first reference amount in the y-axis to obtain at least one deformed image. For another example, the processor (e.g., the processor 220) of the electronic device may deform the 2D image by moving it by a first reference amount in the y-axis and thereafter may move the deformed image caused by the movement in the y-axis by a second reference amount in the x-axis. The processor (e.g., the processor 220) of the electronic device may obtain a plurality of images corresponding to a movement state of the deformed image while moving the deformed image by the second reference amount in the x-axis. For example, the processor (e.g., the processor 220) of the electronic device may obtain at least one deformed image as described in the deformer 414 of FIG. 4.

In operation 505, the electronic device may map at least one deformed image to a 3D object. The 3D object may be a cube, a sphere, a half-cube, a half-cylinder, or the like. However, various embodiments of the disclosure may be equally applied to various 3D objects without being limited to the listed 3D objects. When a plurality of deformed images are to be mapped to the 3D object, the processor (e.g., the processor 220) of the electronic device may generate 3D objects to which different deformed images are mapped over time.

In operation 507, the electronic device may obtain at least one partial image corresponding to at least a portion (or a sub-region) of the 3D object. According to an embodiment, the processor (e.g., the processor 220) of the electronic device may obtain at least one partial image corresponding to at least a sub-region of the 3D object, on the basis of a camera viewpoint control for the 3D object and/or a motion control of the 3D object. For example, the processor (e.g., the processor 220) of the electronic device may set the viewpoint of the virtual camera for the 3D object to a viewpoint corresponding to a first direction, and may obtain an image mapped to a sub-region of the 3D object corresponding to the set viewpoint of the virtual camera. For another example, the processor (e.g., the processor 220) of the electronic device may set the viewpoint of the virtual camera for the 3D object to the viewpoint corresponding to the first direction, and may obtain an image mapped to a sub-region of the 3D object corresponding to the viewpoint of the virtual camera for a specific time. When a plurality of images are mapped to the 3D object, a partial image mapped to a first region of the 3D object corresponding to the viewpoint of the virtual camera may be changed over time. For another example, the processor (e.g., the processor 220) of the electronic device may obtain a plurality of partial images including at least a portion of an image mapped to the 3D object by using a virtual camera of which a viewpoint is fixed in a specific direction, while changing a 3D motion for a specific time. For another example, the processor (e.g., the processor 220) of the electronic device may obtain a plurality of partial images including at least a portion of an image mapped to the 3D object while changing a viewpoint of a virtual camera for the 3D object for a specific time.

In operation 509, the electronic device may generate thumbnail content including the obtained at least one partial image. For example, upon obtaining the plurality of partial images in operation 507, the processor (e.g., the processor 220) of the electronic device may generate video-type thumbnail content including the plurality of partial images. The processor (e.g., the processor 220) of the electronic device may register and store the generated thumbnail content as a thumbnail for corresponding omnidirectional content. According to an embodiment, the processor (e.g., the processor 220) of the electronic device may register the generated thumbnail content as thumbnail content for a first environment (e.g., a mobile environment), and may additionally generate the same content. The processor (e.g., the processor 220) of the electronic device may add length information to the additionally generated content and change it to 3D content. The processor (e.g., the processor 220) of the electronic device may register 3D content, to which depth information is added, as thumbnail content for a second environment (e.g., a VR environment).

Figure 6:
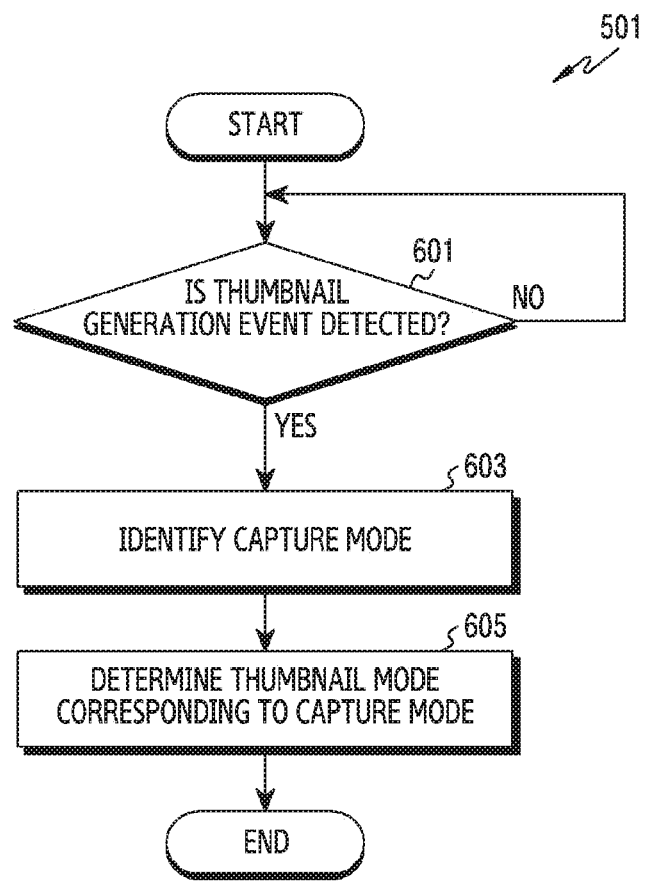
FIG. 6 is a flowchart for determining a thumbnail mode in an electronic device according to various embodiments of the disclosure.
Figure 7:
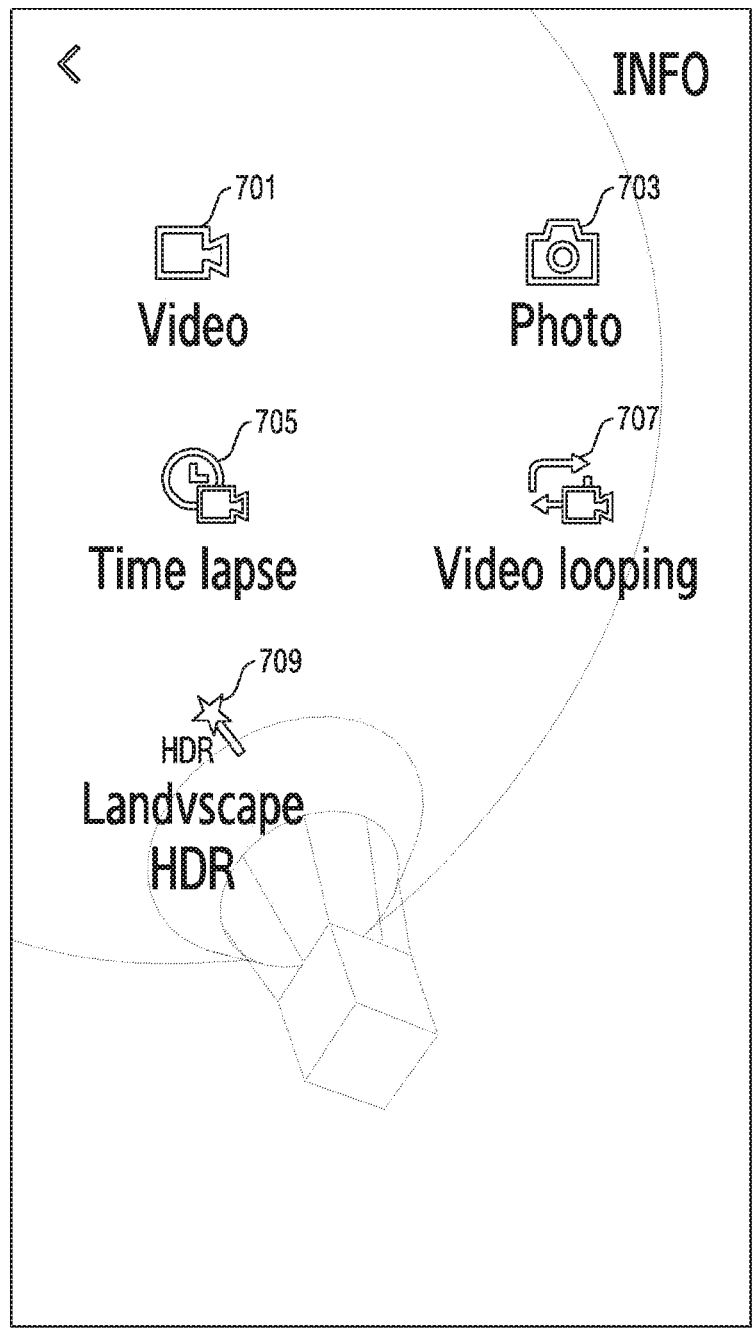
FIG. 7 illustrates a user interface representing a capture mode for omnidirectional content according to various embodiments of the disclosure.

FIG. 6 is a flowchart for determining a thumbnail mode in an electronic device according to various embodiments of the disclosure. The operation 501 of FIG. 5 is specified in the following description. In the following embodiments, each of operations may be performed in sequence, but it is not necessarily performed in sequence. For example, the order of each of the operations may be changed, and at least two operations may be performed in parallel. Herein, the electronic device may be the electronic device 101 of FIG. 1 and/or the electronic device 201 of FIG. 2. Hereinafter, the operation of FIG. 6 will be described with reference to FIG. 7, FIG. 8A, FIG. 8B, FIG. 8C, FIG. 8D, and FIG. 8E. FIG. 7 illustrates a user interface representing a capture mode for omnidirectional content according to various embodiments of the disclosure. FIG. 8A to FIG. 8E illustrate thumbnail modes according to various embodiments of the disclosure.

Referring to FIG. 6, in operation 601, an electronic device may determine whether a thumbnail generation event occurs. For example, a processor (e.g., the processor 220) of the electronic device may determine whether the thumbnail generation event occurs in the same manner as described in the operation 501 of FIG. 5.

Upon generating the thumbnail generation event, in operation 601, the electronic device may identify a capture mode for omnidirectional content. According to an embodiment, the processor (e.g., the processor 220) may identify the capture mode on the basis of metadata of the omnidirectional content. For example, the metadata of the omnidirectional content may include the capture mode of the omnidirectional content. According to an embodiment, the processor (e.g., the processor 220) of the electronic device may receive capture mode information for the omnidirectional content from an external electronic device coupled to the electronic device in a wireless or wired manner. According to an embodiment, the capture mode information may be received at a time point of obtaining the omnidirectional content from the external electronic device coupled in a wireless or wired manner or at a time point of obtaining at least one image constituting the omnidirectional content from the external electronic device. For example, as shown in FIG. 7, the capture mode for the omnidirectional content may include a video capture mode 701, a photo capture mode 703, a time lapse capture module 705, a video looping capture module 707, or a landscape HDP capture mode 709. The processor (e.g., the processor 220) of the electronic device may identify which capture mode is used to capture the omnidirectional content among the listed capture modes. The listed capture modes are for exemplary purposes, and various embodiments of the disclosure may be equally applied to various capture modes without being limited to the listed capture modes.

Figure 8A:
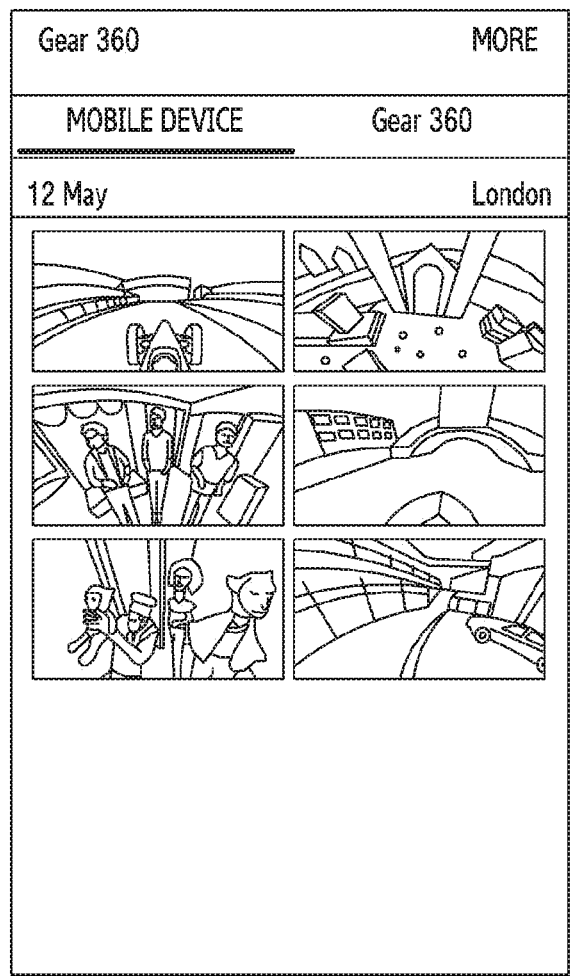
FIG. 8A illustrates thumbnail modes according to various embodiments of the disclosure.
Figure 8B:
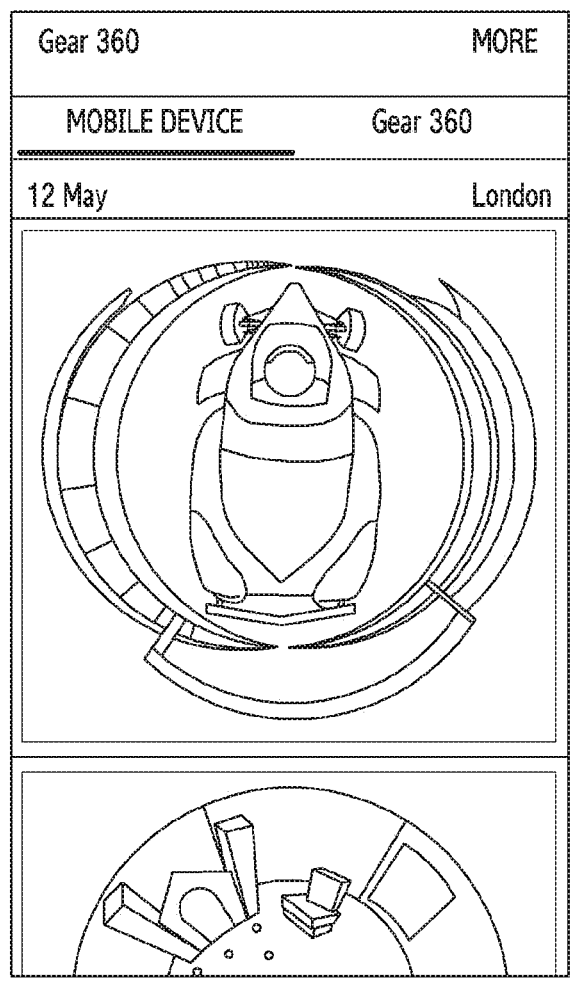
FIG. 8B illustrates thumbnail modes according to various embodiments of the disclosure.
Figure 8C:
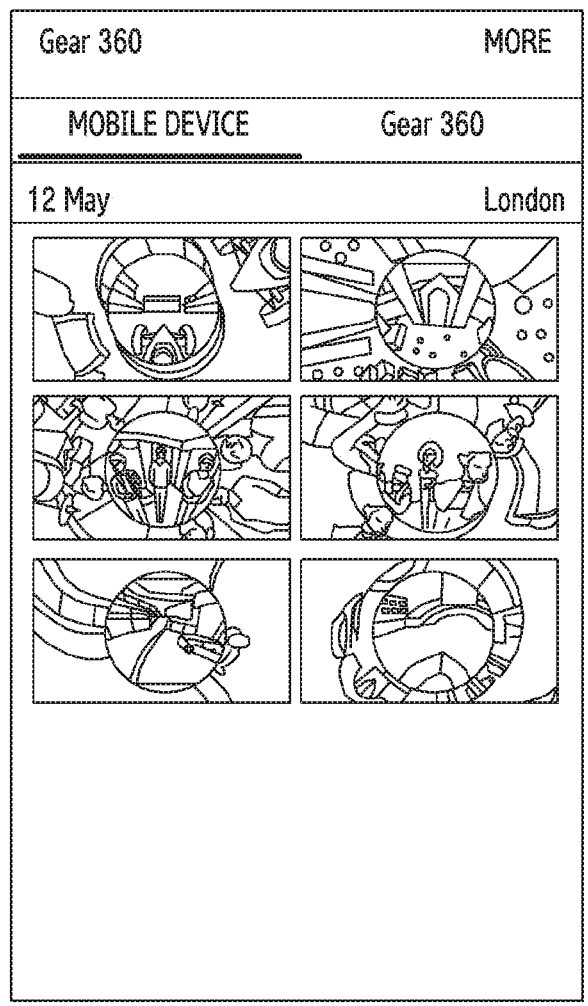
FIG. 8C illustrates thumbnail modes according to various embodiments of the disclosure.
Figure 8D:
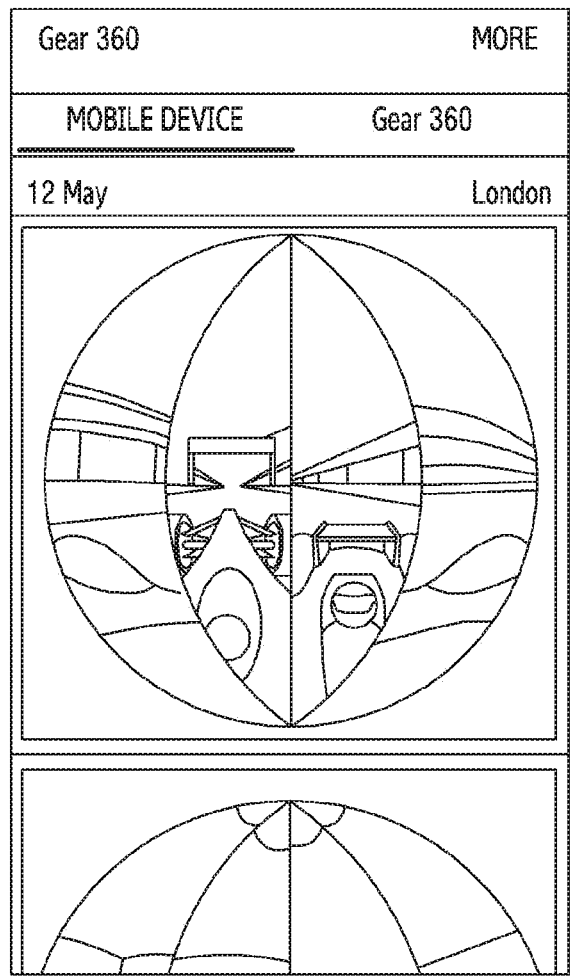
FIG. 8D illustrates thumbnail modes according to various embodiments of the disclosure.
Figure 8E:
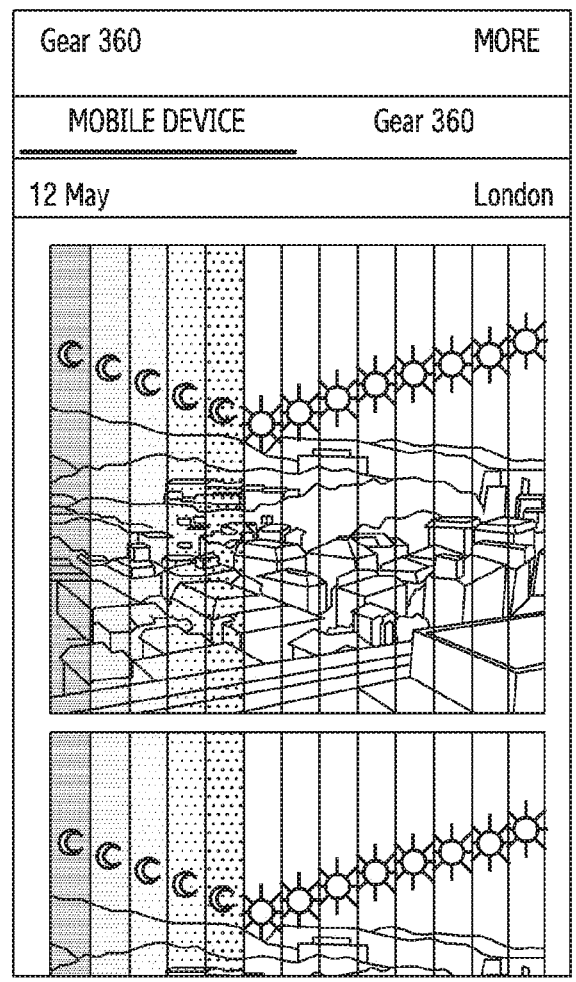
FIG. 8E illustrates thumbnail modes according to various embodiments of the disclosure.

In operation 603, the electronic device may determine a thumbnail mode corresponding to the capture mode. According to an embodiment, the processor (e.g., the processor 220) of the electronic device may determine the thumbnail mode related to the capture mode. The thumbnail mode related to each capture mode may be pre-set by a vendor or a designer, and may be changed by a user. The thumbnail mode related to the capture mode may be pre-set on the basis of a feature of the capture mode. The thumbnail mode may include, for example, a rotate mode represented as shown in FIG. 8A, a planet mode represented as shown in FIG. 8B, an overclock mode represented as shown in FIG. 8C, a sphere mode represented as shown in FIG. 8D, or a time-slice mode represented as shown in FIG. 8E. For example, when the capture mode of the omnidirectional content is "video", the processor (e.g., the processor 220) of the electronic device may determine the thumbnail mode as the planet mode. For another example, when the capture mode of the omnidirectional content is "photo", the processor 220 may determine the thumbnail mode as the rotate mode. For another example, when the capture mode of the omnidirectional content is "time lapse", the processor (e.g., the processor 220) of the electronic device may determine the thumbnail mode as the time-slice mode. For another example, when the capture mode of the omnidirectional content is "video looping", the processor (e.g., the processor 220) of the electronic device may determine the thumbnail mode as the time-slice mode. For another example, when the capture mode of the omnidirectional content is "landscape HDR", the processor (e.g., the processor 220) of the electronic device may determine the thumbnail mode as the rotate mode.

A scheme in which an electronic device determines a thumbnail mode on the basis of a capture mode of omnidirectional content is described above with reference to FIG. 6. However, according to various embodiments of the disclosure, the electronic device may determine the thumbnail mode on the basis of a feature of at least one image included in the omnidirectional content.

Figure 9A:
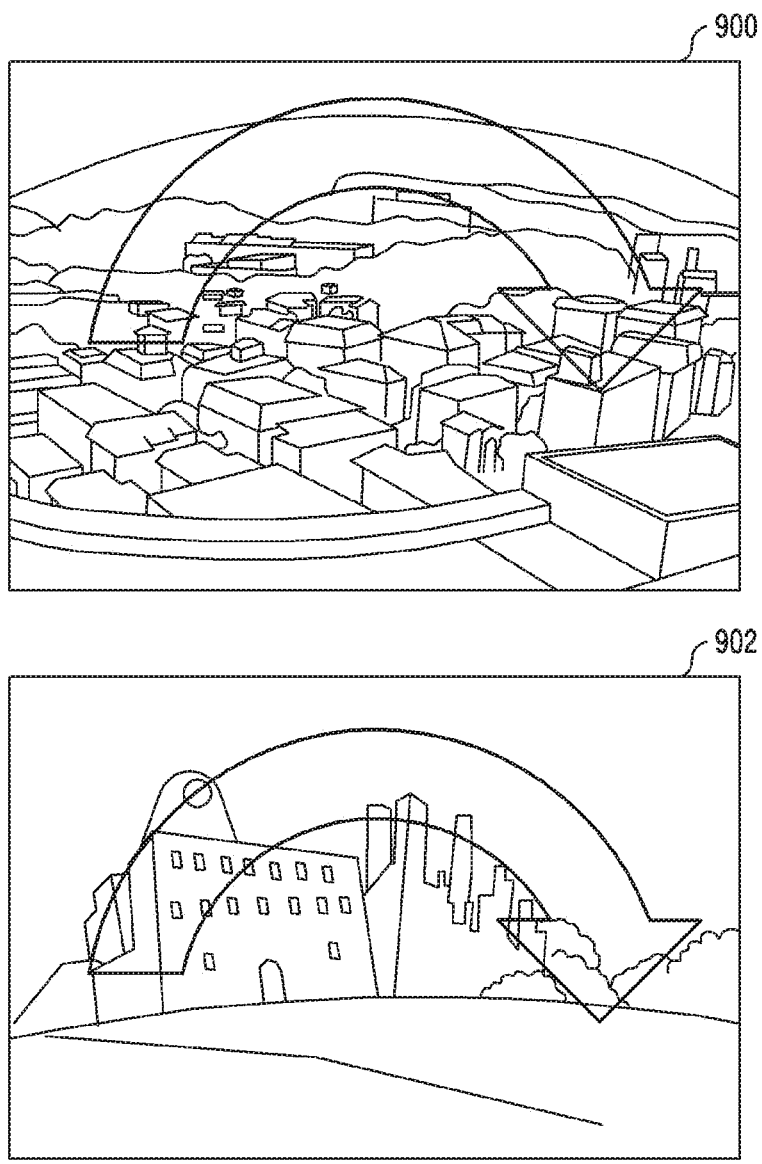
FIG. 9A illustrates thumbnail modes determined based on an image feature of omnidirectional content in an electronic device according to various embodiments of the disclosure.
Figure 9B:
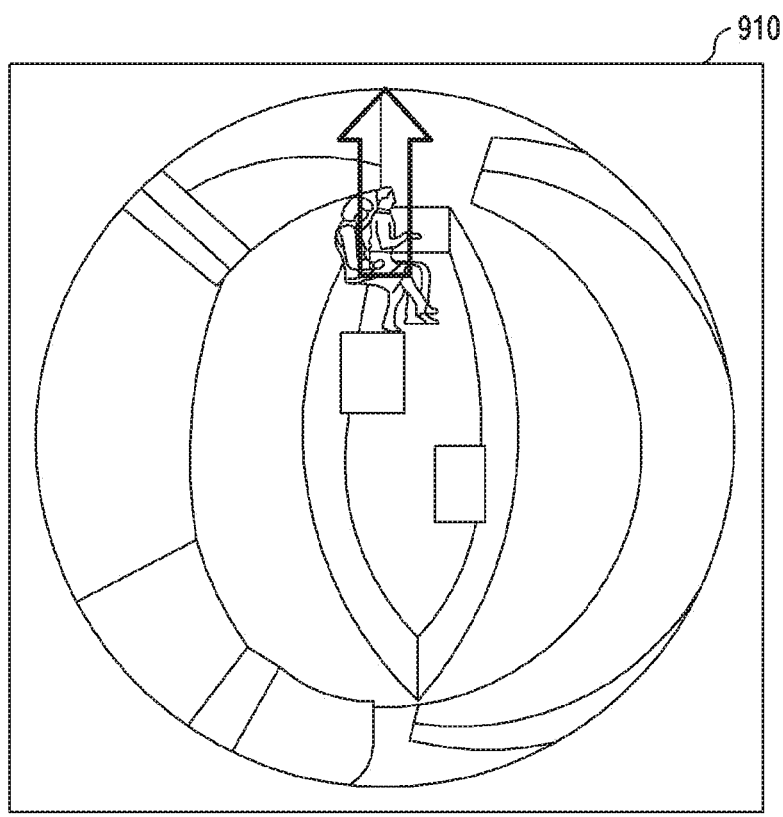
FIG. 9B illustrates thumbnail modes determined based on an image feature of omnidirectional content in an electronic device according to various embodiments of the disclosure.
Figure 9C:
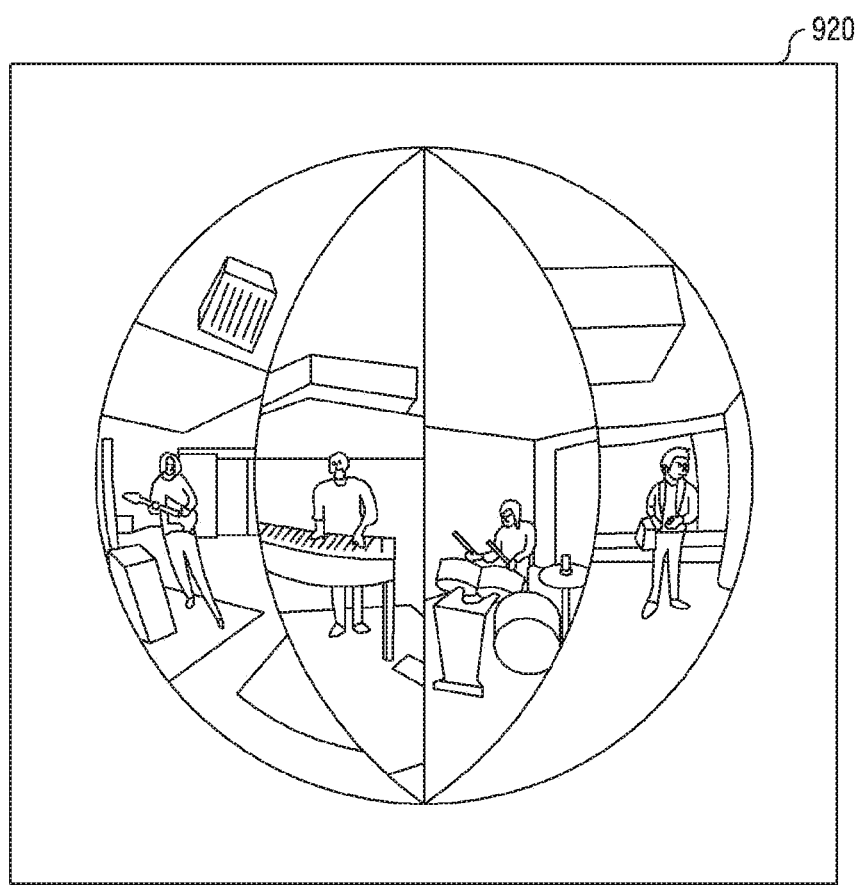
FIG. 9C illustrates thumbnail modes determined based on an image feature of omnidirectional content in an electronic device according to various embodiments of the disclosure.

FIG. 9A to FIG. 9D illustrate thumbnail modes determined based on an image feature of omnidirectional content in an electronic device according to various embodiments of the disclosure. Referring to FIG. 9A to FIG. 9D, a processor (e.g., the processor 220) of the electronic device may determine a thumbnail mode on the basis of at least one of a subject type (e.g., a person, a landscape, etc.) of at least one synthetic image included in the omnidirectional content, a movement of a subject, the number of subjects, and time information. According to an embodiment, the processor (e.g., the processor 220) of the electronic device may determine the thumbnail mode for the omnidirectional content captured mainly focusing on a landscape not including a person, as a rotate mode. For example, the processor (e.g., the processor 220) of the electronic device may determine the thumbnail mode as the rotate mode, so that thumbnails 900 and 902 as shown in FIG. 9A are generated for content obtained by capturing an ocean landscape or content obtained by capturing a night view. According to an embodiment, the processor (e.g., the processor 220) of the electronic device may determine the thumbnail mode for the omnidirectional content including a moving subject as a planet mode. For example, the processor (e.g., the processor 220) of the electronic device may determine the thumbnail mode as the planet mode so that a thumbnail 910 as shown in FIG. 9B is generated for content obtained by capturing a moving boat such as a canoe. According to an embodiment, the processor (e.g., the processor 220) of the electronic device may determine the thumbnail mode for the omnidirectional content including subjects of the same type as a sphere mode. For example, the processor (e.g., the processor 220) of the electronic device may determine the thumbnail mode as the sphere mode so that a thumbnail 920 as shown in FIG. 9C is generated for content obtained by capturing more than one person. According to an embodiment, in case of content focused on a specific subject, the processor (e.g., the processor 220) of the electronic device may determine the thumbnail mode as an overclock mode. For example, the processor (e.g., the processor 220) of the electronic device may determine the thumbnail mode as the overclock mode so that thumbnails 940 and 942 as shown in FIG. 9D are generated for content captured mainly focusing on a specific person. According to an embodiment, the processor (e.g., the processor 220) of the electronic device may determine the thumbnail mode for content captured over time, as a time-slice mode.

Figure 10:
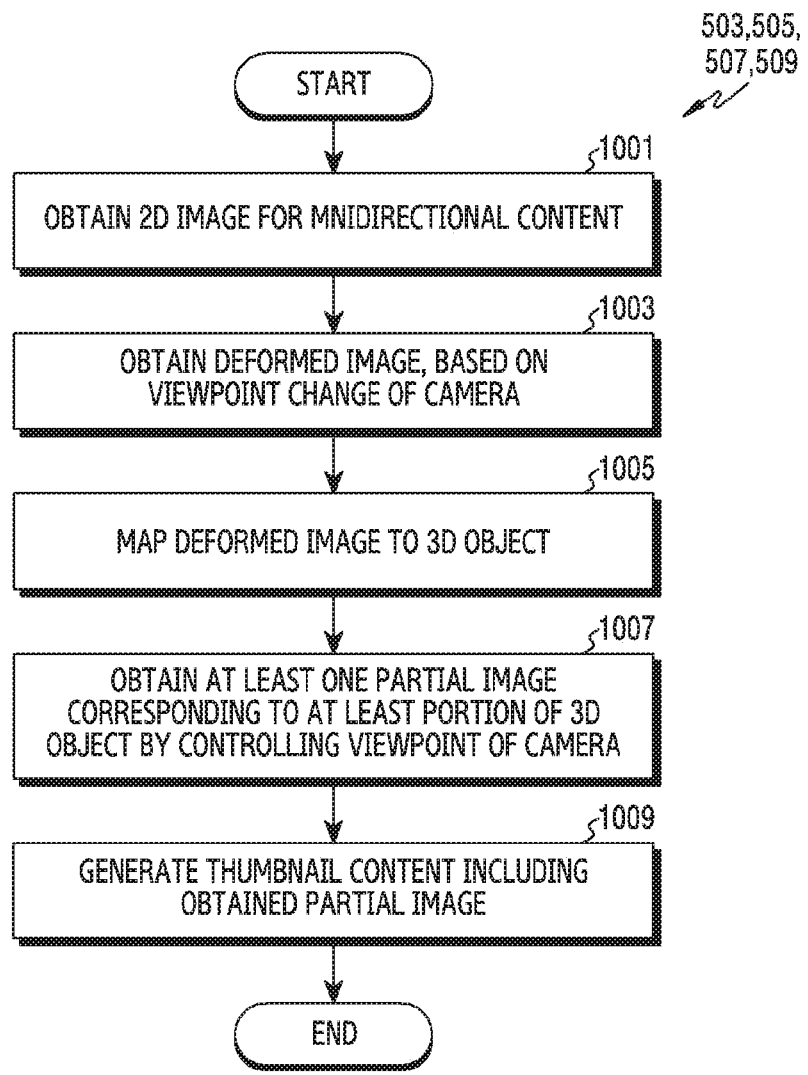
FIG. 10 is a flowchart for generating a thumbnail of a rotate mode in an electronic device according to various embodiments of the disclosure.

FIG. 10 is a flowchart for generating a thumbnail of a rotate mode in an electronic device according to various embodiments of the disclosure. The operations 503, 505, 507, and 509 of FIG. 5 are specified in the following description. In the following embodiments, each of operations may be performed in sequence, but it is not necessarily performed in sequence. For example, the order of each of the operations may be changed, and at least two operations may be performed in parallel. Herein, the electronic device may be the electronic device 101 of FIG. 1 and/or the electronic device 201 of FIG. 2. Hereinafter, the operation of FIG. 10 will be described with reference to FIG. 11 and FIG. 12.

Figure 11:
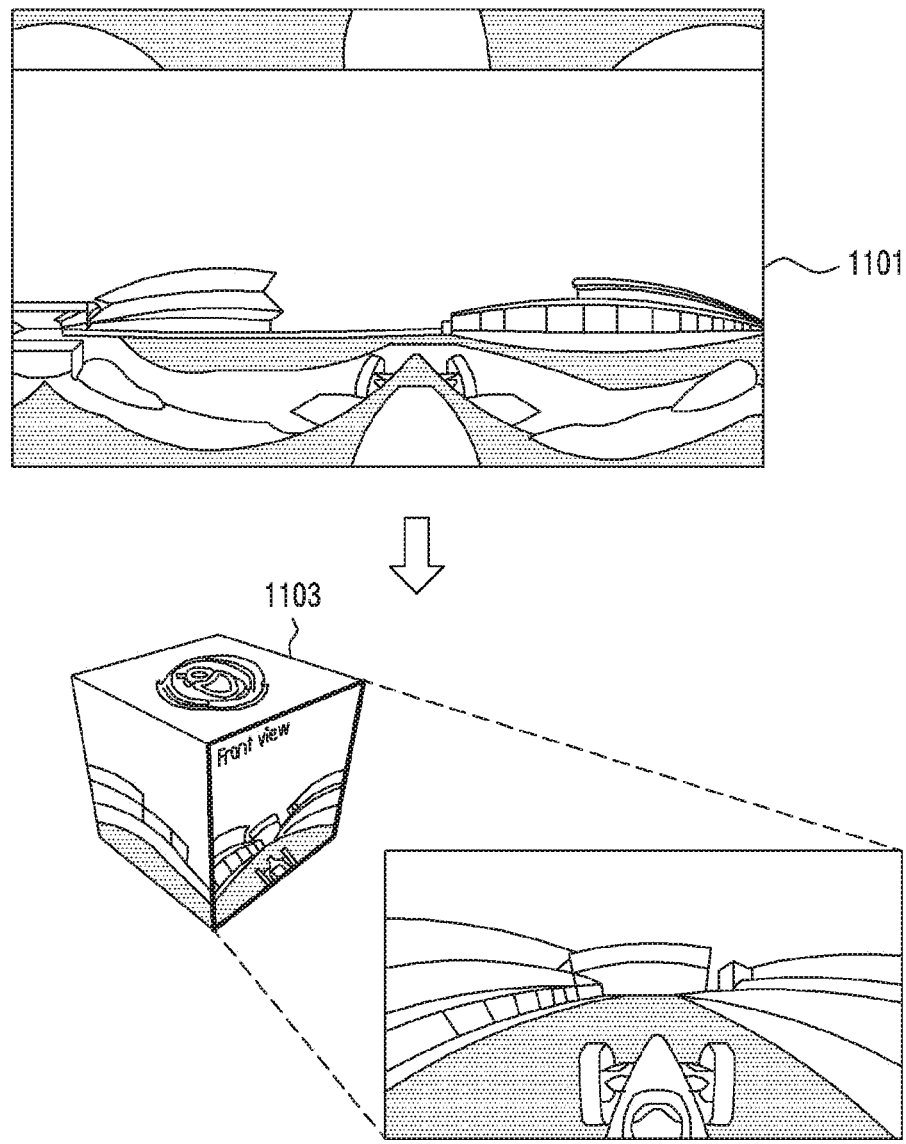
FIG. 11 is a drawing illustrating an example of processing an image to generate a thumbnail of a rotate mode in an electronic device according to various embodiments of the disclosure.
Figure 12:
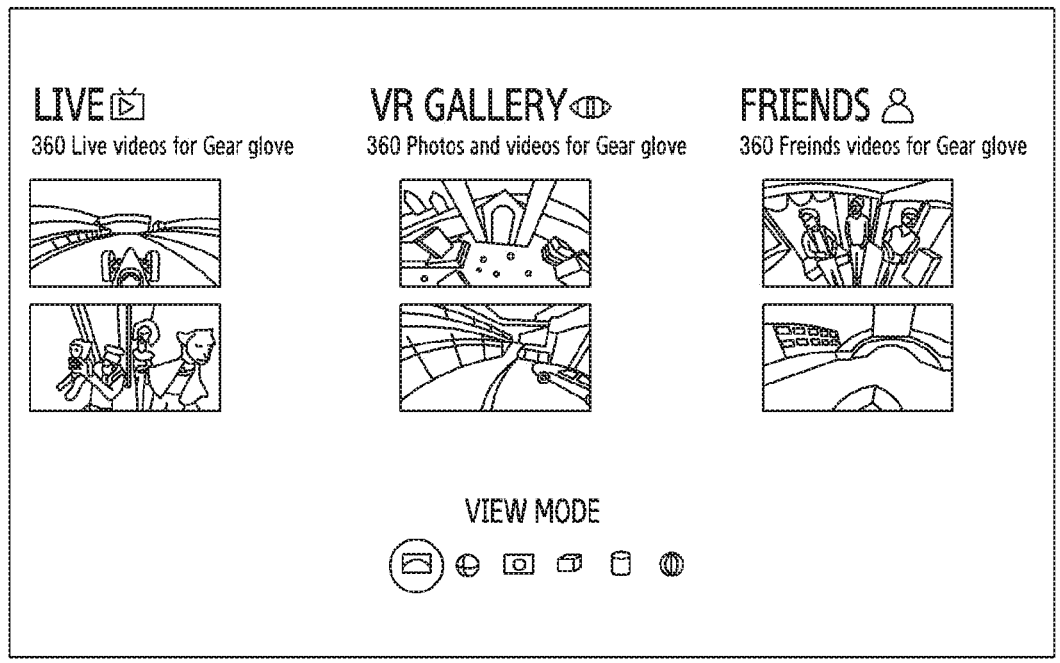
FIG. 12 illustrates a user interface of a virtual reality environment including thumbnail content of a rotate mode in an electronic device according to various embodiments of the disclosure.

FIG. 11 is a drawing illustrating an example of processing an image to generate a thumbnail of a rotate mode in an electronic device according to various embodiments of the disclosure. FIG. 12 illustrates a user interface of a virtual reality environment including thumbnail content of a rotate mode in an electronic device according to various embodiments of the disclosure.

Referring to FIG. 10, in operation 1001, the electronic device may obtain a 2D image for omnidirectional content. According to an embodiment, a processor (e.g., the processor 220) of the electronic device may obtain at least one 2D image from at least one synthetic image included in the omnidirectional content. For example, the processor (e.g., the processor 220) of the electronic device may obtain the 2D image by projecting at least one 3D synthetic image onto a 2D space. For another example, the processor (e.g., the processor 220) of the electronic device may obtain at least one 2D synthetic image as a 2D image for omnidirectional content.

In operation 1003, the electronic device may obtain a deformed image on the basis of a viewpoint change of a camera. According to an embodiment, the processor (e.g., the processor 220) of the electronic device may deform an image in the same manner as described in the operation 503. For example, the processor (e.g., the processor 220) of the electronic device may move an image by a first reference amount in a y-axis to obtain a deformed image 1101 as shown in FIG. 11. According to an embodiment, the processor (e.g., the processor 220) of the electronic device may further move the deformed image 110 by a second reference amount additionally in an x-axis. The processor (e.g., the processor 220) of the electronic device may obtain a plurality of images corresponding to a movement state of the deformed image, while moving the deformed image by the second reference amount in the x-axis.

In operation 1005, the electronic device may map at least one deformed image to a 3D object. According to an embodiment, the processor (e.g., the processor 220) of the electronic device may map the deformed image to the 3D object as described in the operation 505 of FIG. 5. For example, the processor (e.g., the processor 220) of the electronic device may map at least one deformed image to a 3D object of a cube shape to obtain a 3D object 1103 to which an image is mapped as shown in FIG. 11. According to an embodiment, when a plurality of deformed images are obtained, the processor (e.g., the processor 220) of the electronic device may generate 3D objects to which different deformed images are mapped over time.

In operation 1007, the electronic device may control a viewpoint of a camera to obtain at least one partial image corresponding to at least a portion of the 3D object. According to an embodiment, the processor (e.g., the processor 220) of the electronic device may set a viewpoint of a virtual camera to a front view direction, and may obtain a partial image mapped to a sub-region of the 3D object corresponding to the front view direction for a specific time. When a plurality of images are mapped to the 3D object, a partial image mapped to a first region of the 3D object corresponding to the front view direction may be changed over time. The processor (e.g., the processor 220) of the electronic device may obtain a plurality of partial images which are changed over time for a specific time.

In operation 1009, the electronic device may generate thumbnail content including the obtained partial image. For example, upon obtaining the plurality of partial images, the processor (e.g., the processor 220) of the electronic device may generate video-type thumbnail content including the plurality of partial images. The processor (e.g., the processor 220) of the electronic device may register and store the generated thumbnail content as a thumbnail for corresponding omnidirectional content. According to an embodiment, the processor (e.g., the processor 220) of the electronic device may register the generated thumbnail content as thumbnail content for a first environment (e.g., a mobile environment), and may additionally generate the same content. The processor (e.g., the processor 220) of the electronic device may add length information to the additionally generated content and change it to 3D content. The processor (e.g., the processor 220) of the electronic device may register 3D thumbnail content, to which depth information is added, as thumbnail content for a second environment (e.g., a VR environment). The 3D thumbnail content, to which the depth information is added, in a rotate mode may be displayed as shown in FIG. 12 in a VR environment.

Figure 13:
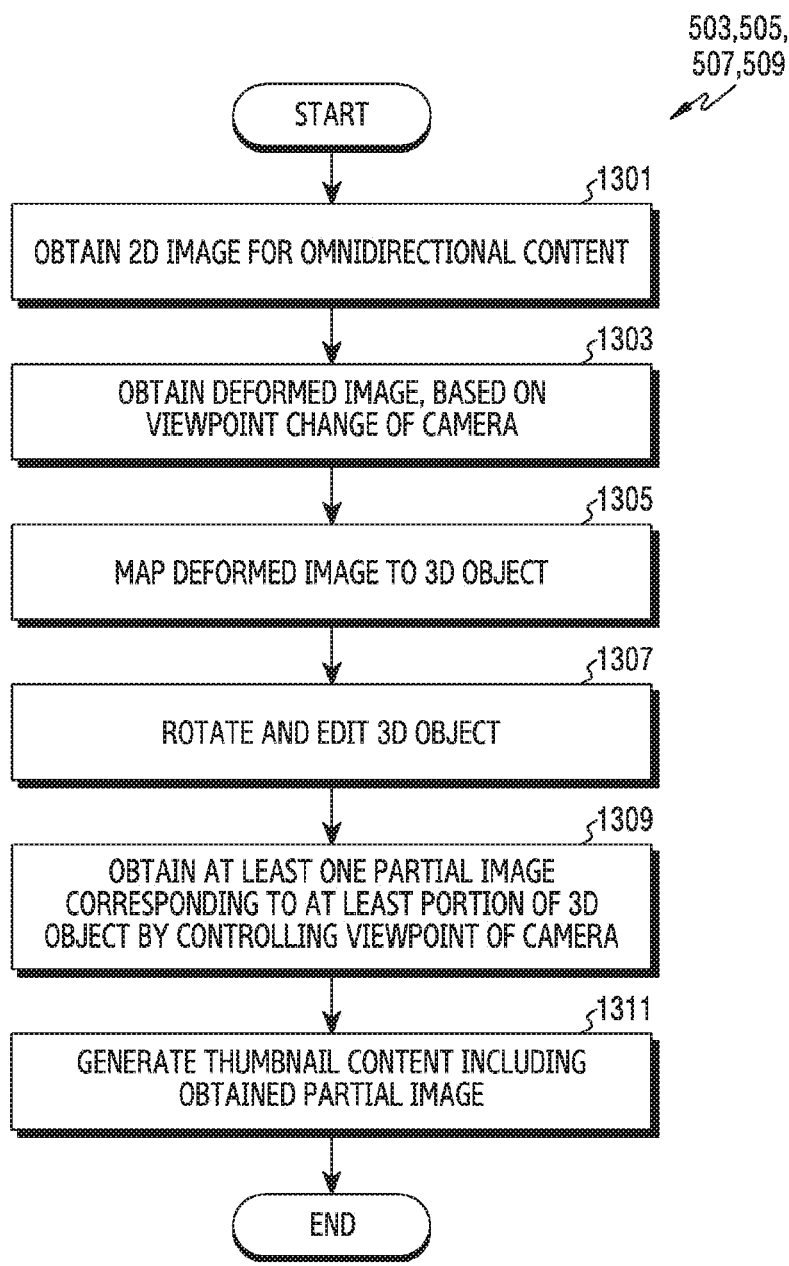
FIG. 13 is a flowchart for generating a thumbnail of a planet mode in an electronic device according to various embodiments of the disclosure.
Figure 14:
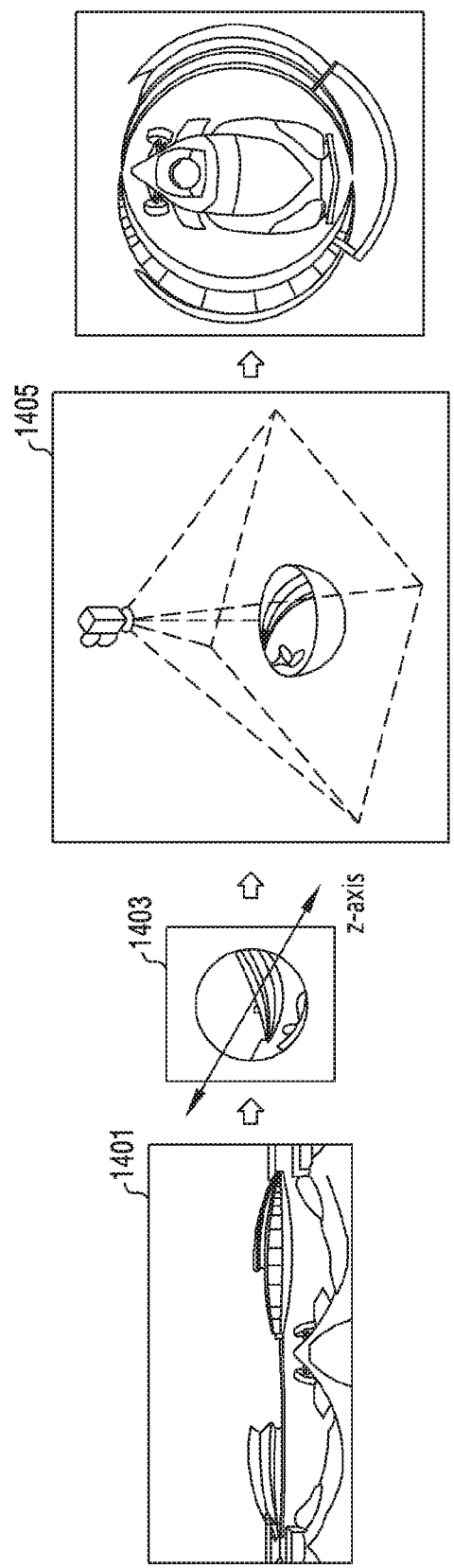
FIG. 14 is a drawing illustrating an example of processing an image to generate a thumbnail of a planet mode in an electronic device according to various embodiments of the disclosure.
Figure 15:
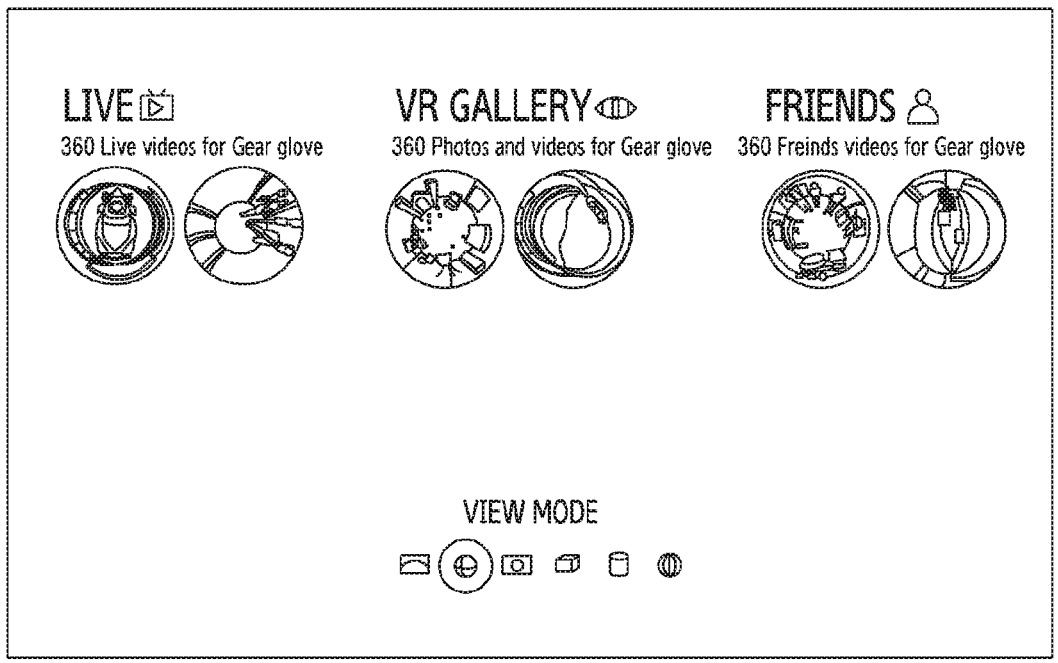
FIG. 15 illustrates a user interface of a virtual reality environment including thumbnail content of a planet mode in an electronic device according to various embodiments of the disclosure.

FIG. 13 is a flowchart for generating a thumbnail of a planet mode in an electronic device according to various embodiments of the disclosure. The operations 503, 505, 507, and 509 of FIG. 5 are specified in the following description. In the following embodiments, each of operations may be performed in sequence, but it is not necessarily performed in sequence. For example, the order of each of the operations may be changed, and at least two operations may be performed in parallel. Herein, the electronic device may be the electronic device 101 of FIG. 1 and/or the electronic device 201 of FIG. 2. Hereinafter, the operation of FIG. 13 will be described with reference to FIG. 14 and FIG. 15. FIG. 14 is a drawing illustrating an example of processing an image to generate a thumbnail of a planet mode in an electronic device according to various embodiments of the disclosure. FIG. 15 illustrates a user interface of a virtual reality environment including thumbnail content of a planet mode in an electronic device according to various embodiments of the disclosure.

Referring to FIG. 13, in operation 1301, the electronic device may obtain a 2D image for omnidirectional content. According to an embodiment, a processor (e.g., the processor 220) of the electronic device may obtain the 2D image in the same manner as described in the operation 1001 of FIG. 10.

In operation 1303, the electronic device may obtain a deformed image on the basis of a viewpoint change of a camera. For example, the processor (e.g., the processor 220) of the electronic device may move an image by a first reference amount in a y-axis to obtain the deformed image corresponding to the viewpoint change of the camera. According to various embodiments, an operation of obtaining the deformed image may be omitted. In this case, the processor (e.g., the processor 220) of the electronic device may map a 2D image to a 3D object in operation 1305 described below.

In operation 1305, the electronic device may map at least one deformed image to the 3D object. According to an embodiment, the processor (e.g., the processor 220) of the electronic device may map the deformed image to the 3D object as described in the operation 505 of FIG. 5. For example, as shown in FIG. 14, the processor (e.g., the processor 220) of the electronic device may obtain a 3D object 1403 to which an image is mapped, by mapping at least one deformed image or a 2D image 1401 to an inner surface of a sphere.

In operation 1307, the electronic device may rotate and edit the 3D object. According to an embodiment, the processor (e.g., the processor 220) of the electronic device may rotate the 3D object in an x, y, and/or z-axis. For example, the processor (e.g., the processor 220) of the electronic device may obtain a 3D object which rotates by a third reference amount for a specific time. According to an embodiment, the processor (e.g., the processor 220) of the electronic device may cut at least a portion of the 3D object which rotates for a specific time. For example, as shown in FIG. 14, the processor (e.g., the processor 220) of the electronic device may control the 3D object 1403 to rotate in the z-axis, and thereafter crop an upper side of the 3D object which rotates in the z-axis, thereby obtaining a semi-spherical 3D object 1405 which rotates in the z-axis for a specific time.

In operation 1309, the electronic device may control a viewpoint of a camera to obtain at least one partial image corresponding to at least a portion of the 3D object. According to an embodiment, the processor (e.g., the processor 220) of the electronic device may set the viewpoint of the virtual camera to a bottom view direction, and may obtain a partial image mapped to a sub-region of a 3D object corresponding to the bottom view direction for a specific time. Since the 3D object rotates in the z-axis for a specific time, the processor (e.g., the processor 220) of the electronic device may capture the 3D object in the bottom view direction for the specific time to obtain a plurality of partial images which are changed over time.

In operation 1311, the electronic device may generate thumbnail content including the obtained partial image. For example, upon obtaining the plurality of partial images, the processor (e.g., the processor 220) of the electronic device may generate video-type thumbnail content including the plurality of partial images. The processor (e.g., the processor 220) of the electronic device may register and store the generated thumbnail content as a thumbnail for corresponding omnidirectional content. According to an embodiment, the processor (e.g., the processor 220) of the electronic device may register the generated thumbnail content as thumbnail content for a first environment (e.g., a mobile environment), and may additionally generate the same content. The processor (e.g., the processor 220) of the electronic device may add length information to the additionally generated content and change it to 3D content. The processor (e.g., the processor 220) of the electronic device may register 3D thumbnail content, to which depth information is added, as thumbnail content for a second environment (e.g., a VR environment). The 3D thumbnail content, to which the depth information is added, in the planet mode may be displayed as shown in FIG. 15 in a VR environment.

Figure 16:
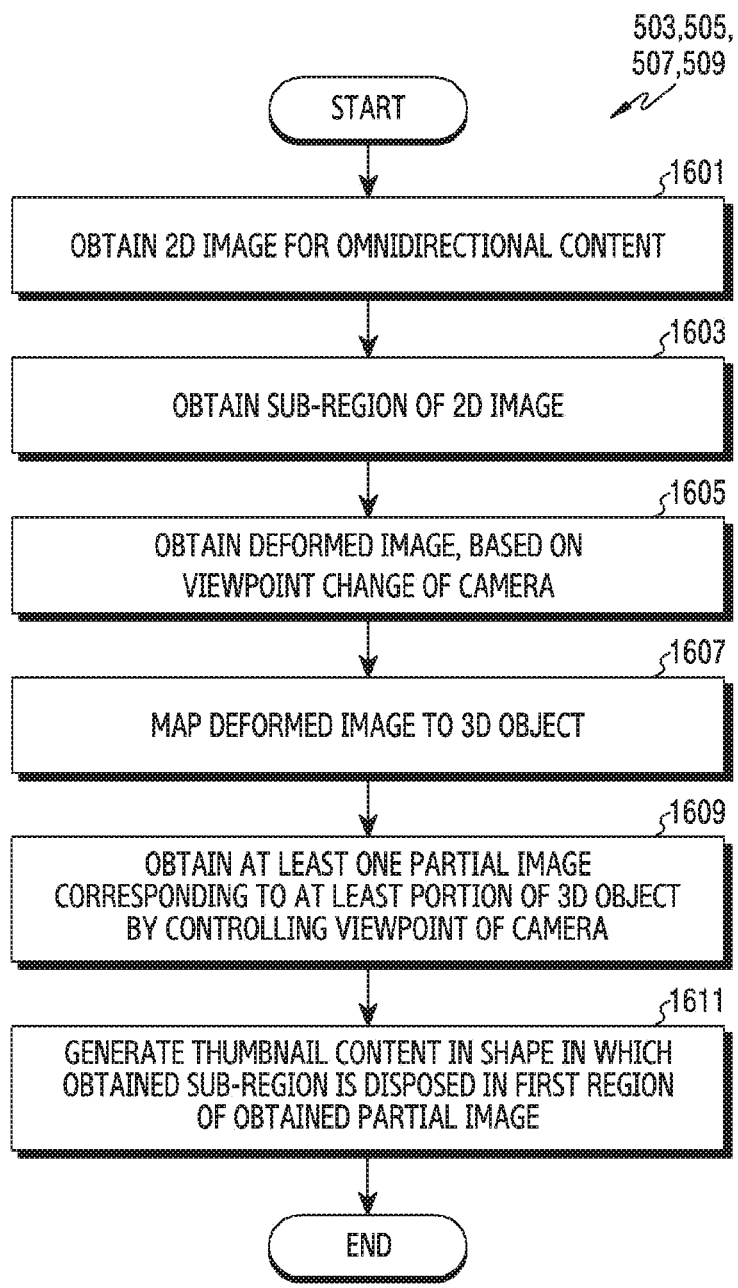
FIG. 16 is a flowchart for generating a thumbnail of an overclock mode in an electronic device according to various embodiments of the disclosure.
Figure 17A:
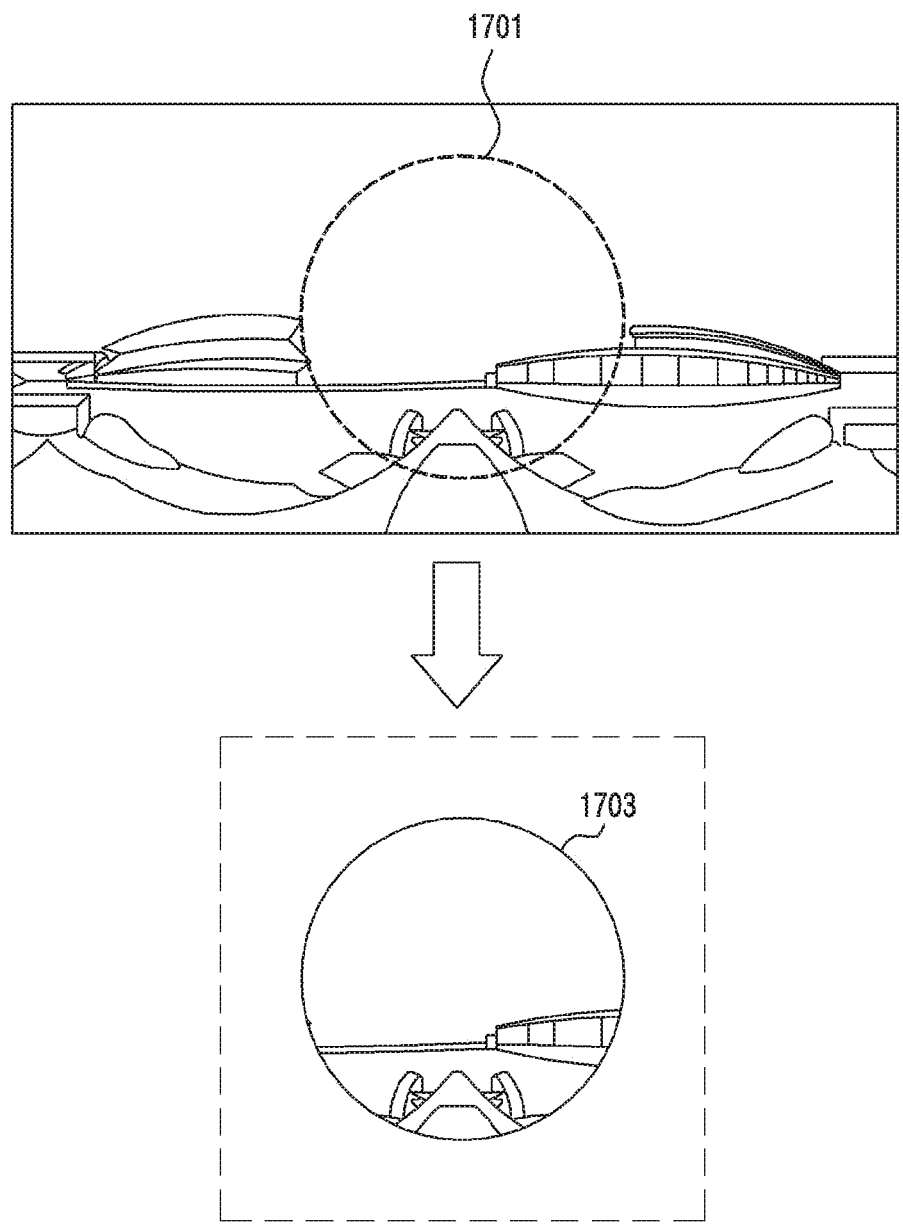
FIG. 17A is a drawing illustrating an example of processing an image to generate a thumbnail of an overclock mode in an electronic device according to various embodiments of the disclosure.
Figure 17B:
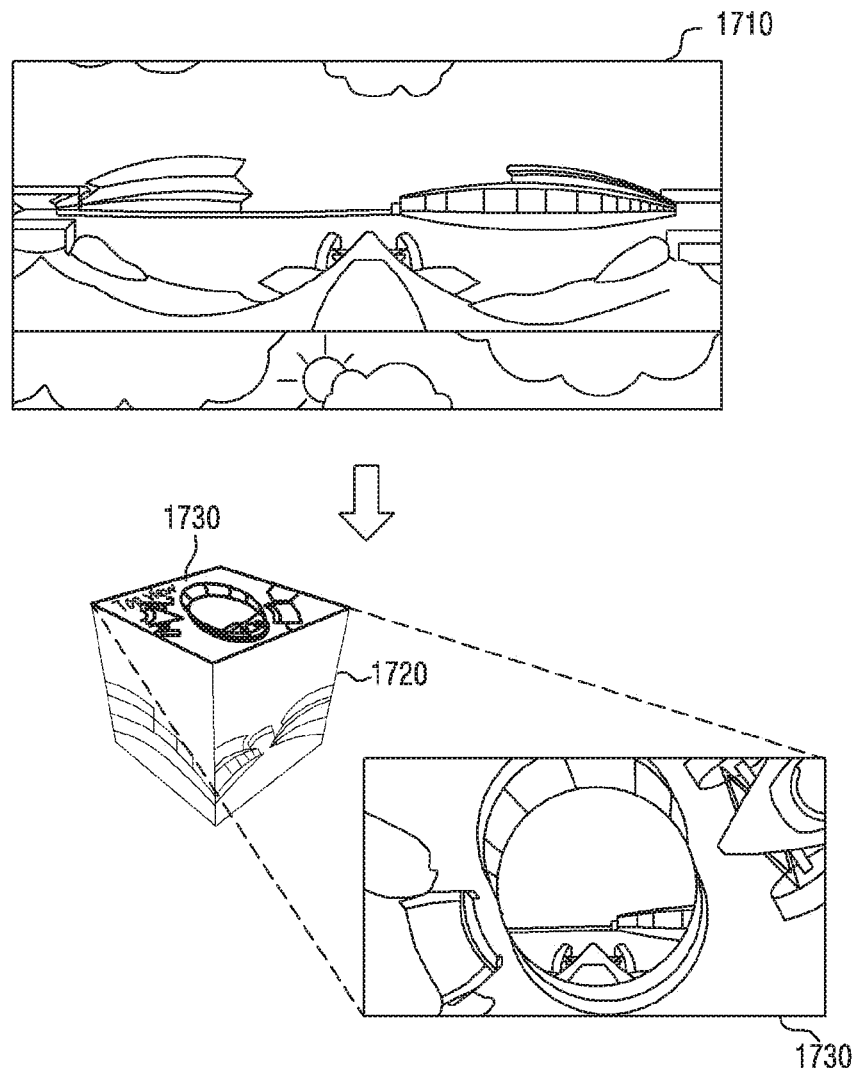
FIG. 17B is a drawing illustrating an example of processing an image to generate a thumbnail of an overclock mode in an electronic device according to various embodiments of the disclosure.
Figure 17C:
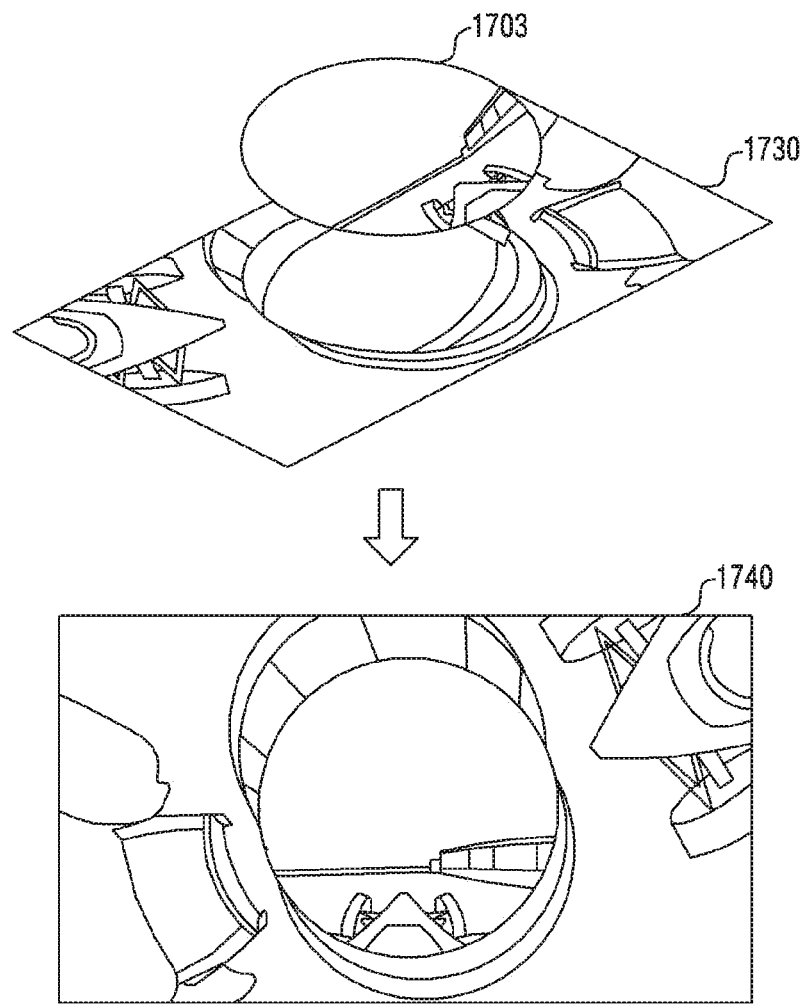
FIG. 17C is a drawing illustrating an example of processing an image to generate a thumbnail of an overclock mode in an electronic device according to various embodiments of the disclosure.
Figure 18:
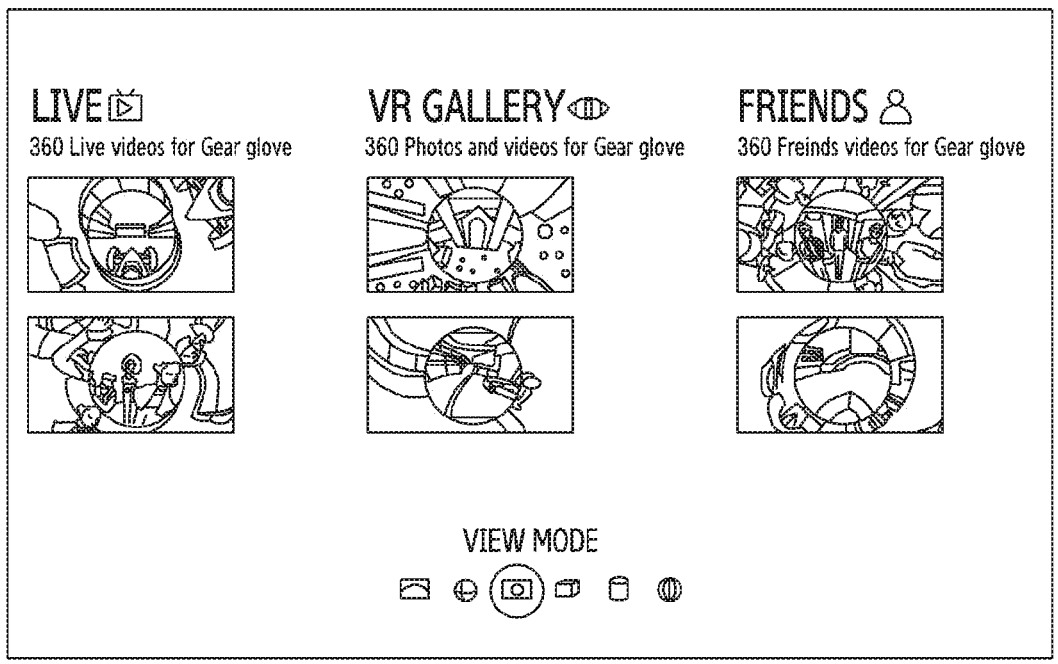
FIG. 18 illustrates a user interface of a virtual reality environment including thumbnail content of an overclock mode in an electronic device according to various embodiments of the disclosure.

FIG. 16 is a flowchart for generating a thumbnail of an overclock mode in an electronic device according to various embodiments of the disclosure. The operations 503, 505, 507, and 509 of FIG. 5 are specified in the following description. In the following embodiments, each of operations may be performed in sequence, but it is not necessarily performed in sequence. For example, the order of each of the operations may be changed, and at least two operations may be performed in parallel. Herein, the electronic device may be the electronic device 101 of FIG. 1 and/or the electronic device 201 of FIG. 2. Hereinafter, the operation of FIG. 16 will be described with reference to FIG. 17A, FIG. 16B, and FIG. 17C. FIG. 17A to FIG. 17C are drawings illustrating an example of processing an image to generate a thumbnail of an overclock mode in an electronic device according to various embodiments of the disclosure. FIG. 18 illustrates a user interface of a virtual reality environment including thumbnail content of an overclock mode in an electronic device according to various embodiments of the disclosure.

Referring to FIG. 16, in operation 1601, the electronic device may obtain a 2D image for omnidirectional content. According to an embodiment, a processor (e.g., the processor 220) of the electronic device may obtain the 2D image in the same manner as described in the operation 1001 of FIG. 10.

In operation 1603, the electronic device may obtain a sub-region of a 2D image. For example, as shown in FIG. 17A, the processor (e.g., the processor 220) of the electronic device may crop a center region 1701 of at least one image to obtain at least one partial image 1703 for the center region.

In operation 1605, the electronic device may obtain a deformed image on the basis of a viewpoint change of a camera. According to an embodiment, the processor (e.g., the processor 220) of the electronic device may move at least one 2D image by a first reference amount in a y-axis to obtain at least one deformed image corresponding to the viewpoint change of the camera. For example, the processor (e.g., the processor 220) of the electronic device may move the 2D image by the first reference amount in the y-axis to obtain a deformed image 1710 as shown in FIG. 17B. According to various embodiments, an operation of obtaining the deformed image may be omitted. In this case, the processor (e.g., the processor 220) of the electronic device may map at least one 2D image to a 3D object in operation 1607 described below.

In operation 1607, the electronic device may map at least one deformed image to a 3D object. For example, as shown in FIG. 17B, the processor (e.g., the processor 220) of the electronic device may obtain a 3D object 1720 to which an image is mapped, by mapping at least one deformed image to a cube. According to an embodiment, when a plurality of deformed images are obtained, the processor (e.g., the processor 220) of the electronic device may generate 3D objects to which different deformed images are mapped over time.

In operation 1609, the electronic device may control the viewpoint of the camera to obtain at least one partial image corresponding to at least a portion of the 3D object. According to an embodiment, as shown in FIG. 17B, the processor (e.g., the processor 220) of the electronic device may set a viewpoint of a virtual camera to a front view direction, and may obtain a partial image 1730 mapped to a sub-region of the 3D object corresponding to the front view direction for a specific time. When a plurality of images are mapped to the 3D object, a partial image mapped to a sub-region of the 3D object corresponding to the front view direction may be changed over time. The processor (e.g., the processor 220) of the electronic device may obtain a plurality of partial images which are changed over time for a specific time.

In operation 1611, the electronic device may generate thumbnail content in a shape in which the obtained sub-region is disposed in a first region of the obtained partial image. For example, as shown in FIG. 17C, the processor (e.g., the processor 220) of the electronic device may obtain a plurality of partial images 1740 in a shape in which each of the plurality of sub-regions 1730 obtained through operation 1603 is disposed in the first region of each of the plurality of partial images 1703 obtained through operation 1609. The processor (e.g., the processor 220) of the electronic device may generate thumbnail content including corresponding images. For example, upon obtaining the plurality of partial images, the processor (e.g., the processor 220) of the electronic device may generate video-type thumbnail content including the plurality of partial images. The processor (e.g., the processor 220) of the electronic device may register and store the generated thumbnail content as a thumbnail for corresponding omnidirectional content. According to an embodiment, the processor (e.g., the processor 220) of the electronic device may register the generated thumbnail content as thumbnail content for a first environment (e.g., a mobile environment), and may additionally generate the same content. The processor (e.g., the processor 220) of the electronic device may add length information to the additionally generated content and change it to 3D content. The processor (e.g., the processor 220) of the electronic device may register 3D thumbnail content, to which depth information is added, as thumbnail content for a second environment (e.g., a VR environment). The 3D thumbnail content, to which the depth information is added, in the overclock mode may be displayed as shown in FIG. 18 in a VR environment.

Figure 19:
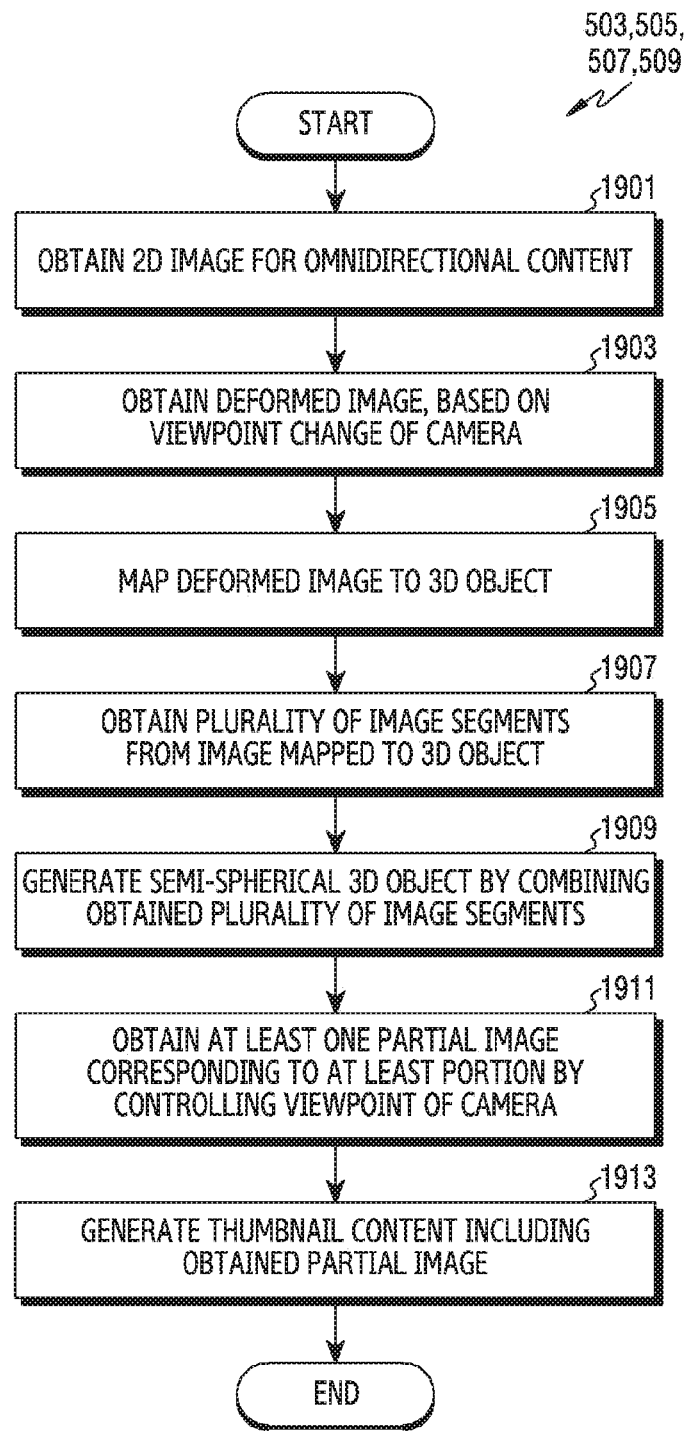
FIG. 19 is a flowchart for generating a thumbnail of a sphere mode in an electronic device according to various embodiments of the disclosure.
Figure 20:
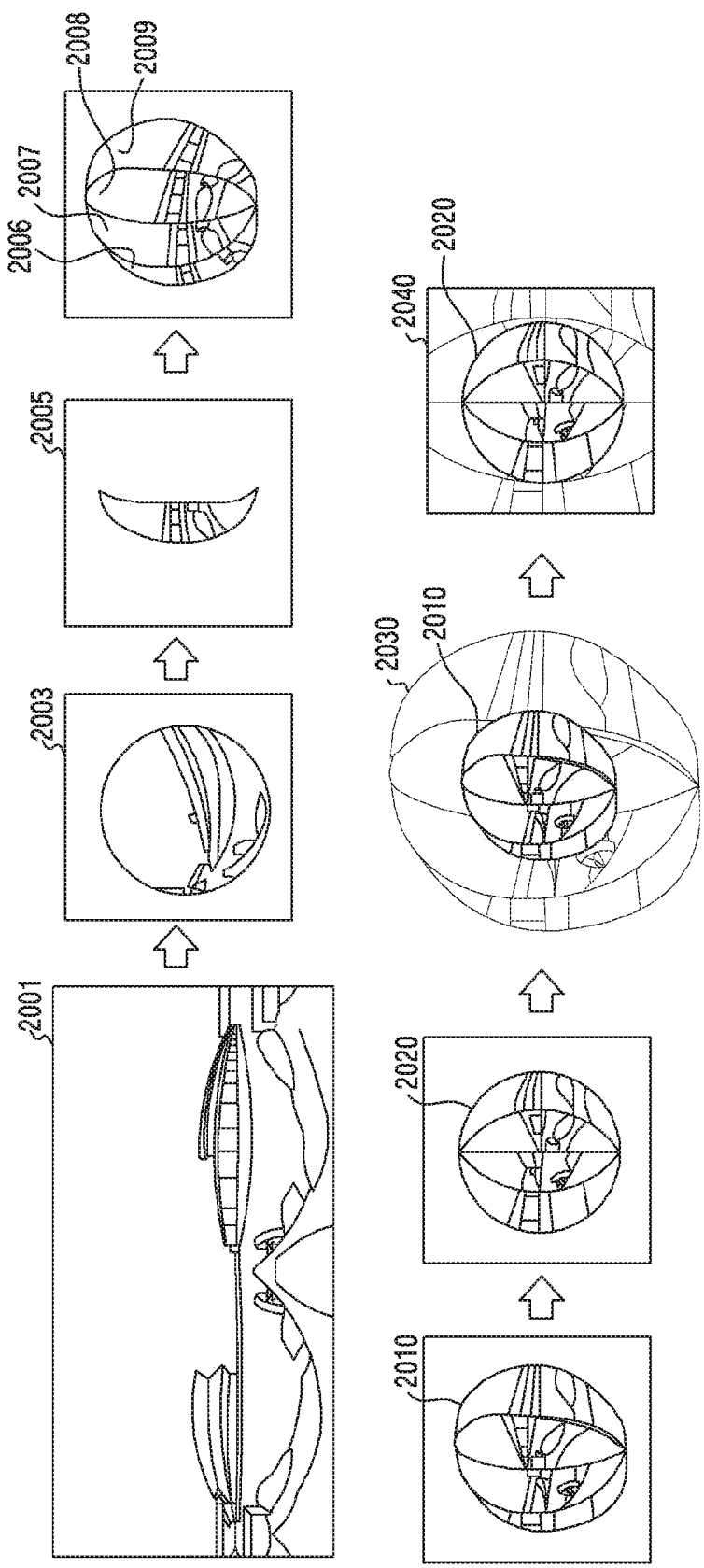
FIG. 20 is a drawing illustrating an example of processing an image to generate a thumbnail of a sphere mode in an electronic device according to various embodiments of the disclosure.

FIG. 19 is a flowchart for generating a thumbnail of a sphere mode in an electronic device according to various embodiments of the disclosure. The operations 503, 505, 507, and 509 of FIG. 5 are specified in the following description. In the following embodiments, each of operations may be performed in sequence, but it is not necessarily performed in sequence. For example, the order of each of the operations may be changed, and at least two operations may be performed in parallel. Herein, the electronic device may be the electronic device 101 of FIG. 1 and/or the electronic device 201 of FIG. 2. Hereinafter, the operation of FIG. 19 will be described with reference to FIG. 20, FIG. 21A, FIG. 21B, FIG. 21C, FIG. 21D, FIG. 21E, and FIG. 22. FIG. 20 is a drawing illustrating an example of processing an image to generate a thumbnail of a sphere mode in an electronic device according to various embodiments of the disclosure. FIG. 21A to FIG. 21E are drawings illustrating an image region selected to generate a thumbnail of a sphere mode in an electronic device according to various embodiments of the disclosure. FIG. 22 illustrates a user interface of a virtual reality environment including thumbnail content of a sphere mode in an electronic device according to various embodiments of the disclosure.

Referring to FIG. 19, in operation 1901, the electronic device may obtain a 2D image for omnidirectional content. According to an embodiment, a processor (e.g., the processor 220) of the electronic device may obtain the 2D image in the same manner as described in the operation 1001 of FIG. 10.

In operation 1903, the electronic device may obtain at least one deformed image on the basis of a viewpoint change of a camera. For example, the processor (e.g., the processor 220) of the electronic device may move an image by a first reference amount in a y-axis to obtain the deformed image corresponding to the viewpoint change of the camera. According to various embodiments, an operation of obtaining the deformed image may be omitted. In this case, the processor (e.g., the processor 220) of the electronic device may map a 2D image to a 3D object in operation 1905 described below.

In operation 1905, the electronic device may map at least one deformed image to the 3D object. For example, as shown in FIG. 20, the processor (e.g., the processor 220) of the electronic device may obtain a 3D object 2003 to which an image is mapped, by mapping at least one deformed image or at least one 2D image 2001 to a sphere.

In operation 1907, the electronic device may obtain a plurality of image segments from the image mapped to the 3D object. For example, the processor (e.g., the processor 220) of the electronic device may obtain a plurality of image segments satisfying a pre-set condition on the basis of at least one of whether there is a movement of a subject in the image mapped to the 3D object, a size of the subject, whether a face of a person subject can be recognized, whether a sound of the subject is generated, and a pattern change (e.g., a color change). According to an embodiment, the processor (e.g., the processor 220) of the electronic device may obtain one image segment from the 3D object on the basis of the pre-set condition, and may obtain a plurality of image segments by duplicating the obtained image segment. For example, as shown in FIG. 20, the processor (e.g., the processor 220) of the electronic device may obtain one image segment 2005 from the spherical 3D object 2003, and may obtain four image segments 2006, 2007, 2008, and 2009 by duplicating the obtained image segment 2005. According to an embodiment, the processor (e.g., the processor 220) of the electronic device may obtain a plurality of image segments corresponding to different regions from the 3D object on the basis of the pre-set condition. This will be described below in detail with reference to FIG. 21A to FIG. 21E.

In operation 1909, the electronic device may generate a semi-spherical 3D object by combining the obtained plurality of image segments. For example, as shown in FIG. 20, the processor (e.g., the processor 220) of the electronic device may generate the semi-spherical 3D object by combining the plurality of image segments 2006, 2007, 2008, and 2009. According to an embodiment, the processor (e.g., the processor 220) of the electronic device may individually rotate a texture mapped to each of the image segments of the generated 3D object. For example, as shown in FIG. 20, the processor (e.g., the processor 220) of the electronic device may rotate the texture mapped to each of the image segments 2006, 2007, 2008, and 2009 of the generated 3D object by a different angle, and thus may obtain a 3D object 2010 in which each image segment rotates by a different angle for a specific time.

In operation 1911, the electronic device may control the viewpoint of the camera to obtain at least one partial image corresponding to at least a portion of the 3D object. According to an embodiment, the processor (e.g., the processor 220) of the electronic device may set a viewpoint of a virtual camera to a front view direction, and may obtain a partial image 2020 mapped to a sub-region of the 3D object corresponding to the front view direction for a specific time. Since the texture mapped to each image segment of the 3D object rotates for the specific time, the processor (e.g., the processor 220) of the electronic device may capture the 3D object in the front view direction for the specific time to obtain a plurality of partial images which are changed over time. According to an embodiment, the processor (e.g., the processor 220) of the electronic device may duplicate the 3D object generated in operation 1909, and may enlarge the duplicated 3D object or perform dim processing thereon. The processor (e.g., the processor 220) of the processor may set the 3D object, which is enlarged and dimmed, as a background of thumbnail content. For example, as shown in FIG. 20, a 3D object 2030, which is enlarged and dimmed, may be set to a background of the 3D object 2010, and the partial image 2020 mapped to a sub-region of the 3D object corresponding to a front view direction for a specific time and a background image 204 may be obtained.

In operation 1913, the electronic device may generate thumbnail content including the obtained partial image. According to an embodiment, upon obtaining the plurality of partial images, the processor (e.g., the processor 220) of the electronic device may generate video-type thumbnail content including the plurality of partial images. According to an embodiment, upon obtaining the plurality of partial images and the background image, the processor (e.g., the processor 220) of the electronic device may generate video-type thumbnail content including the plurality of partial images and the background image. The processor (e.g., the processor 220) of the electronic device may register and store the generated thumbnail content as a thumbnail for corresponding omnidirectional content. According to an embodiment, the processor (e.g., the processor 220) of the electronic device may register the generated thumbnail content as thumbnail content for a first environment (e.g., a mobile environment), and may additionally generate the same content. The processor (e.g., the processor 220) of the electronic device may add length information to the additionally generated content and change it to 3D content. The processor (e.g., the processor 220) of the electronic device may register 3D thumbnail content, to which depth information is added, as thumbnail content for a second environment (e.g., a VR environment). The 3D thumbnail content, to which the depth information is added, in the sphere mode may be displayed as shown in FIG. 22 in a VR environment.

In the scheme described above with reference to FIG. 19, the electronic device obtains one image segment from the 3D object and thereafter duplicates the obtained image segment into a plurality of segments to generate a semi-spherical 3D object. However, according to various embodiments, the electronic device of the disclosure may obtain a plurality of image segments corresponding to different regions from the 3D object on the basis of a pre-set condition. For example, the electronic device may obtain a plurality of image segments in the same manner as shown in FIG. 21A to FIG. 21E. Although it is illustrated for convenience of explanation in FIG. 21A and FIG. 21B that the plurality of image segments are obtained from the 2D image, in practice, a plurality of segments may be obtained after the 2D image is mapped to a spherical 3D object. Although it is illustrated for convenience of explanation in FIG. 21A to FIG. 21E that four image segments are obtained, various embodiments of the disclosure are not limited thereto.

Figure 21A:
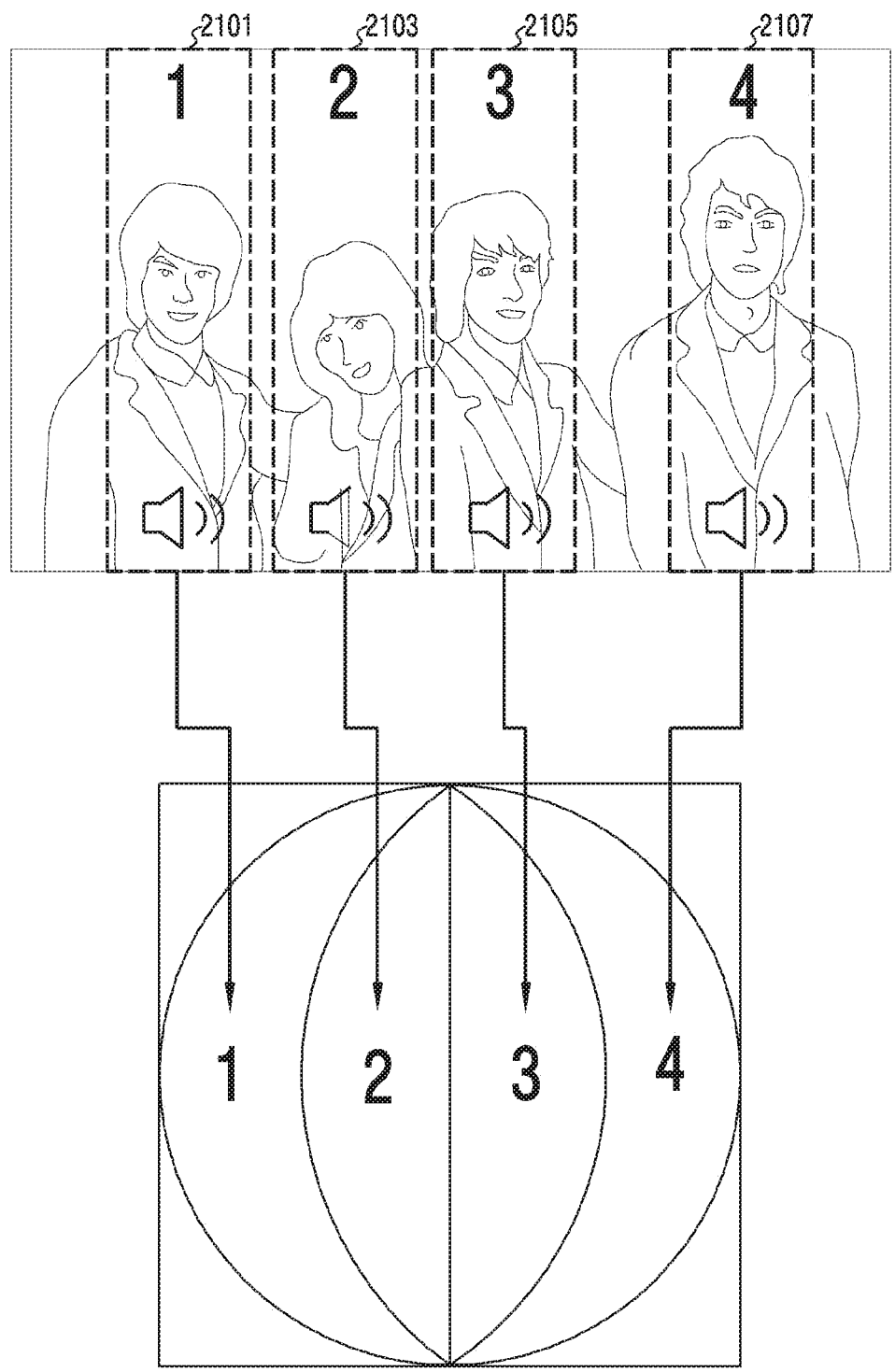
FIG. 21A is a drawing illustrating an image region selected to generate a thumbnail of a sphere mode in an electronic device according to various embodiments of the disclosure.
Figure 22:
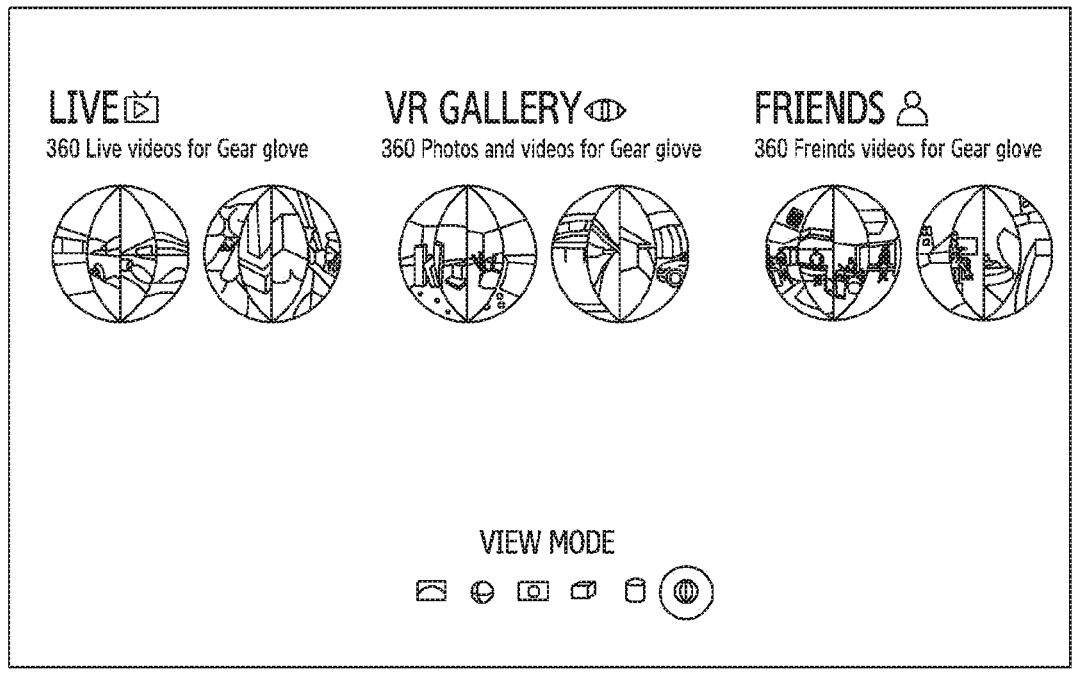
FIG. 22 illustrates a user interface of a virtual reality environment including thumbnail content of a sphere mode in an electronic device according to various embodiments of the disclosure.

Referring to FIG. 21A, the electronic device may detect subjects which generate a sound in an image, and may obtain a plurality of image segments 2101, 2103, 2105, and 2107 including respective subjects. For example, according to the subject which generates the sound in the image, the electronic device may obtain at least one image segment by cropping specific-sized regions including the subject. According to an embodiment, if the number of subjects which generate the sound is greater than the number of reference segments, the electronic device may select subjects corresponding to the number of the reference segments on the basis of a sound volume, and may obtain image segments corresponding to the number of reference segments by cropping regions including the selected subjects. The electronic device may align the image segments on the basis of the sound volume of the subject corresponding to each of the image segments, and may generate a semi-spherical object by using the aligned image segments.

Figure 21B:
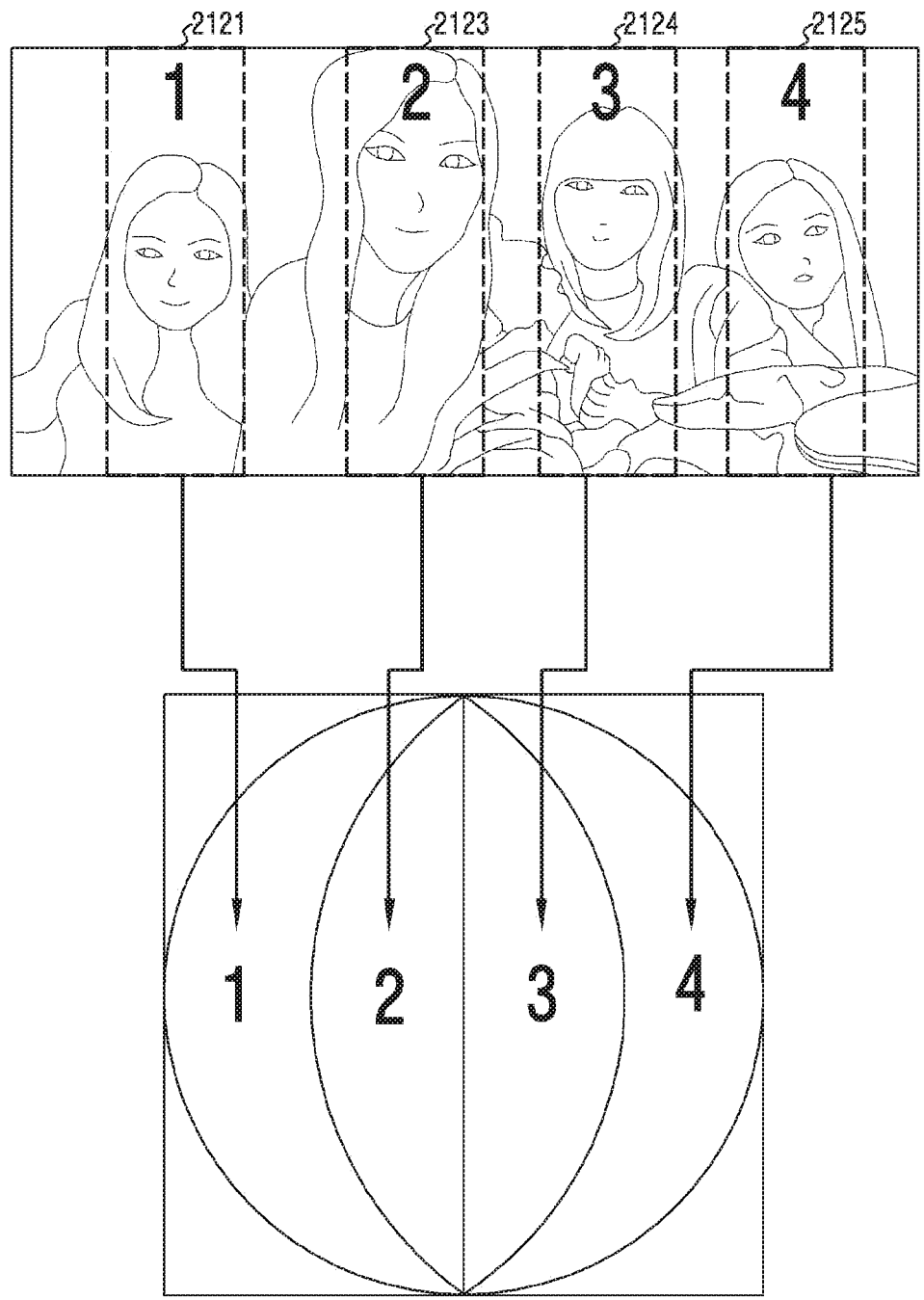
FIG. 21B is a drawing illustrating an image region selected to generate a thumbnail of a sphere mode in an electronic device according to various embodiments of the disclosure.

Referring to FIG. 21B, the electronic device may detect a person subject of which a face can be recognized in an image, and may obtain a plurality of image segments 2121, 2123, 2124, and 2125 including the detected person subject. For example, the electronic device may obtain at least one image segment by cropping specific-sized regions, based on the person subject of which the face can be recognized in the image. According to an embodiment, if the number of person subjects of which faces can be recognized in the image is greater than the number of reference segments, the electronic device may select people corresponding to the number of reference segments on the basis of a size of a person or a size of a face of the person, and may obtain image segments corresponding to the number of reference segments by cropping regions including the selected people. The electronic device may align image segments on the basis of a size of a person corresponding to each of the image segments or a size of a face of the person, and may generate a semi-spherical 3D object by using the aligned image segments.

Figure 21C:
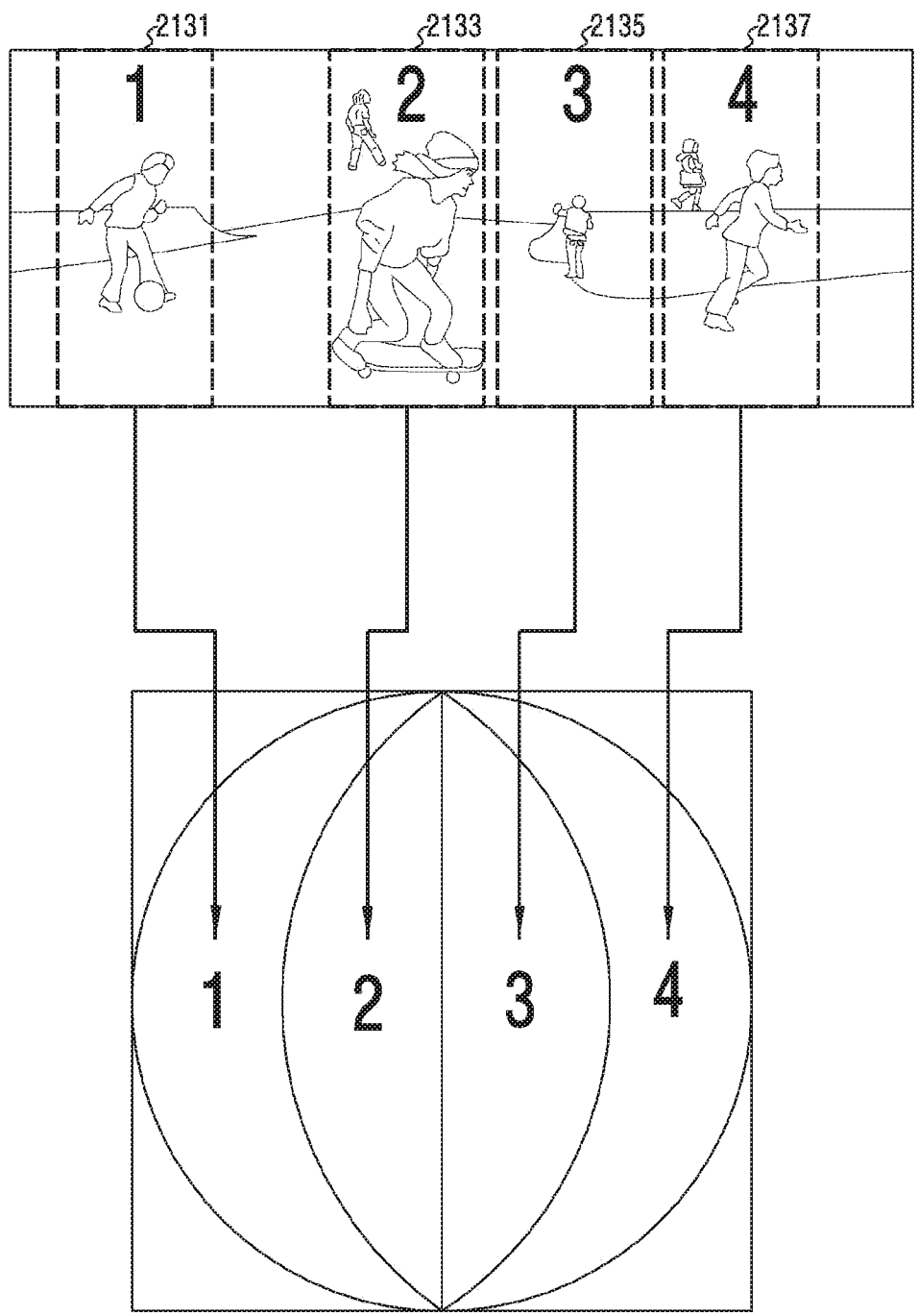
FIG. 21C is a drawing illustrating an image region selected to generate a thumbnail of a sphere mode in an electronic device according to various embodiments of the disclosure.

Referring to FIG. 21C, the electronic device may detect a subject which moves in an image, and may obtain a plurality of image segments 2131, 2133, 2135, and 2137 including the detected subject. For example, on the basis of the subject which moves in the image, the electronic device may obtain at least one image segment by cropping specific-sized regions including the subject. According to an embodiment, if the number of moving subjects is greater than the number of reference segments, the electronic device may select the subjects corresponding to the number of reference segments in a descending order of a movement level, and may obtain image segments corresponding to the number of reference segments by cropping regions including the selected subjects. The electronic device may align image segments on the basis of a movement level of a subject corresponding to each of the image segments or a size of the subject, and may generate a semi-spherical 3D object by using the aligned image segments.

Figure 21D:
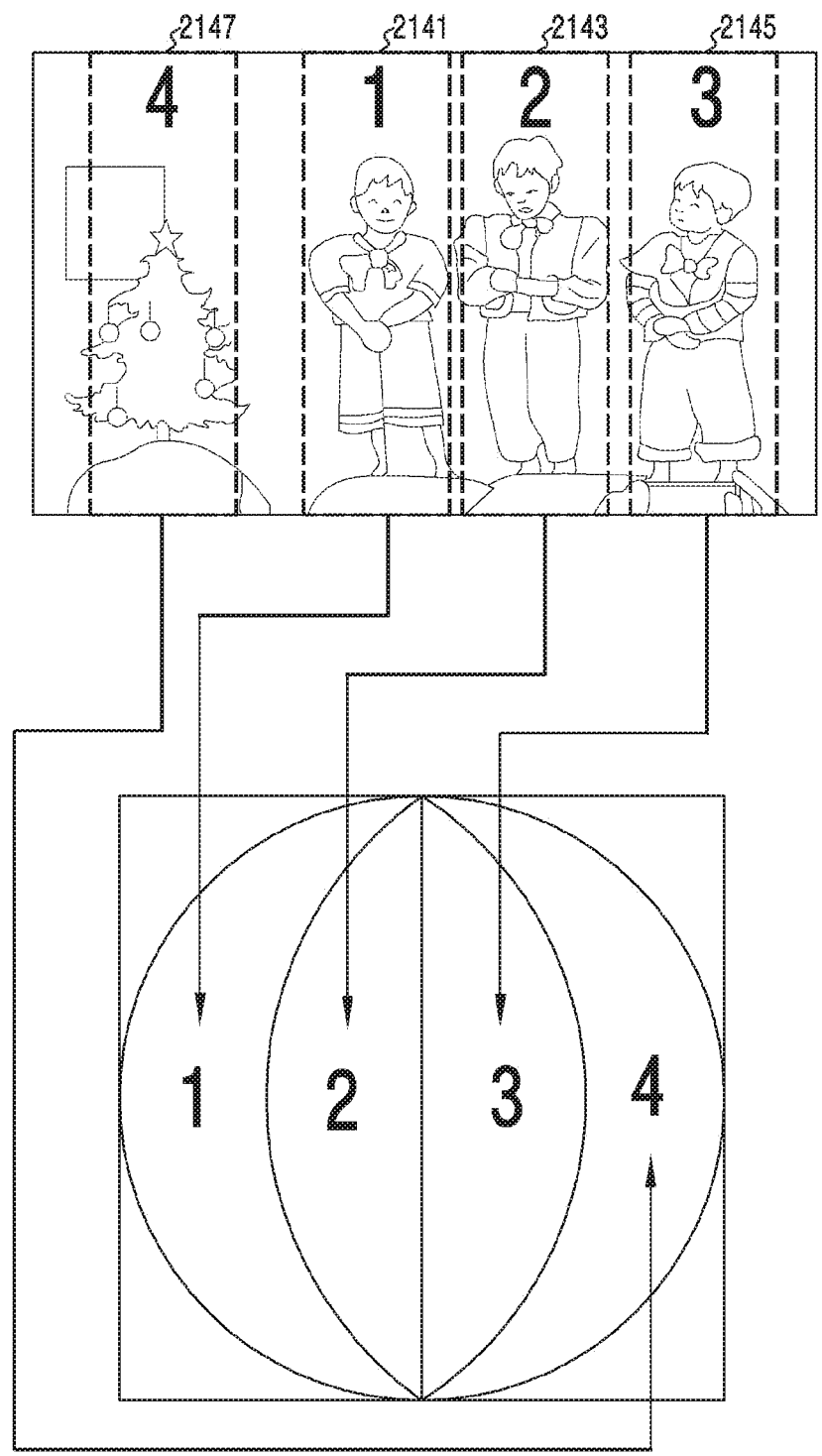
FIG. 21D is a drawing illustrating an image region selected to generate a thumbnail of a sphere mode in an electronic device according to various embodiments of the disclosure.

Referring to FIG. 21D, if the number of subjects detected in the image is less than the number of reference segments, the electronic device may further crop at least one image segment on the basis of a size of a region in which the subject does not exist or a region which is not cropped. For example, if three subjects are detected based on whether a sound is generated, a movement, or whether a face can be recognized and if there are four reference segments, the electronic device may obtain three image segments 2141, 2143, and 2145 by cropping regions including respective subjects in the image, and may obtain one image segment 2147 by cropping at least a sub-region of a largest region among regions which are not cropped in the image.

Figure 21E:
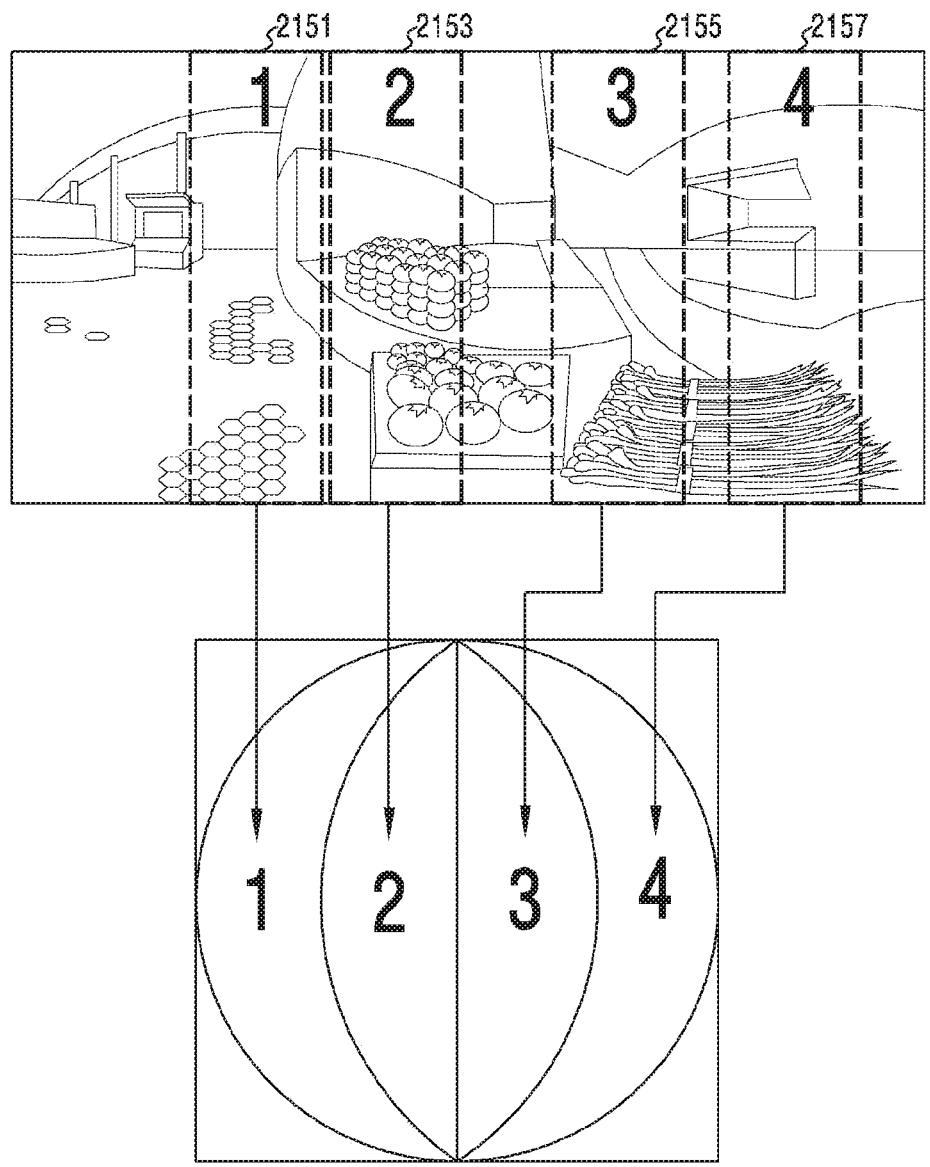
FIG. 21E is a drawing illustrating an image region selected to generate a thumbnail of a sphere mode in an electronic device according to various embodiments of the disclosure.

Referring to FIG. 21E, the electronic device may obtain a plurality of image segments 2151, 2153, 2155, and 2157 on the basis of a pattern change of an image. For example, the electronic device may recognize the pattern change (e.g., color change) of the image, and may obtain at least one image segment by cropping regions having a great change in a pattern.

Figure 23:
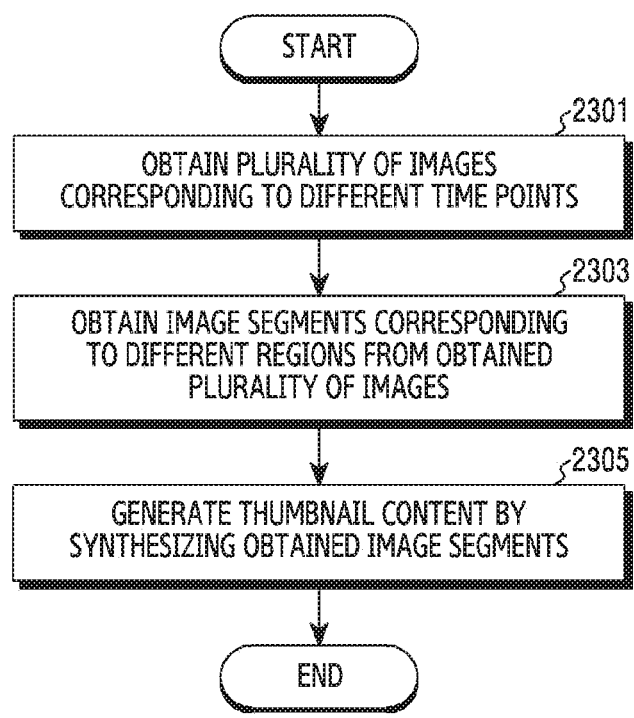
FIG. 23 is a flowchart for generating thumbnail content of a time-slice mode in an electronic device according to various embodiments of the disclosure.
Figure 24:
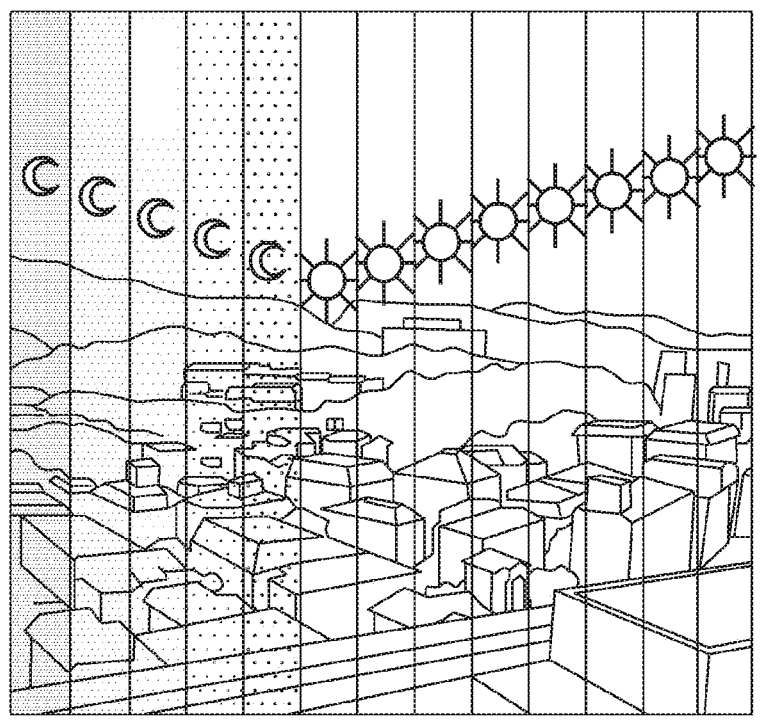
FIG. 24 illustrates a thumbnail generated on the basis of a time-slice mode in an electronic device according to various embodiments of the disclosure.

FIG. 23 is a flowchart for generating thumbnail content of a time-slice mode in an electronic device according to various embodiments of the disclosure. In the following embodiments, each of operations may be performed in sequence, but it is not necessarily performed in sequence. For example, the order of each of the operations may be changed, and at least two operations may be performed in parallel. Herein, the electronic device may be the electronic device 101 of FIG. 1 and/or the electronic device 201 of FIG. 2. Hereinafter, the operation of FIG. 23 will be described with reference to FIG. 24. FIG. 24 illustrates a thumbnail generated on the basis of a time-slice mode in an electronic device according to various embodiments of the disclosure.

Referring to FIG. 23, in operation 2301, the electronic device may obtain a plurality of images corresponding to different time points from images included in omnidirectional content. According to an embodiment, the omnidirectional content may be content obtained by capturing a subject with a predetermined time interval. For example, the omnidirectional content may be content captured in a time lapse mode. According to an embodiment, the omnidirectional content may be video content including images captured over time.

In operation 2303, the electronic device may obtain image segments corresponding to different regions from the obtained plurality of images. According to an embodiment, a processor (e.g., the processor 220) of the electronic device may obtain an image segment of a first region from a first image, obtain an image segment of a second region from a second image, and obtain an image segment of a third region from a third image. The first region, the second region, and the third region may be different regions. According to an embodiment, the processor (e.g., the processor 220) of the electronic device may determine the number of image segments on the basis of a playtime of omnidirectional content, and may obtain a plurality of images corresponding to the determined number of image segments. The processor (e.g., the processor 220) of the electronic device may obtain an image segment from each of the plurality of images corresponding to the number of image segments. For example, if the playtime of the omnidirectional content is 5 minutes, the processor (e.g., the processor 220) of the electronic device may determine the number of image segments to 5, and may obtain five images from the omnidirectional content. The processor (e.g., the processor 220) of the electronic device may obtain an image segment from each of the obtained five images. For another example, if the playtime of the omnidirectional content is 10 minutes, the processor (e.g., the processor 220) of the electronic device may determine the number of image segments to 10, and may obtain 10 images from the omnidirectional content. The processor (e.g., the processor 220) of the electronic device may obtain an image segment from each of the 10 images. According to an embodiment, the processor (e.g., the processor 220) of the electronic device may determine the number of image segments on the basis of the number of images included in the omnidirectional content, and may obtain a plurality of images corresponding to the determined number of image segments. For another example, the processor (e.g., the processor 220) of the electronic device may determine the number of image segments to if the number of images included in the omnidirectional content is 200, and may determine the number of image segments to 30 if the number of images included in the omnidirectional content is 600. The aforementioned schemes of determining the number of image segments are for exemplary purposes, and the disclosure is not limited thereto.

In operation 2305, the electronic device may generate thumbnail content by synthesizing the obtained image segments. For example, as shown in FIG. 24, the processor (e.g., the processor 220) of the electronic device may generate thumbnail content consisting of 13 image segments by stitching the obtained image segments.

Figure 25:
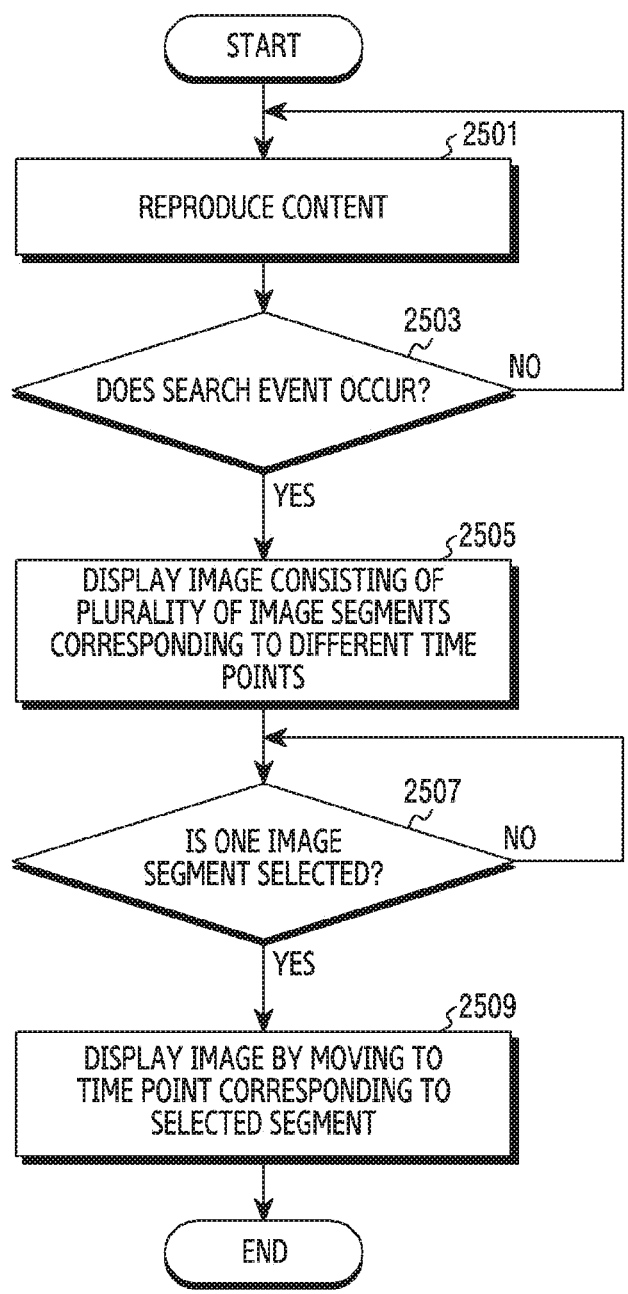
FIG. 25 is a flowchart for controlling a playback time point by using a thumbnail of a time-slice mode in an electronic device according to various embodiments of the disclosure.
Figure 26:
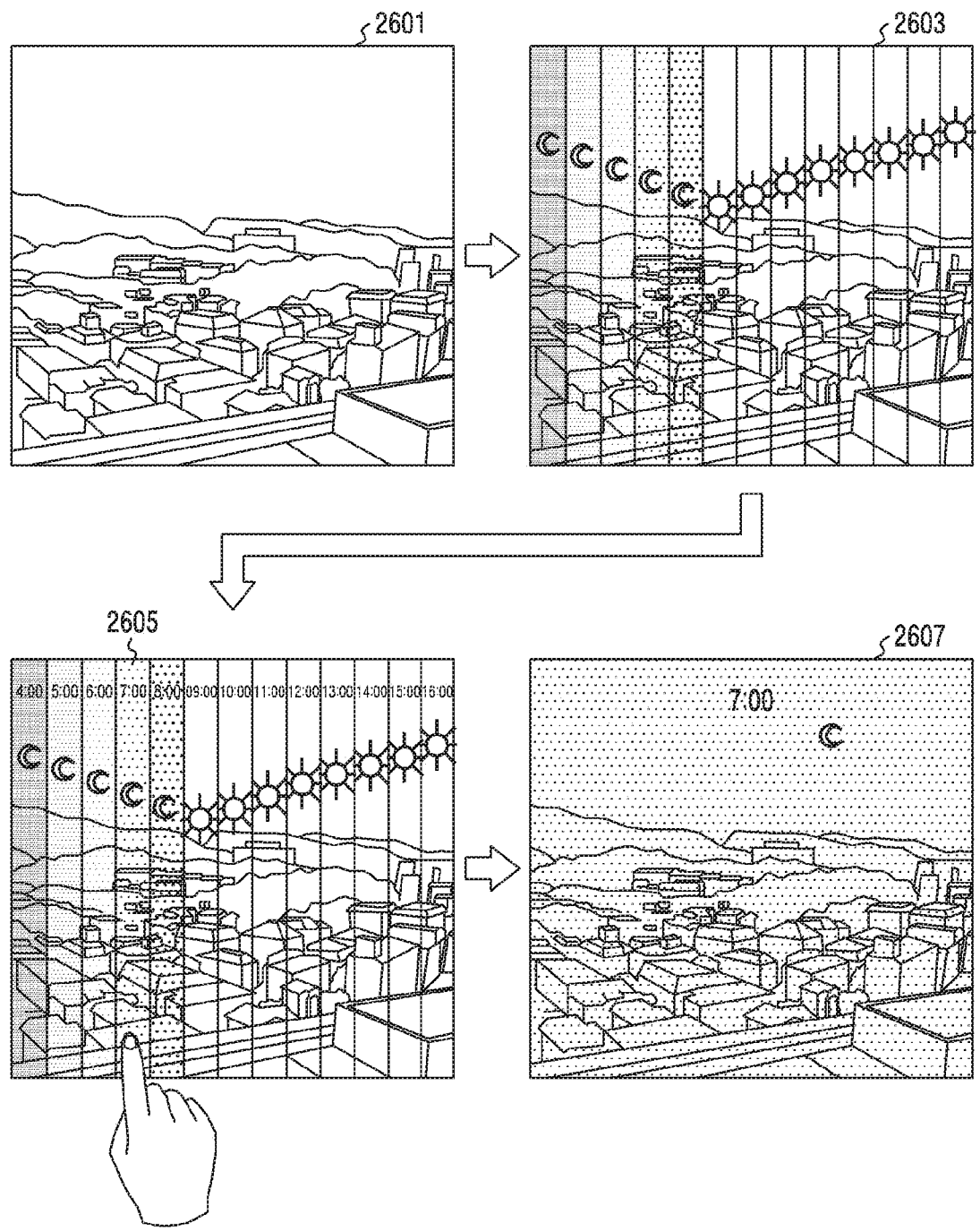
FIG. 26 illustrates a screen configuration for controlling a playback time point by using a thumbnail of a time-slice mode in an electronic device according to various embodiments of the disclosure.

FIG. 25 is a flowchart for controlling a playback time point by using a thumbnail of a time-slice mode in an electronic device according to various embodiments of the disclosure. In the following embodiments, each of operations may be performed in sequence, but it is not necessarily performed in sequence. For example, the order of each of the operations may be changed, and at least two operations may be performed in parallel. Herein, the electronic device may be the electronic device 101 of FIG. 1 and/or the electronic device 201 of FIG. 2. Hereinafter, the operation of FIG. 25 will be described with reference to FIG. 26. FIG. 26 illustrates a screen configuration for controlling a playback time point by using a thumbnail of a time-slice mode in an electronic device according to various embodiments of the disclosure.

Referring to FIG. 25, in operation 2501, the electronic device may reproduce omnidirectional content. For example, the processor (e.g., the processor 220) of the electronic device may reproduce the omnidirectional content on the basis of a user input. For instance, the processor (e.g., the processor 220) may reproduce the omnidirectional content on the basis of the user input, and as shown in FIG. 26, may display an image 2601 depending on the omnidirectional content to a display device (e.g., the display device 240).

In operation 2503, the electronic device may determine whether a search event occurs. For example, the processor (e.g., the processor 220) of the electronic device may determine whether the search event occurs to change a playback time point of content while the omnidirectional content is reproduced. According to an embodiment, the processor (e.g., the processor 220) of the electronic device may determine whether the search event occurs on the basis of whether a user input for a pre-set region is detected while the omnidirectional content is reproduced, whether a user input of a pre-set scheme is detected while the omnidirectional content is reproduced, or whether a user input for a specific menu item is reproduced while the omnidirectional content is reproduced. If the search event does not occur, returning to operation 2501, the electronic device may continuously reproduce the omnidirectional content.

If the search event occurs, in operation 2505, the electronic device may display an image consisting of a plurality of image segments corresponding to different time points. According to an embodiment, the image consisting of the plurality of image segments corresponding to the different time points may be thumbnail content generated in the same manner as described in FIG. 23. For instance, as shown in FIG. 26, the processor (e.g., the processor 220) of the electronic device may display thumbnail content 2603 consisting of different segments to the display device (e.g., the display device 240).

In operation 2507, the electronic device may determine whether one image segment is selected. For example, the processor (e.g., the processor 220) of the electronic device may determine whether a user input for selecting one image segment from among a plurality of image segments displayed to a screen is detected. For example, as shown in FIG. 26, the processor (e.g., the processor 220) of the electronic device may detect a user input for selecting an image segment 2605 corresponding to a specific time point (e.g., 7:00).

In operation 2509, the electronic device may display an image by moving a playback time point to a time point corresponding to the selected image segment. For example, as shown in FIG. 26, in response to selecting of the image segment 2605 corresponding to a specific time point (e.g., 7:00), the processor (e.g., the processor 220) of the electronic device may display a corresponding image 2607 to the display device (e.g., the display device 240) by moving the playback time point to a time point (e.g., 7:00) of the selected image segment 2605, and may start the reproduction from the moved time point.

Figure 27:
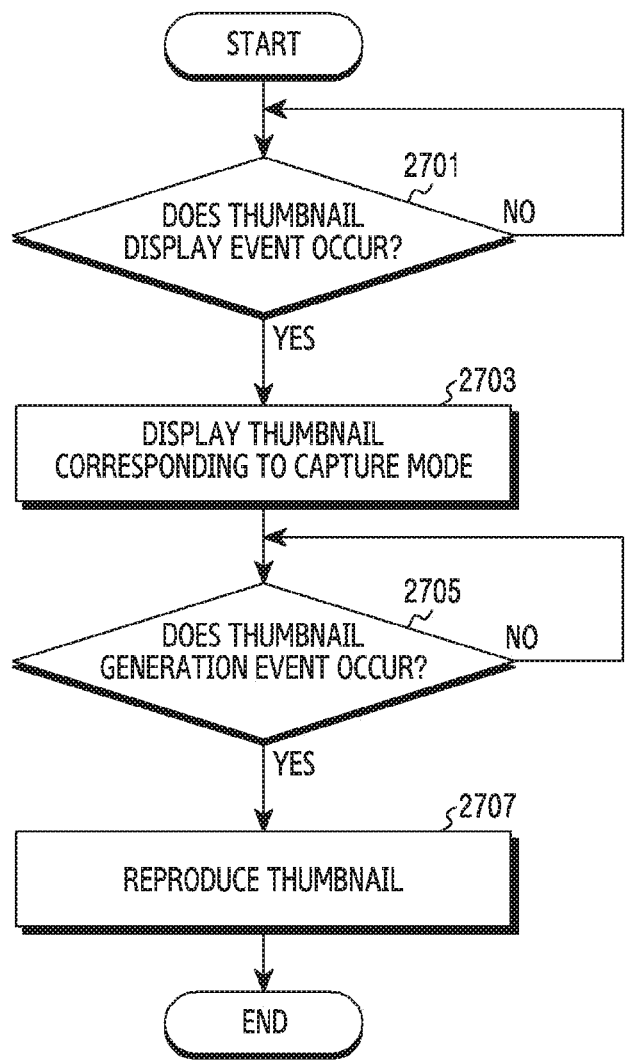
FIG. 27 illustrates a procedure of displaying a thumbnail in an electronic device according to various embodiments of the disclosure.
Figure 28A:
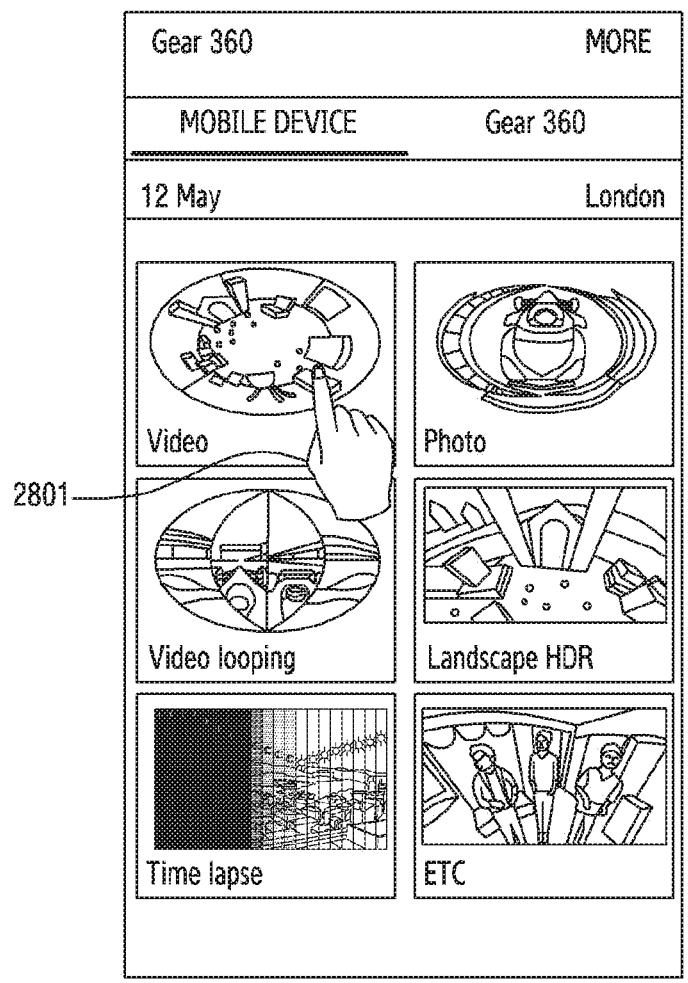
FIG. 28A illustrates a screen configuration for displaying a thumbnail on the basis of a capture mode in an electronic device according to various embodiments of the disclosure.
Figure 28B:
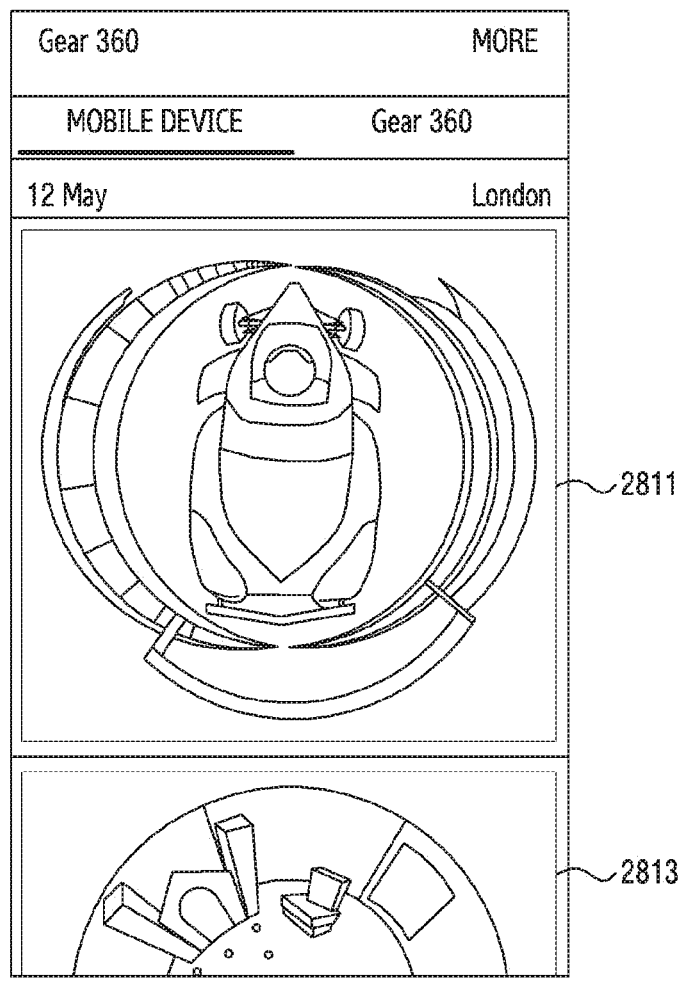
FIG. 28B illustrates a screen configuration for displaying a thumbnail on the basis of a capture mode in an electronic device according to various embodiments of the disclosure.
Figure 29:
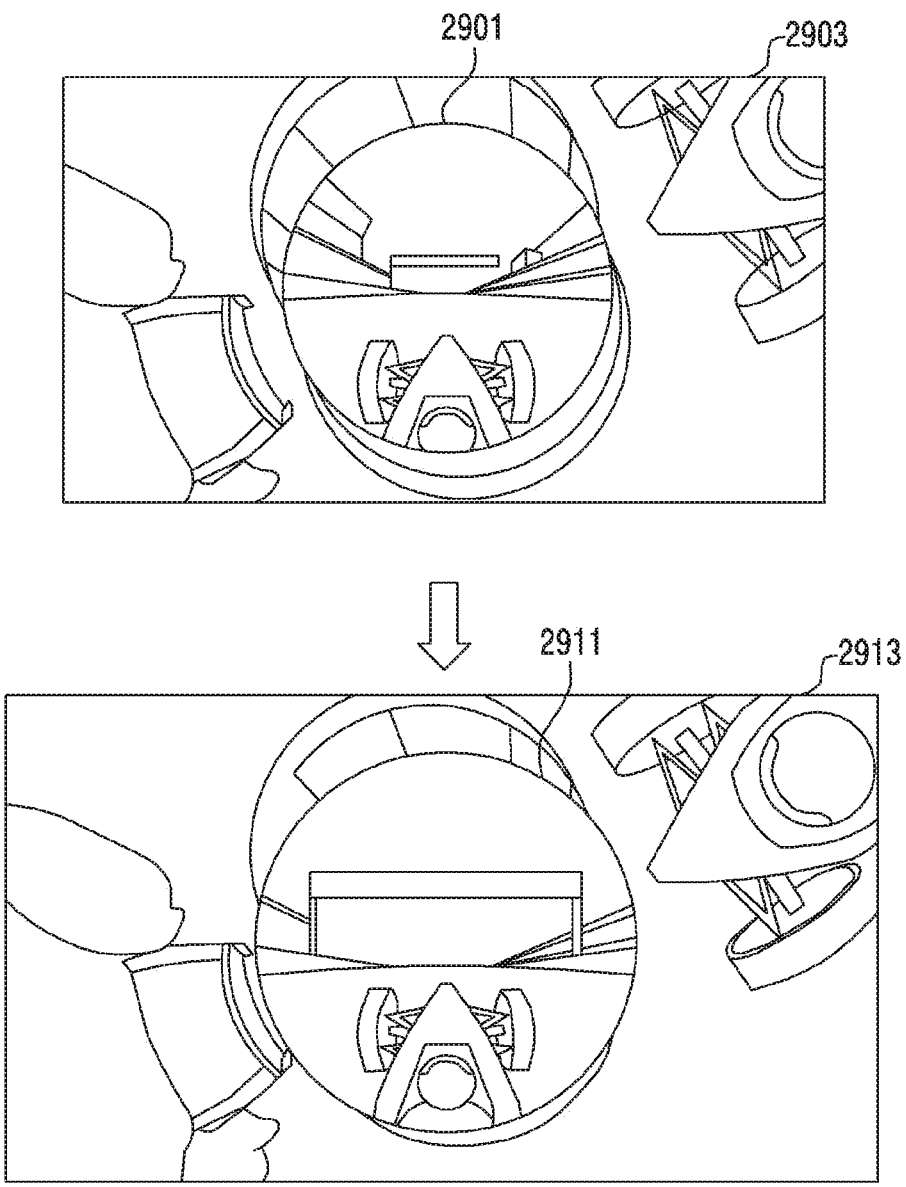
FIG. 29 illustrates a screen configuration for reproducing a thumbnail of an overclock mode in an electronic device according to various embodiments of the disclosure.
Figure 30A:
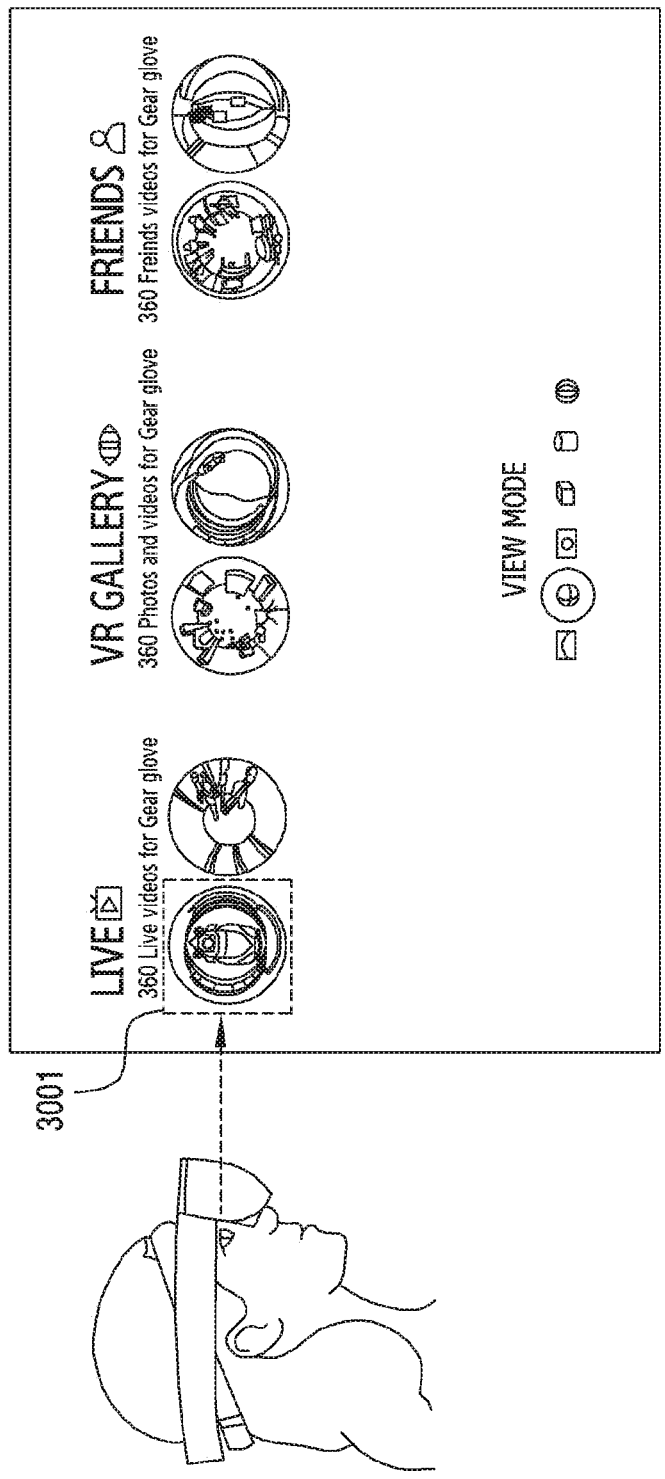
FIG. 30A illustrates a screen configuration of a virtual reality environment for reproducing a thumbnail of a planet mode in an electronic device according to various embodiments of the disclosure.
Figure 30B:
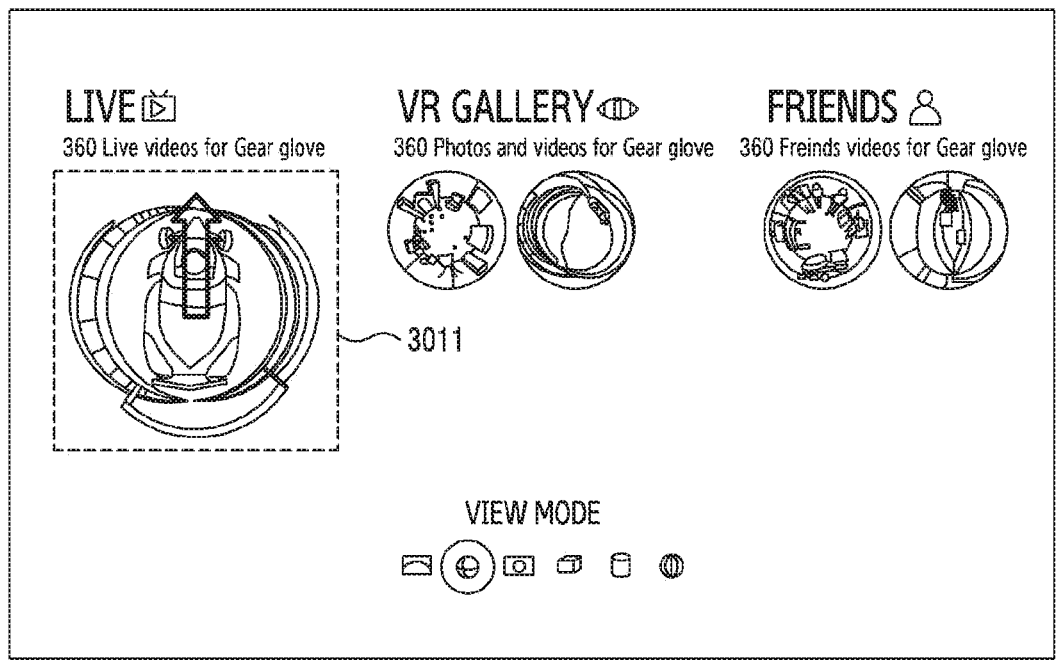
FIG. 30B illustrates a screen configuration of a virtual reality environment for reproducing a thumbnail of a planet mode in an electronic device according to various embodiments of the disclosure.
Figure 30C:
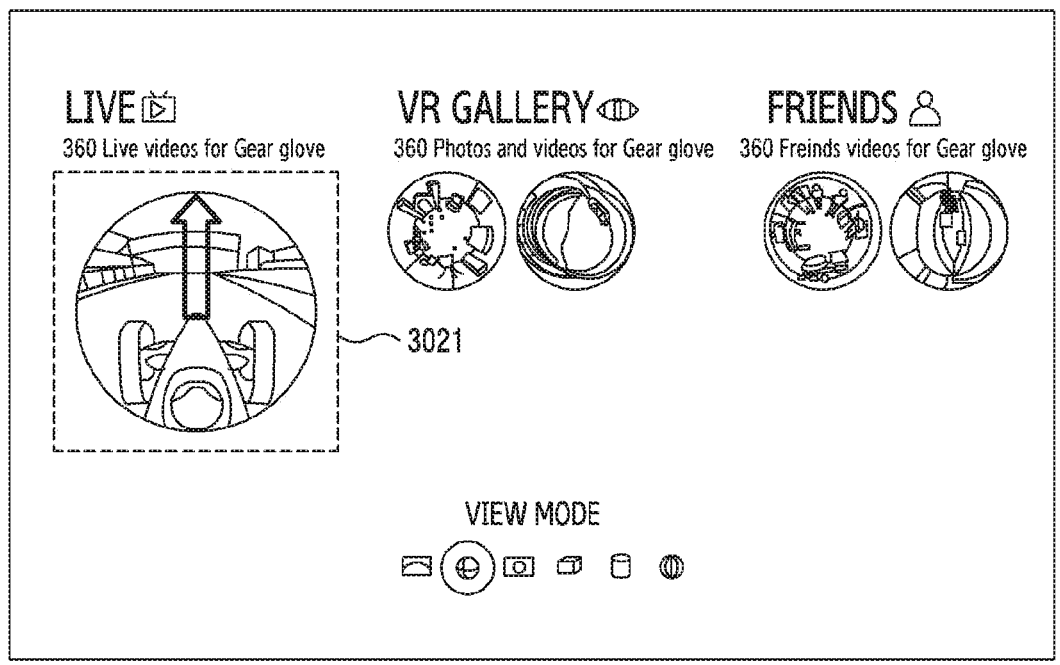
FIG. 30C illustrates a screen configuration of a virtual reality environment for reproducing a thumbnail of a planet mode in an electronic device according to various embodiments of the disclosure.

FIG. 27 illustrates a procedure of displaying a thumbnail in an electronic device according to various embodiments of the disclosure. In the following embodiments, each of operations may be performed in sequence, but it is not necessarily performed in sequence. For example, the order of each of the operations may be changed, and at least two operations may be performed in parallel. Herein, the electronic device may be the electronic device 101 of FIG. 1 and/or the electronic device 201 of FIG. 2. Hereinafter, the operation of FIG. 27 will be described with reference to FIG. 28 and FIG. 31. FIG. 28A and FIG. 28B illustrate a screen configuration for displaying a thumbnail on the basis of a capture mode in an electronic device according to various embodiments of the disclosure. FIG. 29 illustrates a screen configuration for reproducing a thumbnail of an overclock mode in an electronic device according to various embodiments of the disclosure. FIG. 30A to FIG. 30C illustrate a screen configuration of a virtual reality environment for reproducing a thumbnail of a planet mode in an electronic device according to various embodiments of the disclosure. FIG. 31 illustrates a screen configuration of a virtual reality environment for reproducing a thumbnail of an overclock mode in an electronic device according to various embodiments of the disclosure.

Referring to FIG. 27, in operation 2701, the electronic device may determine whether a thumbnail display event occurs. According to an embodiment, the processor (e.g., the processor 220) of the electronic device may determine whether the thumbnail display event occurs on the basis of whether an event of displaying a list of omnidirectional content stored in the electronic device occurs. For example, upon occurrence of a gallery selection event requiring the display of the list of content stored in the electronic device, the electronic device may determine that the thumbnail display event occurs.

In operation 2703, the electronic device may display a thumbnail corresponding to a capture mode. According to an embodiment, a thumbnail generated based on the capture mode may be displayed for each omnidirectional content stored in the electronic device. For example, as shown in FIG. 28A, the processor (e.g., the processor 220) of the electronic device may display a thumbnail of a plant mode for content of which a capture mode is "video", may display a thumbnail of a rotate mode for content of which a capture mode is "photo", may display a thumbnail of a rotate mode for content of which a capture mode is "photo", may display a thumbnail of a sphere mode for content of which a capture mode is "video looping", may display a thumbnail of a rotate mode for content of which a capture mode is "landscape HDR", and may display a thumbnail of a time-slice mode for content of which a capture mode is "time lapse". The processor (e.g., the processor 220) of the electronic device may display a thumbnail of a rotate mode for content of other capture modes or content of an unidentified capture mode. According to various embodiments, in operation 2703, the electronic device may display a thumbnail generated based on an image feature of the omnidirectional content without having to display a thumbnail corresponding to a capture mode of the omnidirectional content.

In operation 2705, the electronic device may determine whether a thumbnail reproduction event occurs. According to an embodiment, the thumbnail reproduction event may occur based on at least one of a user input for a thumbnail, a size of a region in which the thumbnail is displayed, whether the entire region of the thumbnail is displayed, and a user gaze for the thumbnail. For example, as shown in FIG. 28A, upon detecting a user input 2801 for a thumbnail of specific content, the processor (e.g., the processor 220) of the electronic device may determine that a thumbnail reproduction event of the content has occurred. For another example, if the entire region of the thumbnail for the specific content is displayed to a screen and if a size of the region in which the thumbnail is displayed is greater than or equal to a threshold size, the processor (e.g., the processor 220) of the electronic device may determine that the thumbnail reproduction event has occurred. For instance, as shown in FIG. 28B, if a thumbnail 2811 of first content is displayed to occupy a region greater than the threshold size in the entire region of the screen, the processor (e.g., the processor 220) of the electronic device may determine that a reproduction event for the thumbnail 2811 of the first content has occurred. As shown in FIG. 28B, if the entire region of a thumbnail 2813 for second content is not displayed to the screen of the entire region, the processor (e.g., the processor 220) of the electronic device may determine that a reproduction event for the thumbnail 2813 of the second content has not occurred. For another example, as shown in FIG. 30A, upon detecting a user gaze for a thumbnail 3001 of specific content in a virtual reality environment, the processor (e.g., the processor 220) of the electronic device may determine that a thumbnail reproduction event of the content has occurred.

In operation 2707, the electronic device may reproduce a thumbnail in response to the occurrence of the thumbnail reproduction event. According to an embodiment, the processor (e.g., the processor 220) of the electronic device may provide control such that a thumbnail including a plurality of images is reproduced to display a plurality of images to a display device (e.g., the display device 240) in sequence in a repeated manner for a specific time. For example, since the thumbnail of the omnidirectional content is configured to include a plurality of images, it may be displayed as if video content reproduction and/or panning operations are performed when it is reproduced according to the processor (e.g., the processor 220) of the electronic device. According to an embodiment, the processor (e.g., the processor 220) of the electronic device may be processed for reproduction by enlarging a size of a corresponding thumbnail. According to an embodiment, the processor (e.g., the processor 220) of the electronic device may reproduce a thumbnail in response to detection of a user input, and may end the reproducing of the thumbnail in response to release of the detected user input. For example, as shown in FIG. 29, upon detecting a user input (e.g., a touch input) for a thumbnail of a planet mode, the processor (e.g., the processor 220) of the electronic device may provide control such that the reproduction is achieved by enlarging a size of each of a first region 2901 and a second region 2903 (see 2911 and 2913). Upon detecting a user input release (e.g., a touch input release) for the thumbnail of the planet mode, the processor (e.g., the processor 220) of the electronic device may end the reproduction of the thumbnail while decreasing a size of the enlarged regions 2911 and 2913 to an original size, i.e., the first region 2901 and the second region 2903. According to an embodiment, the processor (e.g., the processor 220) of the electronic device may reproduce a thumbnail in response to interruption of a scroll for controlling a display of a thumbnail list, and may end the reproduction of the thumbnail in response that a user input for the scroll is detected again. For example, the processor (e.g., the processor 220) of the electronic device may reproduce the thumbnail if the entire region of the thumbnail 2811 is displayed to a screen as shown in FIG. 28B due to the interruption of the scroll for the thumbnail list, and may interrupt the reproduction of a thumbnail of a sphere mode if the user input for the scroll is detected again. According to an embodiment, the processor (e.g., the processor 220) of the electronic device may control the reproduction of the thumbnail on the basis of a user gaze in a virtual reality environment. For example, upon detecting the user gaze for a thumbnail 3001 of a planet mode in a virtual reality environment as shown in FIG. 30A, the processor (e.g., the processor 220) of the electronic device may provide control such that the thumbnail is enlarged and displayed (see 3011), and the thumbnail is reproduced in an enlarged state (see 3021) as shown in FIG. 30B and FIG. 30C. For another example, upon detecting a user gaze for a thumbnail 3101 of an overclock mode in the virtual reality environment as shown in FIG. 31, the processor (e.g., the processor 220) of the electronic device may provide control such that the thumbnail is reproduced in an enlarged state.

Although a scheme of determining a thumbnail mode in an electronic device on the basis of a capture mode of omnidirectional content or a feature of an image included in the omnidirectional content is described above, according to various embodiments, the capture mode may be determined on the basis of a user input.

Figure 32:
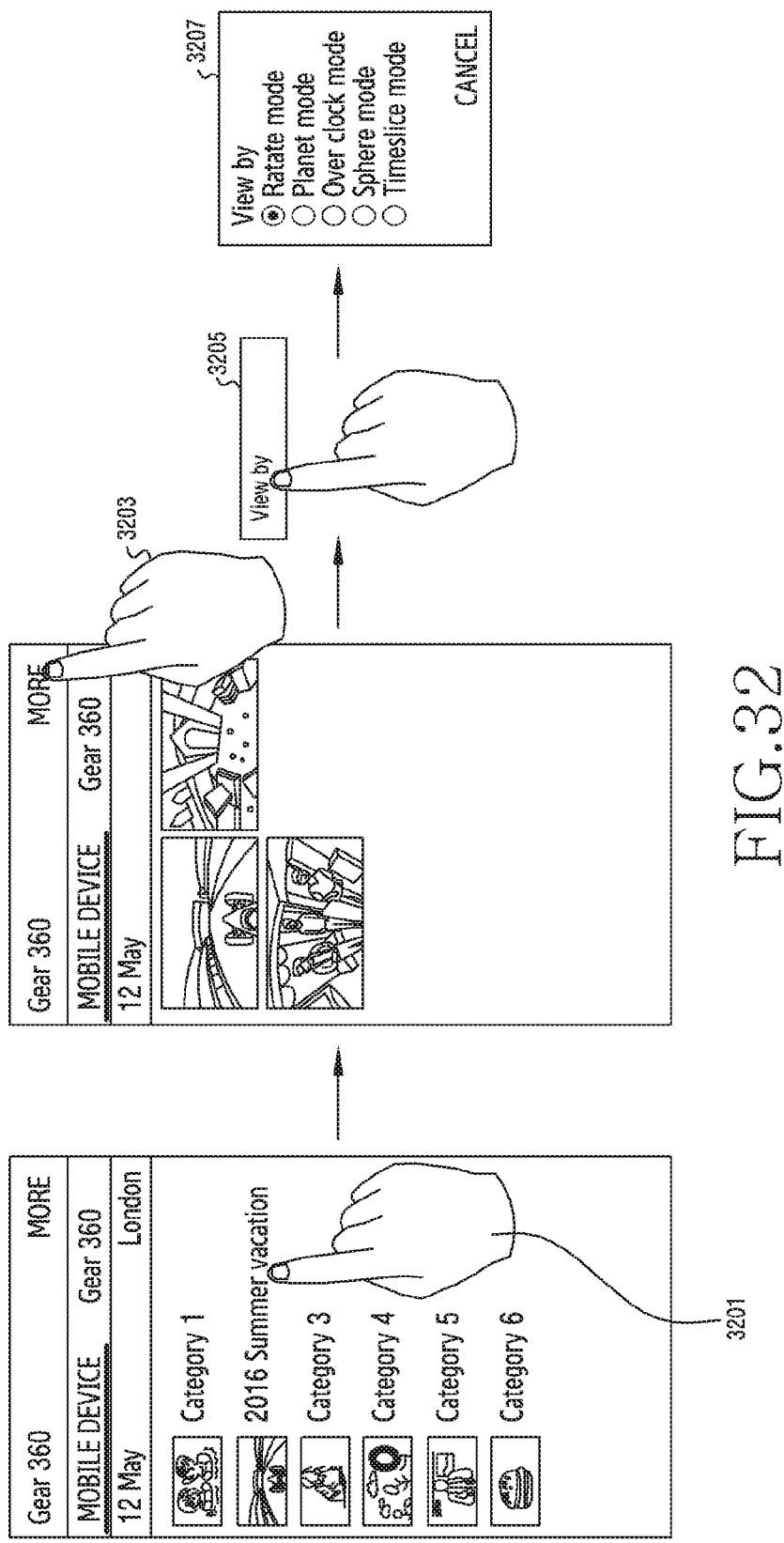
FIG. 32 illustrates a screen configuration for determining a thumbnail mode on the basis of a user input in an electronic device according to various embodiments of the disclosure.

FIG. 32 illustrates a screen configuration for determining a thumbnail mode on the basis of a user input in an electronic device according to various embodiments of the disclosure.

Referring to FIG. 32, the electronic device may display omnidirectional content stored in the electronic device according to a category. Upon detecting a user input 3201 for a specific category (e.g., 2016 summer vacation), the electronic device may display thumbnails for the omnidirectional content included in the category for which the user input is detected, on the basis of the user input. The displayed thumbnails may be thumbnails generated according to a thumbnail mode corresponding to a capture mode or an image feature. The electronic device may detect that the a thumbnail change event occurs due to user inputs 3203 and 3205, and may display a thumbnail mode selection list 3207 including supportable thumbnail modes. The thumbnail mode selection list 3207 may include, for example, a rotate mode, a planet mode, an overclock mode, a sphere mode, or a time-slice mode. The electronic device may determine a thumbnail mode selected based on a user input among the thumbnail modes included in the thumbnail mode selection list 3207 as a thumbnail mode for omnidirectional content included in a specific category. For instance, upon detecting a user input for the planet mode in the thumbnail mode selection list 3207, the electronic device may determine a thumbnail mode for omnidirectional content included in the category of "2016 summer vacation" to the planet mode, and may generate a thumbnail of the planet mode for the omnidirectional content. The electronic device may display the generated thumbnail of the platen mode to a screen.

A scheme of changing a thumbnail mode of omnidirectional content included in a category on the basis of a user input is described above with reference to FIG. 32. However, this is for exemplary purposes, and the disclosure is not limited thereto. For example, according to various embodiments, the thumbnail mode may be changed for each content on the basis of the user input.

According to various embodiments of the disclosure, a method of operating an electronic device may include obtaining at least one deformed image corresponding to a viewpoint change on the basis of an image included in content in response to detection of a thumbnail generation event for the content, mapping the obtained at least one deformed image to a 3D object, obtaining at least one partial image including at least a portion of the image mapped to the 3D object, generating thumbnail content including the obtained at least one partial image, and displaying the thumbnail content.

According to various embodiments of the disclosure, the obtaining of the at least one partial image may include obtaining at least one partial image including at least a portion of an image mapped to the 3D object by controlling at least one of a viewpoint of a virtual camera and a motion of the 3D object.

According to various embodiments of the disclosure, the obtaining of the at least one deformed image corresponding to the viewpoint change may include moving an image included in the content in any one of an x-axis direction and a y-axis direction.

According to various embodiments of the disclosure, the method may further include obtaining at least one image segment from the obtained at least one deformed image, and synthesizing the obtained image segment to a first region of the at least one partial image. The thumbnail content may include a partial image to which the first region is synthesized.

According to various embodiments of the disclosure, the obtaining of the at least one partial image may include obtaining a plurality of image segments from an image mapped to the 3D object, generating different 3D objects including the obtained plurality of image segments, and obtaining at least one partial image including at least a portion of an image mapped to the different 3D object by controlling the viewpoint of the virtual camera.

According to various embodiments of the disclosure, the plurality of image segments may be obtained based on at least one of a movement of a subject, whether a sound of the subject is generated, whether a face of the subject can be recognized, and a pattern change.

According to various embodiments of the disclosure, the method of operating the electronic device may further include determining a thumbnail mode on the basis of a capture mode of the content and an image feature, and generating the thumbnail content on the basis of the determined thumbnail mode.

According to various embodiments of the disclosure, the method of operating the electronic device may further include changing a thumbnail mode of the content on the basis of a first user input, and generating the thumbnail content on the basis of the changed thumbnail mode.

According to various embodiments of the disclosure, the method of operating the electronic device may further include reproducing the thumbnail content on the basis of at least one of a second user input, a size of the displayed thumbnail content, and whether the thumbnail content is entirely displayed.

According to various embodiments of the disclosure, the method of operating the electronic device may further include adding depth information to the thumbnail content.

According to various embodiments of the disclosure, the method of operating the electronic device may include obtaining a plurality of images included in the content in response to detection of a thumbnail generation event for the content, obtaining a plurality of image segments from the plurality of images, generating thumbnail content including the obtained plurality of image segments, and displaying the thumbnail content by controlling the display device.

According to various embodiments of the disclosure, the method may include obtaining a plurality of images included in the content, determining the number of image segments on the basis of a playtime of the content, and obtaining the plurality of images on the basis of the determined number of image segments.

According to various embodiments of the disclosure, the plurality of image segments may correspond to different regions.

According to various embodiments of the disclosure, the method of operating the electronic device may further include detecting a user input for selecting a first image segment among a plurality of image segments included in the thumbnail content, and reproducing the content on the basis of a time point corresponding to the first image segment in response to detection of the user input.

According to various embodiments of the disclosure, the method of operating the electronic device may further include detecting an event for changing a playback time point for the content is reproduced, displaying the thumbnail content in response to detection of the event for changing the playback time point, detecting a user input for selecting a first image segment among a plurality of image segments included in the thumbnail content, changing a playback time point of the content to a time point corresponding to the first image segment in response to detection of the user input, and reproducing the content on the basis of the changed playback time point.

What is claimed is:

1. An electronic device comprising:
   a display device;
   at least one processor; and
   a memory coupled to the processor,
   wherein the memory stores instructions which, when executed, cause the processor to:
   obtain at least one deformed image corresponding to a viewpoint change on the basis of an image included in content in response to detection of a thumbnail generation event for the content;
   map the obtained at least one deformed image to a 3-dimensional (3D) object;
   obtain at least one partial image including at least a portion of the image mapped to the 3D object;
   generate thumbnail content including the obtained at least one partial image; and
   display the thumbnail content by controlling the display device,
   wherein the instructions cause the processor to obtain the at least one partial image including at least a portion of an image mapped to the 3D object by controlling at least one of a viewpoint of a virtual camera and a motion of the 3D object.

2. The electronic device of claim 1, wherein the instructions cause the processor to move an image included in the content in any one of an x-axis direction and a y-axis direction in order to obtain at least one deformed image corresponding to the viewpoint change.

3. The electronic device of claim 1, wherein the instructions cause the processor to:
   obtain at least one image segment from the obtained at least one deformed image;
   synthesize the obtained image segment to a first region of the at least one partial image; and
   generate thumbnail content including a partial image to which the first region is synthesized.

4. The electronic device of claim 1, wherein the instructions cause the processor to:
   obtain a plurality of image segments from an image mapped to the 3D object;
   generate different 3D objects including the obtained plurality of image segments; and
   obtain at least one partial image including at least a portion of an image mapped to the different 3D object by controlling the viewpoint of the virtual camera, and generate thumbnail content including the obtained at least one partial image.

5. The electronic device of claim 4, wherein the instructions cause the processor to obtain the plurality of image segments on the basis of at least one of a movement of a subject, whether a sound of the subject is generated, whether a face of the subject can be recognized, and a pattern change.

6. The electronic device of claim 1, wherein the instructions cause the processor to:
   determine a thumbnail mode on the basis of a capture mode of the content and an image feature; and
   generate the thumbnail content on the basis of the determined thumbnail mode.

7. The electronic device of claim 1, wherein the instructions cause the processor to:
   change a thumbnail mode of the content on the basis of a first user input; and
   generate the thumbnail content on the basis of the changed thumbnail mode.

8. The electronic device of claim 1, wherein the instructions cause the processor to reproduce the thumbnail content on the basis of at least one of a second user input, a size of the displayed thumbnail content, and whether the thumbnail content is entirely displayed.

9. The electronic device of claim 1, wherein the instructions cause the processor to add depth information to the thumbnail content.

10. A method of operating an electronic device, the method comprising:
    obtaining at least one deformed image corresponding to a viewpoint change on the basis of an image included in content in response to detection of a thumbnail generation event for the content;
    mapping the obtained at least one deformed image to a 3D object;
    obtaining at least one partial image including at least a portion of the image mapped to the 3D object;
    generating thumbnail content including the obtained at least one partial image; and
    displaying the thumbnail content,
    wherein the at least one partial image including at least a portion of an image mapped to the 3D object is obtained by controlling at least one of a viewpoint of a virtual camera and a motion of the 3D object.

* * * * *